(12) United States Patent
Bandou et al.

(10) Patent No.: US 8,293,419 B2
(45) Date of Patent: Oct. 23, 2012

(54) METHOD FOR PREPARING HYDROGEN ABSORBING ELECTRODE AND NICKEL METAL-HYDRIDE BATTERY

(75) Inventors: Toshinori Bandou, Kyoto (JP); Kouichi Sakamoto, Kyoto (JP); Hiroaki Mori, Kyoto (JP); Kazuya Okabe, Kyoto (JP); Shuichi Izuchi, Kyoto (JP)

(73) Assignee: GS Yuasa International Ltd., Kyoto-Shi (JP)

( * ) Notice: Subject to any disclaimer, the term of this patent is extended or adjusted under 35 U.S.C. 154(b) by 233 days.

(21) Appl. No.: 12/659,099

(22) Filed: Feb. 25, 2010

(65) Prior Publication Data

US 2010/0255373 A1 Oct. 7, 2010

Related U.S. Application Data

(63) Continuation of application No. 11/661,122, filed as application No. PCT/JP2005/014964 on Aug. 10, 2005, now abandoned.

(30) Foreign Application Priority Data

Aug. 26, 2004 (JP) .................................. 2004-246550
Jul. 4, 2005 (JP) .................................. 2005-195372

(51) Int. Cl.
*H01M 4/13* (2010.01)
*C22C 19/03* (2006.01)
*C01G 1/00* (2006.01)

(52) U.S. Cl. ..................... 429/443; 429/218.2; 420/457; 423/138

(58) Field of Classification Search .................. None
See application file for complete search history.

(56) References Cited

U.S. PATENT DOCUMENTS 6,790,558 B2 * 9/2004 Okada et al. ............... 429/218.2
2006/0166099 A1 7/2006 Okabe et al.

FOREIGN PATENT DOCUMENTS

JP 11-323404 * 11/1999
JP 3279994 2/2002

OTHER PUBLICATIONS

Machine translation of JP 11-323404.*
Chinese Office Action dated May 3, 2012 issued in the corresponding Chinese Patent Application No. 200580032306.4 and its English Translation.

* cited by examiner

*Primary Examiner* — Cynthia Lee
(74) *Attorney, Agent, or Firm* — Manabu Kanesaka

(57) ABSTRACT

In a method for preparing a hydrogen absorbing electrode, a hydrogen absorbing alloy which contains a rare earth element as an alloy constituent and a transition metal element is immersed in an aqueous alkaline solution so that the saturation mass susceptibility is 1.0 to 6.5 emu/g of the hydrogen absorbing alloy. The hydrogen absorbing alloy is mixed through the immersing step with an oxide or hydroxide of a rare earth element wherein the oxide or hydroxide has as a main component at least one element selected from the group consisting of Dy, Ho, Er, Tm, Yb, and Lu. Then, a mixture of the hydrogen absorbing alloy and the oxide or hydroxide of the rare earth element is applied to form a desired shape.

14 Claims, 3 Drawing Sheets

METHOD FOR PREPARING HYDROGEN ABSORBING ELECTRODE AND NICKEL METAL-HYDRIDE BATTERY

CROSS-REFERENCE TO RELATED APPLICATION

This is a continuation application of Ser. No. 11/661,122 filed on Feb. 26, 2007.

TECHNICAL FIELD

The present invention relates to a method of preparing a hydrogen absorbing electrode in which a hydrogen absorbing alloy powder is used as an active material, and a nickel metal-hydride battery using the electrode, more specifically to a method of preparing a hydrogen absorbing electrode excellent in cycle performance and high-rate discharge ability at low temperature, and a nickel metal-hydride battery using the electrode which is improved in output power performance and cycle life.

BACKGROUND ART

In recent years, electric motor-driven equipment that include mobile electronic equipment such as mobile computers, digital cameras, etc. for which compaction of size and weight is demanded tend to rapidly increase. As a power supply of such electric motor-driven equipment, a sealed nickel metal-hydride storage battery is more widely used than a nickel cadmium storage battery, lead storage battery, etc., because the former provides a higher energy density per unit volume or unit weight, has a higher resistance to over-charge and higher resistance to over-discharge, and are less harmful to the environment than the latter. The application field of a sealed nickel metal-hydride storage battery has spread rapidly and it is now used as a power source of hybrid electric vehicles (HEVs), and even of electric motor-driven tools and electric toys which require high output power performance (high-rate discharging ability) from batteries to supply power and which have been driven heretofore by nickel cadmium batteries.

However, the aforementioned hydrogen absorbing alloy has a number of drawbacks: it is vulnerable to corrosion due to electrolyte; the hydrogen absorbing electrode (negative electrode) has a poorer high-rate discharging ability and charge receptivity than a nickel electrode (positive electrode), and thus to maintain a balance against the positive electrode, the negative electrode must comprise a hydrogen absorbing alloy having a larger volume (about 1.5 time) than that of the positive electrode, which makes it difficult to raise the energy density of the negative electrode. The hydrogen absorbing alloy, though being highly resistant to corrosion and having a long life, is slow in activation and, if it is used neat as an electrode, requires a considerable time for initial activation before it exhibits a sufficiently high discharging activity. Specifically, it requires several tens charge/discharge cycles, or in some cases even several hundreds charge/discharge cycles, before it becomes sufficiently active.

To be used as a power supply of HEVs, electric motor-driven tools and electric motor-driven toys, it is necessary for a nickel metal-hydride battery to have a better charge/discharge cycle performance and high-rate discharging ability.

To solve a problem involved in the delayed activation of a hydrogen absorbing alloy, although it is highly resistant to corrosion, many remedial methods have been proposed for promoting the activity of a hydrogen absorbing alloy powder or hydrogen absorbing alloy electrode. One of such methods is to subject a hydrogen absorbing alloy powder to a surface treatment which consists of immersing the powder in an acidic aqueous solution having a pH of 0.5 to 3.5 (for example, see Japanese Patent Application Publication No. 7-73878 (page 3, paragraph 0011)).

According to this patent document, the acidic treatment removes the coat of oxides or hydroxides covering the surface of particles of a hydrogen absorbing alloy powder, and recovers the clean surface of the powder, which enables the improved activity of the hydrogen absorbing electrode, and reduces the time necessary for activation. However, this treatment is not as effective for improving the cycle life of the battery. This is probably because, since elements eluted by the acidic treatment are different from the elements eluted in an aqueous solution of alkali metal which serves as an electrolyte of a nickel metal-hydride battery, the hydrogen absorbing alloy powder is corroded by the alkaline solution when the hydrogen absorbing alloy powder treated by the acidic treatment is used in the construction of a nickel metal-hydride storage battery.

Another method consists of immersing a hydrogen absorbing alloy powder in an aqueous sodium hydroxide solution containing sodium hydroxide at a concentration of 30 to 80 wt % at a temperature equal to or higher than 90° C., thereby producing an alloy powder which has a high-rate discharging ability and cyclic performance and is suitable for electrode use (for example, see Japanese Patent Application Publication No. 2002-256301 (page 3, paragraph 0009)).

According to the above-cited patent document, treatment with an aqueous conc. NaOH solution at a high temperature can remove oxides attached to the surface of the material powder more efficiently in a shorter period than does the treatment using a KOH aqueous solution. Furthermore, the treatment impedes the fresh attachment of oxides to the exposed surface of the alloy powder, thereby reducing the contact resistance of the powder, and improving its reactivity. Thus, according to this patent document, the time spent for procedures necessary for activating a hydrogen absorbing alloy is reduced, and discharging ability that is excellent from the initial phase of charge/discharge cycles is obtained, but the cycle performance is still inadequate. The hydrogen absorbing electrode produced by the method has a high-rate discharging ability better than a conventional comparable hydrogen absorbing electrode, but its high-rate discharging ability does not necessarily reach a level sufficiently high to meet the stern standard sought by hybrid electric vehicles (HEVs), electric motor-driven tools, etc.

According to the last-mentioned patent document, a hydrogen absorbing alloy is immersed in an alkaline aqueous solution before it is installed in a battery, so as to allow, on the surface of the hydrogen absorbing alloy, a layer to be formed which is stable to the alkaline aqueous solution, so that the hydrogen absorbing alloy powder can be protected against corrosion when it is installed in a battery. However, when the storage battery undergoes charge/discharge cycles, the alloy experiences a series of cycles consisting of hydrogen absorption and hydrogen desorption, and in conjunction with these cycles, the alloy repeats expansion/shrinkage which causes the alloy powder to have strain, and breaks the powder into finer particles. Therefore, as a result of the repeated charge/discharge cycles, the alloy exposes its fresh surfaces which are then exposed to the electrolyte to be corroded by the latter, which will lead to the reduction of charge reserve capacity. Because of this, the method described in the second patent document is not likely to bring about a significant improvement in the cycle performance. Furthermore, the repetition of charge/discharge cycles leads to the rapid decline of high-rate discharging ability. This is probably based on the following mechanism: when the battery undergoes a series of charge/discharge cycles, lighter rare earth elements such as La and the like, and Mn and Al contained in the hydrogen absorbing alloy are eluted although small in amount, to deposit, as hydroxides, on the surface of hydrogen absorbing alloy powder, which interferes with electrode reactions.

A third production of a hydrogen absorbing electrode is proposed which consists of adding, prior to the preparation of a hydrogen absorbing electrode, an yttrium (Y) compound or a compound of a lighter rare earth element such as lanthanum (La), cerium (Ce), praseodymium (Pr), etc. to a hydrogen absorbing alloy powder, in order to enhance the resistance to corrosion of the hydrogen absorbing alloy powder while maintaining the output power performance of the hydrogen absorbing electrode (see, for example, Japanese Unexamined Patent Application Publication No. 11-260361).

However, a sufficient life-improving effect could not be obtained particularly at high temperature probably because the enhanced corrosion resistance conferred by the yttrium compound to the hydrogen absorbing alloy powder may not be sufficiently high, or probably because the corrosion resistance enhancing effect of the yttrium compound may be impaired by a lighter rare earth element such as La used in combination. In any case, the aforementioned means did not bring about a battery possessed of an excellent high-rate discharging ability and a long cycle life.

A fourth hydrogen absorbing electrode has been proposed which is obtained by immersing, in advance, a hydrogen absorbing alloy powder in an alkaline or weakly acidic aqueous solution, and adding, to the powder, a rare earth element which is less basic than La, such as Sm, Gd, Ho, Er, Yb, etc. neatly or in the form of a compound for mixture (see, for example, U.S. Pat. No. 6,136,473 and Japanese Patent Application Publication No. 9-7588).

According to the description given in those patent documents, it is possible to protect a hydrogen absorbing alloy powder against corrosion which would otherwise result during its immersion in alkaline electrolyte, and to enhance its durability by depositing the hydroxides or oxides of a rare earth element as described above on the surface of the hydrogen absorbing alloy. However, when the method is actually practiced, it is found in some cases that the internal resistance of hydrogen absorbing electrode increases which may lead to the decline of output power performance. When it is required to add a compound of a rare earth element in the form of powder to a hydrogen absorbing alloy powder, the effect of the size of particles of the added compound upon the performance of the resulting electrode has been neglected, and a rare earth element compound in the form of coarse particles have been used. This probably explains the reason why addition of a particulate compound of a rare earth element did not produce a satisfactory result as expected.

For example, to be used for a power supply of an HEVs, a battery preferably has an output power performance of producing 1400 W/kg or more at 25° C. The output power performance at 25° C. of a conventional cylindrical nickel metal-hydride battery, however, is as low as 1000 W/kg. As shown in FIG. 4, a conventional cylindrical nickel metal-hydride battery comprises a lid which serves as one terminal (positive electrode terminal) out of the two terminals (the lid comprises a knob-like cap 6, a sealing plate 0, and a valve 7 provided in a space enclosed by the cap 6 and sealing plate 0; a gasket 5 is attached to the periphery of sealing plate 0; and the open end of a cylindrical container 4 with a bottom is folded tightly around the periphery of the lid so that the lid and the end of container are brought into air-tight and contact via gasket 5), wherein an upper current collecting plate 2 (current collecting plate to serve as the positive electrode) attached to the upper ends of a rolled electrode assembly 1 is connected to the sealing plate 0 via a ribbon-like current collecting lead 12 as shown in FIG. 5. In the manufacture of a conventional battery, one end of ribbon-like current collecting lead 12 is attached by welding to the internal surface of sealing plate 0; the other end of current collecting lead 12 is attached by welding to the upper current collecting plate 2; and then the lid is applied to the open end of container 4 to close the open end. Therefore, the current collecting lead 12 should have a curvature to produce an extra length. Because of this, the current collecting lead 12 connecting a welded point provided on the internal surface of sealing plate 0 with another welded point provided on the upper current collecting plate 2 usually has a length 6 to 7 times as large as the distance between sealing plate 0 and upper current collecting plate 2, which increases the electric resistance of the current collecting lead itself. This may act as one of the causes responsible for the degraded output power performance of a nickel metal-hydride battery.

DISCLOSURE OF THE INVENTION

Problems to be Solved by the Invention

The present invention was proposed to give a solution to the problems described above, and provides a method of preparing a nickel metal-hydride battery incorporating a hydrogen absorbing electrode which, because of its containing a hydrogen absorbing alloy powder as an active material, is highly resistant to the corrosion due to electrolyte and has an excellent high-rate discharging ability, characterized in that it is excellent in cycle performance, high-rate discharging activity, and output power performance.

Means for Solving Problem

The present invention gives a solution to the above problems by conferring the following features to a hydrogen absorbing electrode.

(1) A hydrogen absorbing electrode comprising 100 parts by weight of a hydrogen absorbing alloy powder which contains, as a main component, a rare earth element and a transition metal element, and has a saturation mass susceptibility of 1.0 to 6.5 emu/g, and 0.3 to 1.5 parts by weight of an oxide or hydroxide of a rare earth element, wherein said oxide or hydroxide has as a main component one or two or more rare earth elements selected from a group consisting of Dy, Ho, Er, Tm, Yb, and Lu and is in the form of powder whose average diameter is equal to or less than 5 μm.

The saturation mass susceptibility described above is determined as follows: 0.3 g of a hydrogen absorbing alloy powder is precisely weighed to serve as a sample which is measured using a vibrating sample magnetometer in magnetic fields up to 5 kOe. When a hydrogen absorbing electrode prepared according to the invention is installed in a nickel metal-hydride storage battery, the electrode will exhibit a saturation mass susceptibility to fall in the range described above, after it has undergone at least 30 cycles of charges/discharges including activation of the storage battery.

(2) The hydrogen absorbing electrode as described in paragraph (1) wherein 80 wt % or more of a rare earth element contained in said oxide or hydroxide of a rare earth element is one or two or more selected from a group consisting of Dy, Ho, Er, Tm, Yb, and Lu.

(3) The hydrogen absorbing electrode as described in paragraph (2) wherein 80 wt % or more of the rare earth element contained in said oxide or hydroxide of a rare earth element is Er.

(4) The hydrogen absorbing electrode as described in paragraph (2) wherein 80 wt % or more of the rare earth element contained in said oxide or hydroxide of a rare earth element is Yb).

(5) The hydrogen absorbing electrode as described in any one of paragraphs (1) to (4) wherein said hydrogen absorbing alloy powder is obtained by immersing a hydrogen absorbing alloy powder containing, as a main component, a rare earth element and a transition metal element, in an aqueous alkaline solution at a high temperature so that its saturation mass susceptibility is 1.0 to 6.5 emu/g.

(6) The hydrogen absorbing electrode as described in paragraph (5) wherein said hydrogen absorbing alloy powder is obtained by immersing a hydrogen absorbing alloy powder in an aqueous sodium hydroxide solution containing sodium hydroxide at a concentration of 28 to 50 wt % and at 90 to 110° C.

(7) The hydrogen absorbing electrode as described in any one of paragraphs (1) to (6) wherein said hydrogen absorbing alloy powder has an average diameter of 10 to 30 μm.

(8) The hydrogen absorbing electrode as described in any one of paragraphs (1) to (7) wherein said oxide or hydroxide of a rare earth element in the form of powder has an average diameter equal to or less than 3.5 μm.

(9) The hydrogen absorbing electrode as described in paragraph (8) wherein said oxide or hydroxide of a rare earth element in the form of powder has an average diameter of 0.1 to 3 μm.

(10) A nickel metal-hydride battery comprises a nickel electrode as a positive electrode and a hydrogen absorbing electrode as a negative electrode, wherein said hydrogen absorbing electrode comprises a mixture of 100 parts by weight of a hydrogen absorbing alloy powder containing, as a main component, a rare earth element and a transition metal element, and having a saturation mass susceptibility of 1.0 to 6.5 emu/g, and 0.3 to 1.5 parts by weight of a powder of an oxide or hydroxide of a rare earth element, which has as a main component one or two or more rare earth elements selected from a group consisting of Dy, Ho, Er, Tm, Yb, and Lu, and has an average diameter equal to or less than 5 μm.

(11) The nickel metal-hydride battery as described in paragraph (10) wherein said powder of said oxide or hydroxide of a rare earth element is a powder of an oxide or hydroxide of a rare earth element which has as a main component at least one of Er and Yb.

(12) The nickel metal-hydride battery as described in paragraph (11) wherein said powder of said oxide or hydroxide of a rare earth element which has as a main component at least one of Er and Yb has an average diameter equal to or less than 3.5 μm.

(13) The nickel metal-hydride battery as described in any one of paragraphs (10) to (12) wherein said hydrogen absorbing alloy powder has a saturation mass susceptibility of 2 to 6 emu/g.

(14) The nickel metal-hydride battery as described in any one of paragraphs (10) to (13) wherein 80 wt % or more of a rare earth element contained in said the oxide or hydroxide of a rare earth element is accounted for by Er or Yb.

(15) The sealed nickel metal-hydride battery as described in any one of paragraphs (10) to (14) obtained by inserting a rolled electrode assembly having an upper current collecting plate attached thereon into a cylindrical container with a bottom, closing an open end of said cylindrical container by means of a lid, and connecting a sealing plate composing said lid and said upper current collecting plate via a current collecting lead whose one end is attached to the internal surface of said sealing plate and the other end to the upper surface of said upper current collecting plate, wherein, at least one out of a welded point between said internal surface of said sealing plate and one end of current collecting lead and a welded point between the other end of current collecting lead and said upper surface of said upper current collecting plate has been welded by applying current through an interior of said battery by an external power source between the positive and negative terminals of said battery after the sealing.

Effect of the Invention

According to a first aspect of the invention, it is possible to provide a hydrogen absorbing electrode for a nickel metal-hydride battery which has a discharge capacity as good as that of a conventional one and is excellent in high-rate discharging ability and charge/discharge cycle performance.

According to a second aspect of the invention, it is possible to provide a hydrogen absorbing electrode for a nickel metal-hydride battery which is particularly excellent in high-rate discharging ability.

According to a third aspect of the invention, it is possible to provide a hydrogen absorbing electrode for a nickel metal-hydride battery which is particularly excellent in charge/discharge cycle performance.

According to a fourth aspect of the invention, it is possible to provide a hydrogen absorbing electrode for a nickel metal-hydride battery which is excellent in high-rate discharging ability.

According to a fifth aspect of the invention, it is possible to provide a hydrogen absorbing electrode for a nickel metal-hydride battery which is particularly excellent in charge/discharge cycle performance.

According to a sixth aspect of the invention, it is possible to provide a nickel metal-hydride battery which exhibits an excellent charge/discharge cycle performance, while maintaining its high output power performance.

According to a seventh aspect of the invention, it is possible to provide a nickel metal-hydride battery which exhibits a particularly excellent charge/discharge cycle performance.

According to an eighth aspect of the invention, it is possible to provide a nickel metal-hydride battery which is excellent both in output power performance and cycle performance.

According to a ninth aspect of the invention, it is possible to provide a hydrogen absorbing alloy powder which is particularly excellent in the resistance to corrosion.

According to a tenth aspect of the invention, it is possible to provide a nickel metal-hydride battery which exhibits a high output power performance in conjunction with the effects obtained from the use of a hydrogen absorbing electrode.

REFERENCE NUMERALS

Figure 1:
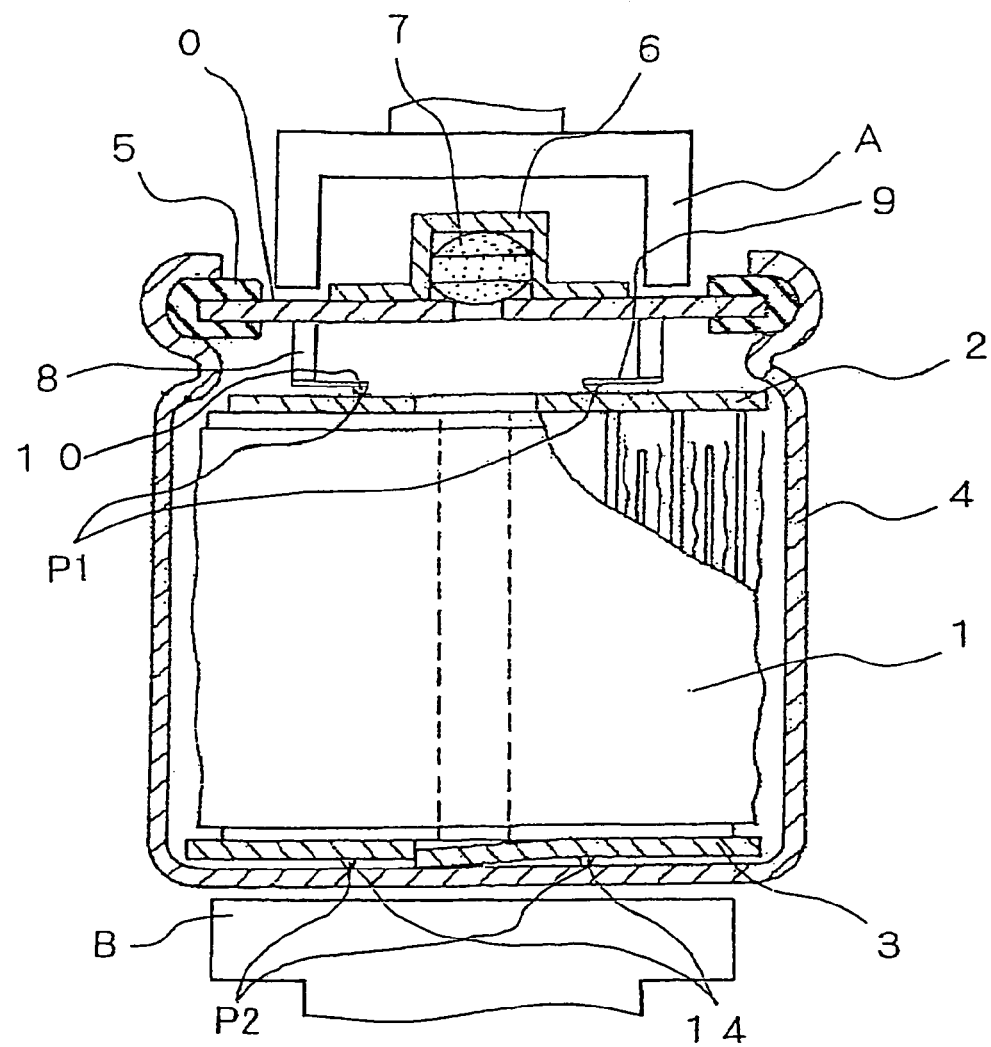
FIG. 1 is a schematic diagram for showing the structure of a nickel metal-hydride battery prepared according to the invention, and method for connecting one end of an current collecting lead to an upper current collecting plate by welding.

| | |
|---|---|
| 0: | Sealing plate |
| 1: | electrode assembly |
| 2: | Upper current collecting plate |
| 3: | Lower current collecting plate |
| 4: | Container |
| 8: | Main lead |
| 9: | Supplementary lead |
| 10, 11, 14: | Projections |
| 12. | Ribbon-like lead |
| A, B: | Output terminals for an external power source (electric resistance welder) |
| P1: | Welded point between current collecting lead and upper current collecting plate |
| P2: | Welded point between lower current collecting plate and the bottom of container |

BEST MODE FOR CARRYING OUT THE INVENTION

The composition of a hydrogen absorbing alloy used for the construction of a hydrogen absorbing electrode of the invention is not limited to any specific one. May be used any hydrogen absorbing alloy that contains, as a main component, a rare earth element such as La, Ce, Pr, Nd, etc., and a transition metal element including nickel, and has a crystalline structure represented by $AB_5$, or hydrogen absorbing alloy that contains, as a main component, Mg and nickel, and has a crystalline structure represented by $AB_3$ or $AB_{3.5}$, or hydrogen absorbing alloy that contains, as components, Ti, V, and Cr, and has a structure represented by $AB_2$.

When the alloy is a hydrogen absorbing alloy having a structure represented by $AB_5$ or $MmNi_5$ (Mm refers to a misch-metal representing a mixture of rare earth elements), it is preferable to substitute part of nickel for Co, Mn, Al, or Cu, because the resulting alloy will exhibit an excellent cycle life performance and high discharge capacity.

It is also preferred to add, as an additive, an oxide or hydroxide of one or two or more rare earth elements selected from a group consisting of Dy, Ho, Er, Tm, Yb, and Lu in the form of powder to a hydrogen absorbing alloy in the form of powder, with the former being 0.3 to 1.5 parts by weight with respect to 100 parts by weight of the latter. Of those rare earth elements, addition of Er or Yb is particularly preferred, because an Er-added hydrogen absorbing electrode exhibits an excellent high-rate discharging ability, while a Yb-added hydrogen absorbing electrode exhibits an excellent cycle performance.

It is also preferred to allow a hydrogen absorbing alloy powder to contain hydrogen at 5% or more with respect to its full hydrogen absorbing capacity, because then it is possible to shift the potential of the hydrogen absorbing alloy powder to a far lower electronegative potential at which Ni or Co begins to dissolve, and thus to greatly reduce the elution of Ni or Co when the hydrogen absorbing alloy is subjected to an immersion treatment. The hydrogen absorbing capacity mentioned above refers to the amount of hydrogen absorbed by a hydrogen absorbing alloy powder at an equilibrium hydrogen pressure (plateau area) of a PCT curve taken at 60° C. Furthermore, by allowing a hydrogen absorbing alloy to absorb hydrogen prior to its being subjected to immersion treatment, it is also possible to efficiently produce surface layers, probably because the prior absorption of hydrogen by the hydrogen absorbing alloy leads to the cracking of surfaces of the hydrogen absorbing alloy powder, and thus to obtain a hydrogen absorbing alloy powder having a sufficient activity by subjecting the powder to a minimum immersion treatment, which minimizes the loss of the content of alloy.

A conventional hydrogen absorbing alloy has a saturation mass susceptibility less than 0.1 emu/g. In contrast, a hydrogen absorbing alloy to be used in a hydrogen absorbing alloy electrode of the invention has a saturation mass susceptibility of 1.0 to 6.5 emu/g, preferably 2 to 6 emu/g, more preferably 3 to 4 emu/g.

According to the invention, it is preferable to subject a hydrogen absorbing alloy powder to a surface reforming treatment, because it is possible by so doing to raise the saturation mass susceptibility of hydrogen absorbing alloy powder which is usually 0.1 emu/g or less, to a level equal to or higher than 1 emu/g, and to obtain, by using such a hydrogen absorbing alloy powder, a nickel metal-hydride battery exhibiting an excellent output power performance. It is particularly preferred to raise the saturation mass susceptibility of a hydrogen absorbing alloy powder to 2 emu/g or higher, because then it is possible to obtain, by using such a hydrogen absorbing alloy powder, a battery exhibiting an extremely excellent output power performance. The reason why a hydrogen absorbing alloy powder having a saturation mass susceptibility equal to or higher than 1 emu/g can provide a battery exhibiting an excellent output power performance remains unclear, but from the observation that, on the surface of a hydrogen absorbing alloy powder having its saturation mass susceptibility enhanced, an Ni-rich phase consisting of a stack of layers 50 nm in thickness is detected, it seems likely that the Ni-rich phase acts as a catalyst for promoting the charge-transfer reaction on the surface of the hydrogen absorbing alloy. It is also possible for said phase to offer a channel through which accelerate the speed of the hydrogen diffusion within the internal space of hydrogen absorbing alloy powder. The Ni-rich laminar phase formed on the surface of a hydrogen absorbing alloy powder will be referred to as a catalyst layer hereinafter.

In this invention, a hydrogen absorbing alloy powder is immersed in an alkaline aqueous solution having a specified concentration for a specified period to enhance the saturation mass susceptibility of the powder. Immersing a hydrogen absorbing alloy powder in an alkaline aqueous solution at a high temperature allows the coat of oxides and hydroxides developed on the surface of hydrogen absorbing alloy powder to be removed by dissolution in a characteristic manner: rare earth elements, and Al and Mn contained in the hydrogen absorbing alloy powder which are soluble to the alkaline solution dissolve readily, and Co which is hardly soluble to the aqueous sodium hydroxide solution and Ni which is stable to the solution are left where they are. The Co and Ni when combined with rare earth elements or elements such as Mn or Al to form alloys do not exhibit magnetism, but, when they are dissolved to be isolated elements, they come to exhibit magnetism. Therefore, when a hydrogen absorbing alloy powder is treated at a high temperature with an aqueous sodium hydroxide solution, the hydrogen absorbing alloy powder will have an enhanced saturation mass susceptibility. Dissolution of rare earth elements to the solution will take place at every interface between the hydrogen absorbing alloy and the treatment solution. Thus, if the surface of hydrogen absorbing alloy powder has cracks, dissolution of rare earth elements will take place at the surface of those cracks as well as at the normal surface of the powder. On the surface of cracks as well as on the normal surface, there develop crusts containing rich amounts of Co and Ni (conversely, meager amounts of rare earth elements, and Mn and Al) as compared with the interior of the powder in the form of a stack of layers which form a catalyst layer.

Ni is a metal which is originally highly resistant to corrosion in an alkaline aqueous solution. However, the rich content of Ni in the catalyst layer does not enhance the resistance of hydrogen absorbing alloy powder to corrosion as expected, probably because the catalyst layer is porous. An analysis made on a battery which has reached the end of cycle life reveals that the most important factor responsible for the deterioration of the battery is corrosion of the hydrogen absorbing alloy included in the negative electrode by the electrolyte.

To inhibit corrosion due to the reaction of the alloy with the electrolyte, anti-corrosion inhibitors were added to the hydrogen absorbing electrode as a trial. It was found that addition of an oxide or hydroxide of an element selected from so-called rare earth elements such as Y and lanthanoids, among them particularly Dy, Ho, Er, Tm, Yb, and Lu is effective for the purpose. Particularly, when an oxide or hydroxide of Er or Yb was added in the form of powder or fine powder in particular, the resulting alloy electrode was found to exhibit a surprisingly high anti-corrosion activity.

In this invention, it is possible to obtain a hydrogen absorbing electrode having a high anti-corrosion activity and high-rate discharging ability by allowing a hydrogen absorbing alloy powder to have a saturation mass susceptibility to fall within a range as specified above, and by adding a compound of a rare earth element as specified above to the hydrogen absorbing alloy powder. Immersion treatment using an alkaline solution provides the formation of a catalyst layer on the surface of a hydrogen absorbing alloy powder: the catalyst layer then increases the saturation mass susceptibility of the powder to fall within a range as specified above, offers a channel through which protons can enter the interior of the hydrogen absorbing alloy powder, and serves as a reaction field, thereby enabling an electrode prepared from the hydrogen absorbing alloy powder to have a heightened activity, and a battery incorporating the electrode to exhibit an excellent high-rate discharging ability.

Incidentally, a battery whose saturation mass susceptibility is less than 1.0 emu/g may not provide a sufficiently good high-rate discharging ability because of the inadequate formation of a catalyst layer. Conversely, a battery whose saturation mass susceptibility exceeds 6.5 emu/g may have a lowered discharge capacity because of the reduction of hydrogen available for absorption/desorption.

The catalyst layer prevents elements such as rare earth elements which are readily soluble to the electrolyte, from coming into direct contact with the electrolyte, and provides a reaction field of electrode which can take place which are necessary for the charge-transfer reaction. Accordingly, the catalyst layer preferably has a uniform thickness and high dense, and forms a continuous superficial layer. It is more preferred to use, for immersion treatment, an aqueous NaOH solution than an aqueous KOH solution, because with the former solution it is possible to obtain a hydrogen absorbing electrode better both in high-rate discharging performance and charge/discharge cycle performance. This is probably because when treated with the former solution, the catalyst layer more uniform and having a more continuity is formed on the surface of hydrogen absorbing alloy. The aqueous NaOH solution is most suitable for the formation of a uniform breach-free superficial layer of all the alkaline solutions. Use of the NaOH aqueous solution is also preferred because it contracts the time necessary for treatment: for example, treatment with an NaOH aqueous solution proceeds at a speed two times as high as the treatment with a comparable LiOH aqueous solution.

Treatment with an aqueous NaOH solution proceeds more rapidly as the concentration of the solution becomes higher. The treatment speed begins to increase when the concentration of NaOH becomes equal to or higher than 28 wt %. The solution containing NaOH at a concentration of 28 wt % or higher is preferred, because it can contract the time necessary for treatment. Increasing the concentration of NaOH over 50 wt %, however, brings about a problem: when such an aqueous NaOH solution is cooled to room temperature, sodium hydroxide will precipitate and it becomes difficult to separate sodium hydroxide from a treated hydrogen absorbing alloy powder. Making allowance for this, it is preferable to adjust the concentration of NaOH of an aqueous NaOH solution used for immersion treatment to fall in the range of 28 to 50 wt %.

The speed at which immersion treatment proceeds varies greatly depending on the temperature (temperature of immersion treatment) of a treatment solution. To increase the speed of treatment, it is preferred to keep the temperature of treatment solution equal to or higher than 90° C. It is more preferable to keep the temperature of treatment solution equal to or higher than 100° C. because then the speed of treatment increases dramatically. However, it is preferred to keep the temperature of treatment solution below its boiling point, because if the temperature of treatment solution is above the boiling point of the solution, the reaction speed will become so high that control of the formation of a catalyst layer will become difficult. It is more preferred to keep the temperature of treatment equal to or lower than 110° C.

If the speed of treatment varies during treatment, it will cause the formation of a superficial layer on the surface of a hydrogen absorbing alloy powder to proceed unevenly, which may exert an adverse effect on the function of a resulting electrode. To keep the speed of treatment at a steady level, the treatment solution is preferably stirred during treatment, so that powdery hydrogen absorbing alloy will not sink to the bottom of a vessel. By stirring, it is possible to keep uniform the distributions of alkaline concentration and temperature within the treatment vessel.

To form a uniform superficial layer having a uniform thickness and high dense, it is also preferred to keep the temperature of treatment solution in the range of 90 to 110° C. as described above. Specifically, it is preferred to start the treatment at a temperature within the above range, and keep the variation of temperature during treatment at $\leq \pm 3°$ C., more preferably at $\leq \pm 2°$ C. It is preferred to start the treatment at an NaOH concentration in the range of 28 to 50 wt %, and keep the variation of concentration during treatment at $\leq \pm 5$ wt %, more preferably at $\leq \pm 3$ wt %.

A hydrogen absorbing alloy powder having a saturation mass susceptibility of 1.0 to 6.5 emu/g according to the invention has a superficial layer formed thereon whose thickness is about 50 to 400 nm (based on the observation via a Focused Ion Beam device of a cross-section of a hydrogen absorbing alloy powder). The time necessary for immersion treatment is about 0.9 to 5.5 hours. The time necessary for immersion treatment is not limited to any specific range, but may be changed as appropriate to allow a hydrogen absorbing alloy powder to exhibit, after treatment, a saturation mass susceptibility in the range of 1.0 to 6.5 emu/g.

When a hydrogen absorbing alloy powder is treated with an alkaline aqueous solution, rare earth elements such as La residing on the surface of the powder are once eluted into the solution and then deposit on the surface of the alloy powder as hydroxides.

If a hydrogen absorbing alloy powder having the hydroxides of rare earth elements deposited on its surface is used as it is as an electrode, the deposit of hydroxides will interfere with the electron conductions at the interface where the particles of hydrogen absorbing alloy powder come into contact with each other, and contact of hydrogen absorbing alloy powder with electrolyte, thus inhibiting the charge/discharge reaction of hydrogen absorbing electrode, and thus the apparent capacity of battery will be reduced. In addition, since the powder has an increased resistance, the high-rate discharging ability of battery will be attenuated. To avoid this, it is preferred to remove these hydroxides of rare earth elements.

In order to remove the hydroxides of rare earth elements deposited on the surface of a hydrogen absorbing alloy powder, a method of separating and removing the hydroxides of rare earth elements by utilizing the sedimentation speed in the aqueous solution after the hydrogen absorbing alloy powder is exposed to ultrasonic wave and the hydroxides of rare earth elements are peeled from the alloy after the immersion treatment solution is removed by filtration, (specifically, the method in which flowing water is carried away from the bottom of a tank and the impurities of rare earth elements which are more reluctant to precipitate are mixed into the flowing water to be removed) or a method by utilizing a difference of particle diameter (the method in which small-sized particles are removed by filtration because diameters of the impurities of rare earth elements are smaller than that of the alloy) is preferable, because composition of a surface of powder is not changed and resistance of the powder to corrosion is not changed. Although there is also a method in which a hydrogen absorbing alloy powder is taken into contact with a diluted solution of hydrochloric acid or acetic acid and the hydroxides of rare earth elements are filtrated while being dissolved, the superficial layer developed during the immersion treatment may be dissolved by the acid, its composition may be altered and the corrosion resistance of the powder to alkaline solution is lowered.

While a hydrogen absorbing alloy is immersed in an aqueous alkaline solution, hydrogen gas evolves, and part of the gas is entrapped by the hydrogen absorbing alloy. If the hydrogen absorbing alloy entrapping hydrogen is exposed to air, the alloy may generate heat to get on fire. With the generation of heat, corrosion of the hydrogen absorbing alloy powder may proceed rapidly. To avoid this, it is preferred to remove hydrogen from the alloy.

Removal of hydrogen from the alloy may be achieved by a number of methods. First, an oxidizing agent such as $H_2O_2$ may be used to oxidize hydrogen. However, this method is not preferred because the oxidizing agent is expensive and method requires the use of a large amount of such an agent. A second method is preferred because of its being free from the drawback of the first method. This method is to bring a hydrogen absorbing alloy powder treated by immersion treatment into contact with warm water, then with hydrogen peroxide solution to remove hydrogen entrapped by the powder from the latter. Particularly a modified method wherein a hydrogen absorbing alloy powder is exposed to warm water of 80° C. or higher and having a pH of 9 or lower is preferred, because the method allows the majority of hydrogen entrapped by the alloy to be removed as gas efficiently and at low cost, and released gas to be available for reuse. Suitable oxidizing agents are not limited to any specific species, but hydrogen peroxide is preferred because it does not lead to the generation of products which may act as impurities affecting the performance of the alloy. The oxidizing agent, when it is allowed to contact with the formative layer on the surface of an alloy powder at 45° C. or higher, will decompose of itself to release oxygen, thereby lowering the efficiency of the process. Therefore, it is preferred to use the oxidizing agent cooled to a temperature equal to or less than 45° C., because then the agent can efficiently react with hydrogen entrapped by the alloy powder.

A hydrogen absorbing alloy powder treated by immersion treatment, if exposed to air, has its surface oxidized and its activity will be reduced.

On the contrary, if a hydrogen absorbing alloy powder does not have any coat of hydroxides on its surface, its activity will become so high that it is ready to ignite, and will actually get on fire during transportation or when it is transferred from one place to another during processing. Moreover, if a hydrogen absorbing alloy powder is stored not being dried sufficiently but moisturized, the capacity of the alloy will greatly be reduced during storage possibly because the rare earth elements contained in the alloy will be eluted to exhibit alkalinity, which promotes the corrosion of the alloy.

When a hydrogen absorbing alloy powder is exposed to air kept at 60 to 90° C. to be partially dried, the alloy powder will be removed of its moisture but have its surface oxidized. This drying process is preferred, however, because the lowering of high-rate discharging ability has a limitation, although the surface of the alloy powder is oxidized. This is probably because a thin coat of oxides formed on the surface of alloy powder by the process will be deprived of oxygen to be reconverted to original elements and removed when a battery incorporating an electrode comprising the alloy powder is activated via charging/discharging.

A hydrogen absorbing alloy powder treated by immersion treatment was partially dried under the condition as described above, and thus an alloy powder suitable for the construction of a negative electrode was obtained that will exhibit no loss of capacity during prolonged storage, be safe and free from the risk of getting on fire, and have an excellent high-rate discharging ability.

The immersion treatment is also advantageous because the superficial layer formed on the surface of a hydrogen absorbing alloy powder after the treatment acts as an activator of the alloy powder, and thus during the initial phase of use, a battery incorporating the electrode will exhibit an excellent high-rate discharging ability.

However, if a hydrogen absorbing alloy powder is simply immersed in an alkaline solution, an electrode incorporating the resulting alloy powder will quickly have its high-rate discharge ability reduced when it is subjected to charge/discharge cycles. This is probably because during charge/discharge cycles, rare earth elements such as La and the like, and Mn and Al contained in the hydrogen absorbing alloy are eluted although small in amount, to deposit, as hydroxides, on the surface of hydrogen absorbing alloy powder, which interferes with electrode reactions. To avoid this, by adding the oxides or hydroxides of rare earth elements as specified above to a hydrogen absorbing alloy powder, it is possible to obtain a hydrogen absorbing electrode capable of exhibiting an excellent high-rate discharging ability over a prolonged period. This is probably because addition of the oxides or hydroxides of rare earth elements will inhibit the elution of rare earth elements such as La and the like, and Mn and Al from the hydrogen absorbing alloy.

As described in claim 1, the inventors found that addition of an oxide or hydroxide of a specified rare earth element to a hydrogen absorbing alloy treated by using an alkaline solution can dramatically enhance the resistance of the alloy to alkalinity. The inventors also made an observation that an electrode incorporating such a hydrogen absorbing alloy as described above exhibits a far more excellent high-rate discharging ability and enhanced resistance to alkalinity, depending on the species of rare earth element added. Specifically, the inventors found that addition of an oxide or hydroxide of a rare earth element, particularly of Er will lead to the production of a hydrogen absorbing electrode which is excellent both in the resistance to alkalinity and in high-rate discharging ability. The inventors also found that addition of an oxide or hydroxide of Yb will lead to the production of a hydrogen absorbing electrode which is markedly excellent in the resistance to alkalinity.

A hydrogen absorbing electrode of the invention contains, as main components, a hydrogen absorbing alloy powder having a saturation mass susceptibility of 1.0 to 6.5 emu/g, and a compound of one or more rare earth elements selected from Dy, Ho, Er, Tm, Yb, and Lu. The ratio of the weight of a rare earth element against the total weight of the compound of a rare earth element is preferably 80 wt % or more, particularly preferably 90 w % or more. By containing a compound of a rare earth element, a hydrogen absorbing alloy has its corrosion resistance markedly enhanced, and provides an excellent cycle performance. Of the rare earth elements cited above, Er is most preferred because addition of Er will lead to the production of a hydrogen absorbing electrode having an excellent high-rate discharging ability. Yb is also preferred because addition of Yb will lead to the production of a hydrogen absorbing electrode having a highly enhanced resistance to corrosion.

Observation by EPMA indicates that Dy, Ho, Er, Tm, Yb, or Lu added to a hydrogen absorbing alloy powder concentrates on the surface of the alloy powder, and analysis by X-ray diffraction reveals that the majority of compounds concentrated on the surface of the alloy consists of hydroxides, and that the hydroxides are likely to deposit on the surface of hydrogen absorbing alloy powder in layers to form a coat thereon (the hydroxides are likely to penetrate into cracks and holes present on the surface of the alloy powder). The exact reason why the hydroxides of a rare earth element deposit on the surface of a hydrogen absorbing alloy powder is not clear, but may be most likely explained by the clean surface of the alloy powder exposed by the foregoing alkali treatment, and strong adsorption of the hydroxides to the surface of the alloy powder via a mechanism involving the zeta potential of the hydroxides.

The mechanism by which the compound of a rare earth element enhances the corrosion resistance of a hydrogen absorbing alloy powder is unclear, but is most likely ascribed to the formation of a coat by the compound of a rare earth element on the surface of a hydrogen absorbing alloy powder which enhances the resistance of the alloy powder against corrosion. Of those rare earth elements cited above, Yb is most effective in the production of a hydrogen absorbing electrode highly resistant to corrosion because its hydroxide most readily disperses in an alkaline electrolyte, thereby enabling the formation of a uniform coat. On the other hand, addition of a hydroxide of Er is less effective in the production of a hydrogen absorbing electrode resistant to corrosion as compared with the addition of a hydroxide of Yb, although the electrode exhibits an excellent high-rate discharging ability. This is probably because an hydroxide of Er, although being ready to disperse in electrolyte, exists as particles whose size is larger than the corresponding particles of other rare earth elements, and thus a coat derived therefrom could not block the entry of electrolyte effectively.

The mixture ratio between a hydrogen absorbing alloy powder and a compound of a rare earth element is very important because it greatly affects the high-rate discharging ability and cycle performance of a resulting hydrogen absorbing electrode. According to the invention, preferably 0.3 to 1.5, more preferably 0.7 to 1.5 part by weight of a compound of a rare earth element is mixed with 100 parts by weight of a hydrogen absorbing alloy powder. If a compound of a rare earth element is added at an amount less than 0.3 part by weight, the resulting hydrogen electrode would not have its corrosion resistance enhanced. On the contrary, if the addition amount of a compound of a rare earth element exceeds 1.5 part by weight, electrode reactions on a resulting hydrogen electrode would be emphasized so much that the high-rate discharging ability of the electrode would be markedly damaged. In addition, the hydrogen over-voltage of the electrode would be reduced so much that the evolution amount of hydrogen during charging would be increased.

Formation of a coat of a hydroxide of a rare earth element on the surface of a hydrogen absorbing alloy powder may be achieved by an alternative method: a rare earth element is added as a constituent to a hydrogen absorbing alloy powder, and the resulting hydrogen absorbing alloy powder is brought into contact with an alkaline solution, thereby allowing the rare earth element to elute in the solution and form its hydroxide there. However, this method is disadvantageous because, if one of the rare earth elements cited in this invention is added to a hydrogen absorbing alloy, the resulting alloy will not have a saturation mass susceptibility sufficiently enhanced even after it has been immersed in an alkaline solution. Moreover, when the mixed hydrogen absorbing alloy is brought into contact with alkaline solution, to allow a rare earth element to be eluted in the solution, the rare earth element eluted mainly consists of atoms located on the surface of the alloy powder, and is so small in quantity that it is not sufficient to form a coat on the surface of the powder, and thus will not provide the effect which will be obtained by the addition of a hydroxide of a rare earth element. As described above, the latter method in which a rare earth element is added as a constituent to a hydrogen absorbing alloy powder prior to alkaline immersion treatment could hardly achieve the object of the invention. Thus, it is preferred to add an oxide or hydroxide of a rare earth element to a hydrogen absorbing alloy powder for mixture.

As described above, the majority of rare earth elements added will become, after they are incorporated in a battery, hydroxides finally. The compound of a rare earth element to be added to a hydrogen absorbing alloy powder is not limited to any specific one, but preferably includes those that will not affect the concentration of electrolyte by reacting with the latter, and are readily available. Specifically, oxides or hydroxides are preferred. Particularly, oxides are preferred, because when an oxide of a rare earth element is added, the oxide is dissolved once in electrolyte, and then reappears as hydroxide to precipitate which is so small in size that it forms a uniform coat on the surface of a hydrogen absorbing alloy powder, thereby emphasizing the effect characteristic with the addition of a rare earth element.

Conventionally, an oxide or hydroxide of Er or Yb is added neat to a hydrogen absorbing alloy powder for mixture without pulverization. The oxide or hydroxide of Er or Yb commercially available consists of powder whose average diameter is in the range of 8 to 15 μm that is larger than 5 μm. According to the invention, an oxide or hydroxide of Er or Yb in the form of powder is preferably pulverized to allow the powder to have an average diameter equal to or less than 5.0 µm, before it is added to a hydrogen absorbing alloy powder for mixture. It will be possible by so doing to obtain a hydrogen absorbing electrode exhibiting a good cycle performance because of the excellent corrosion resistance conferred by the oxide or hydroxide of Er or Yb added. More preferably the average diameter of the oxide or hydroxide of Er or Yb is made equal to or less than 3.5 µm. Initially we were afraid that addition of an oxide or hydroxide of Er or Yb in the form of powder would degrade the output power performance of the resulting hydrogen absorbing electrode, but after studying the result of experiment we found that addition of an oxide or hydroxide of Er or Yb does not affect in any way the output power performance of the resulting hydrogen absorbing electrode.

Particularly, in order to lengthen the cycle life of a hydrogen absorbing electrode, an oxide or hydroxide of Er or Yb to be added preferably has an average diameter (D50) of 0.1 to 3 µm, more preferably 0.1 to 1 µm. If it is tried to obtain an oxide or hydroxide of Er or Yb having an average diameter less than 0.1 µm, the production process will be so complicated as to elevate the production cost. On the contrary, if the average diameter in exceeds 3 µm, an oxide or hydroxide of Er or Yb will hardly be adsorbed to the surface of a hydrogen absorbing alloy powder and a stable coat will never be formed on the surface of the powder.

The reason why finely pulverized oxide or hydroxide of Er or Yb exerts an enhanced effect is unclear, but the most likely explanation is that, when an oxide or hydroxide of Er or Yb is pulverized into a fine powder, the dispersion tendency of the compound is more stressed as compared with the same compound consisting of a coarse powder, and thus the powder is allowed to form a more uniform coat on the surface of a hydrogen absorbing alloy powder. At least part of powdery oxide or hydroxide of Er or Yb added to a hydrogen absorbing alloy powder for mixture reacts, after the resulting hydrogen electrode has been installed in a battery, with electrolyte though at a slow pace and is converted into hydroxides. It seems likely that during this process, the hydroxides thus formed will accumulate on the surface of hydrogen absorbing alloy powder which stays at a electronegative potential. If the oxide or hydroxide of Er or Yb added consists of powder having a small diameter, its reaction with electrolyte will be emphasized, and accumulation of resulting hydroxides onto the surface of a hydrogen absorbing alloy powder will be enhanced, which will explain the reason why the addition of oxide or hydroxide of Er or Yb markedly elevate the corrosion resistance of hydrogen absorbing electrode.

The same will also hold true for an oxide or hydroxide of a rare earth element other than Er and Yb, such as Dy, Ho, Lu, etc. which is in the form of powder having a small diameter.

The powdery oxide or hydroxide of a rare earth element to be added to a hydrogen absorbing alloy powder will be called an anti-corrosion agent hereinafter.

When the oxide or hydroxide of Er is compared with the corresponding compound of Yb, the enhanced anti-corrosion activity of a resulting hydrogen absorbing electrode due to an Er compound is somewhat inferior to the corresponding activity due to a comparable Yb compound. This is probably because the Er compound is more strongly inhibited of its dispersion within the hydrogen absorbing electrode than the comparable Yb compound. However, it was found that addition of an oxide or hydroxide of Er does not greatly increase the resistance of a resulting hydrogen absorbing electrode, and the electrode exhibits an output power performance as high as the electrode having no oxide or hydroxide of Er added. On the other hand, addition of an oxide or hydroxide of Yb brings about a more enhanced resistance of a hydrogen absorbing electrode to corrosion than a comparable compound of Er, probably because it is more readily dispersed in the electrode than the latter. However, addition of an oxide or hydroxide of Yb more strongly lowers the discharging ability of a hydrogen absorbing electrode probably because the Yb compound is more readily dispersed in the electrode. Namely, addition of an oxide or hydroxide of Yb reduces more strongly the discharging ability of a hydrogen absorbing electrode, and the output power performance of a resulting battery than the comparable Yb compound probably due to the readier dispersion of the former in the electrode.

Since rare earth elements resemble each other so much that it is difficult to separate them from one another, and thus isolation of a target rare earth element is often accompanied by impurities including other rare earth elements. As described above, however, it was found that the oxides or hydroxides of Dy, Ho, Er, Tm, Yb, Lu are effective, when added to a hydrogen absorbing alloy powder, in enhancing the corrosion resistance of the latter. If to a certain corrosion-resistance enhancer, a rare earth element other than Dy, Ho, Er, Tm, Yb, and Lu is added, the corrosion-resistance enhancing effect of that agent may be damaged. To avoid this, it is preferred according to the invention that the entry of other rare earth elements than Dy, Ho, Er, Tm, Yb, and Lu should be avoided as far as possible. However, it was found from a study that, as far as the content of Dy, Ho, Er, Tm, Yb, or Lu in the total amount of a rare earth element contained in a corrosion-resistance enhancer is 80 wt % or more (preferably 90 wt % or more), the enhancer can exert its desired effect to a satisfactory level, even though it is contaminated with other rare earth elements.

As described above, addition of an oxide or hydroxide of Er will enhance the corrosion resistance of a hydrogen absorbing alloy powder while hardly increasing the reaction resistance of a resulting hydrogen absorbing electrode. Addition of an oxide or hydroxide of Yb is effective in markedly enhancing the resistance of a hydrogen absorbing alloy powder, although it slightly increases the reaction resistance of a resulting hydrogen absorbing electrode. As seen from above, Er and Yb compounds exert different effects. To make the most of those different effects, it is preferred to avoid Er and Yb compounds to be mixed inadvertently or at random. It was found from a study that even when Er and Yb compounds are mixed, and the ratio of Er or Yb (also called the purity of Er or Yb) against the total amount of rare earth elements of the mixture is 80 wt % or more, the mixture will exert its desired effect determined by a predominant rare earth element species in the mixture. For the reason given above, the purity of a corrosion-resistance enhancer in terms of its content of Er or Yb is preferably 80% or more, more preferably 90% or more.

Addition of a corrosion-resistance enhancer to a hydrogen absorbing alloy powder may interfere with the formation of a catalyst layer upon the surface of the powder. If an oxide or hydroxide of Er or Yb is added to a hydrogen absorbing alloy powder which does not yet receive a catalyst layer on its surface, the hydrogen absorbing alloy powder will not be activated, even after it is put to a activation process. Thus, when a resulting battery was charged, the electrode did not absorb hydrogen, and the battery suffered from leakage at an initial stage of operation. To avoid this, when an oxide or hydroxide of Er or Yb is added to a hydrogen absorbing alloy powder, it is necessary for the hydrogen absorbing alloy powder to be subjected in advance to the surface treatment and then to have a catalyst layer formed on its surface. When a hydrogen absorbing alloy powder is subjected to the surface treatment according to the invention, its saturation mass susceptibility will be increased. However, if the saturation mass susceptibility of hydrogen absorbing alloy powder exceeds 6 emu/g, the resulting alloy will have a lowered capacity and cycle performance probably because of the reduction of hydrogen absorbing sites. Therefore, it is preferred to set the saturation mass susceptibility of hydrogen absorbing alloy powder to 1 to 6 emu/g, more preferably 2 to 6 emu/g. For reference, a hydrogen absorbing alloy powder prepared from a hydrogen absorbing alloy of the invention was observed to have a catalyst layer formed on its surface whose thickness is 50 nm or more.

The diameter of a hydrogen absorbing alloy powder to be used as a hydrogen absorbing electrode of the invention is not limited to any specific range, but it is preferably in the range of 10 to 30 μm. If the average diameter is less than 10 μm, a resulting electrode will not exhibit a good cycle performance because its corrosion resistance is unsatisfactory. On the contrary, if the average diameter exceeds 30 μm, powder constituting a resulting electrode, when subjected to a series of charge/discharge cycles, will be cracked to expose its fresh surfaces which may promote the progression of corrosion of the electrode. Moreover, if an alloy powder whose average diameter is equal to or larger than 30 μm is used as an electrode, a prolonged treatment will be necessary for attaining a desired level of saturation mass susceptibility and a resulting electrode will not exhibit a high-rate discharging ability enhanced to a sufficiently high level.

To confer an excellent high-rate discharging ability to an electrode, a hydrogen absorbing alloy powder preferably has an average diameter of 30 μm or less. Furthermore, to confer a sufficiently high cycle life to an electrode, a hydrogen absorbing alloy powder preferably has an average diameter of 10 μm or more, more preferably 20 μm or more.

In order to provide an oxide or hydroxide of a rare earth element in the form of powder or a hydrogen absorbing alloy powder having a desired shape, a mill and sieve are used. For example, a mortar, ball mill, sand mill, vibration mill, satellite ball mill, jet mill, counter jet mill, or swirling current jet mill, and a sieve are used. For milling, wet milling accompanied by the addition of water or an aqueous solution of an alkali metal may be used. Sieving may take place by any suitable method: a sieve or blower sorting machine may be used under a wet or dry condition as needed.

The active material of a negative electrode which forms the predominant constituents of a negative electrode has been described above. The hydrogen absorbing electrode may include, in addition to the predominant constituents, other constituents such as an electric conductor, binding agent, thickener, filler, etc.

The positive electrode may also contain, in addition to an active material making the predominant constituents of a positive electrode, other constituents such as an electric conductor, binding agent, thickener, filler, etc.

The electric conductor is not limited to any specific one, but may be any appropriate conductor as long as it does not exert an adverse effect on the function of a battery. However, usually the suitable electric conductor may include one of natural graphite (scale-like graphite, clay-like graphite), artificial graphite, carbon black, acetylene black, Ketchen black, carbon whisker, carbon fiber, gas phase developed carbon, metal powder (copper, nickel, gold, etc.), and metal fiber, etc., or combination thereof. Among them, Ketchen black is most preferred because it has a high electric conductivity and can be easily applied to an external object as a paste. The addition amount of an electric conductor is preferably in the range of 0.1 to 2 wt % with respect to the total weight of a positive or negative electrode, because then it will not greatly reduce the capacity of an electrode to which it is added. Ketchen black which has been pulverized into a ultra-fine powder having a diameter of 0.1 to 0.5 μm is particularly preferred, because then it will reduce the necessary amount of carbon.

Usually the suitable binding agent may include one, or two or more in combination selected from thermoplastic resins such as polytetrafluoroethylene (PTFE), polyethylene (PE), polypropylene (PP), and polymers having a rubber-like elasticity such as ethylene-propylene-dienterpolymer (EPDM), sulfonated EPDM, styrenebutadiene rubber (SBR), etc. The addition amount of a binding agent is preferably in the range of 0.1 to 3 wt % with respect to the total weight of a positive or negative electrode.

Usually the suitable thickener may include one, or two or more in combination selected from polysaccharides such as carboxymethylcellulose (CMC), methylcellulose (MC), hydroxypropylmethyl cellulose (HPMC), etc. The addition amount of a thickener is preferably in the range of 0.1 to 3 wt % with respect to the total weight of a positive or negative electrode.

Suitable fillers may include any appropriate filler as long as it does not exert an adverse effect on the function of a battery. Usually, the suitable filler may include olefin polymers such as polyethylene, and carbon. The addition amount of a filler is preferably less than 5 wt % with respect to the total weight of a positive or negative electrode.

A positive or negative electrode is preferably manufactured by adding an active material, electric conductor, and binding agent to water, or an organic solvent such as alcohol or toluene for mixture, applying a resulting liquid mixture to a current collecting substrate, and drying the assembly. Suitable coating methods for forming a coat having a desired shape and size may include, for example, roller coating such as applicator roll, screen coating, doctor blade method, spin coating, coating by a bar coater, etc. However, the suitable method is not limited to those mentioned above.

Suitable current collecting substrates may include any appropriate current collecting substrates as long as it does not exert an adverse effect on the function of a battery. For example, a nickel plate, or a nickel-deposited steel plate may be employed with profit. Suitable forms may include substrates such as a foam, molded bundle of fibers, three-dimensional substrates formed to convexo-concave, and two-dimensional plates such as a punched steel plate. The suitable thickness is not limited to any specific one, but usually 5 to 700 μm is preferred. However, the current collecting substrate of a positive electrode is preferably obtained by processing Ni which is resistant to corrosion and oxidization into a porous substrate because the porous substrate is a structure advantageous for collecting current. On the other hand, the current collecting substrate of a hydrogen absorbing electrode is preferably obtained by depositing nickel onto an iron foil which is cheap and has an excellent conductivity to enhance the resistance of the foil to reduction, and punching the resulting foil (punched substrate). Punching is preferably performed so that holes having a diameter of 1.7 mm or less are formed thereon, and the total area of holes accounts for 40% or higher of the total surface area of the plate. It is possible via this arrangement to secure the adhesion between an active material of a negative electrode and a current collecting substrate, even though a binder is used at a small amount.

In addition to baked carbon and conductive polymer, an Ni powder, or carbon or platinum in the form of powder may be applied to the surface of an Ni-made current collecting substrate in order to enhance the adhesiveness, conductivity, and oxidation resistance of the substrate. The additives described above may be applied after their surface has been subjected to oxidation treatment.

Suitable materials for a separator of a nickel metal-hydride battery may include a porous membrane or non-woven fabric alone or in combination. Suitable materials constituting such a porous membrane or non-woven fabric may include polyolefin resins represented, for example, by PE, PP, etc., and polyamide resins (nylon). The porosity of a material constituting a separator is preferably equal to or less than 80 vol %, because then the resulting separator can have a sufficient strength, prevent the occurrence of electrical short circuit through a penetration of the separator, and ensure the secure passage of gases. On the contrary, the porosity of a material constituting a separator is preferably equal to or more than 20 vol %, in order to keep the electric resistance of separator at a low level and ensure the high-rate performance of a battery. The separator is preferably treated to be hydrophilic. For this purpose, for example, a polyolefin resin such as polyethylene may be subjected to sulfonation treatment, corona treatment, or PVA treatment. Or, two or more materials subjected to different treatments may be combined.

Any electrolyte commonly used in an alkali battery may be used. Suitable electrolyte may contain K, Na and Li alone or in combination in water, but suitable electrolyte is not limited to the one mentioned above. The concentration of solute in electrolyte is preferably 5 to 7 mol/dm$^3$ for potassium hydroxide, and 0.1 to 0.8 mol/dm$^3$ for lithium hydroxide, because then it is possible to securely obtain a battery exhibiting a high battery performance.

The construction of a nickel metal-hydride battery of the invention is not limited to any specific one, but generally suitable batteries may include coin batteries, button batteries, square-shaped batteries, flat batteries, etc. comprising a negative electrode, a positive electrode, and a separator having a single or multiple layer structure. A cylindrical battery in which housed is a rolled electrode assembly comprising a positive electrode sheet and a negative electrode sheet with a separator sheet in between tightly rolled together, is preferred because it can manage with comparatively few polar plates, and have polar plates having a comparatively large area.

A sealed nickel metal-hydride storage battery of the invention may be preferably obtained, for example, by injecting electrolyte before or after the positive electrode and separator and negative electrode are stacked, and finally sealing using a wrapping member. In the manufacture of a sealed nickel metal-hydride battery with a electrode assembly obtained by rolling a stack of a positive and negative electrodes with a separator in between tightly together, electrolyte is preferably injected into the electrode assembly both before and after the stack is rolled. As injecting method of the electrolyte, injecting the electrolyte under normal pressure may be used, but it is also possible to be used that the electrolyte is injected under vacuum or under positive pressure or using centrifugal force.

Suitable materials of a container of a sealed nickel metal-hydride battery may include, for example, nickel-plated iron, stainless steel, polyolefin resins, etc.

As shown in FIG. 1, for a cylindrical nickel metal-hydride battery of the invention, a lead connects an internal surface of a cap 6 which serves as one out of a positive and negative electrodes, a sealing plate 0, with an upper current collecting plate 2. According to the invention, as shown in FIG. 1, a electrode assembly 1 having an upper current collecting plate 2 and a lower current collecting plate 3 attached thereto is placed in a metal container 4 with a bottom; a specified amount of electrolyte is injected into the trough, thereby electrically connecting the lower current collecting plate 3 with the inner surface of the bottom of container 4; then one end of the lead is connected to the internal surface of sealing plate (in the particular example shown in FIG. 2, the lead consists of a main lead 8 and supplementary lead 9); a cap 6 with a valve 7 to act as a safety valve is attached to one electrode of the battery, and a sealing plate 0 with a gasket 5 along its periphery is applied on the upper surface of upper current collecting plate and the open end of container 4 is folded to hold the gasket tightly; then one output terminal A (also called electrode rod) of an electric resistance welder is connected to the external surface of sealing plate 0 (or cap 6) while the other output terminal B is connected to the outer surface of the bottom of container 4, and electric current which is sufficiently strong for welding is passed through the battery, thereby welding the connection between the lead and the upper current collecting plate 2.

As seen from above, since the joint between the lead and the upper current collecting plate 2 is welded after the sealing plate is applied to the open end of container, it is not necessary to use a lead having an extra curvature as is observed in a conventional battery, in other words, it is possible to connect the two elements here concerned via a lead shorter than a corresponding lead of a conventional battery, thus reducing the electric resistance of the lead as compared with a lead of a conventional battery. To obtain a battery having an output power performance of 1400 W/kg or more which is necessary to serve as powder source of HEVs as described above, the ratio of the length of current collecting lead against the distance between sealing plate 0 and upper current collecting plate 2 is preferably 2.1 or less, more preferably 1.7 or less, in which the length of current collecting lead is defined as the length of lead from a welded point between a distal end of the current collecting lead and a welded point P1 between a central end of the same lead and upper current collecting plate 2. The electric current passing through a battery for welding as described above is preferably in the form of alternate pulses because such an electric current will not decompose the electrolyte during passage.

Figure 2:
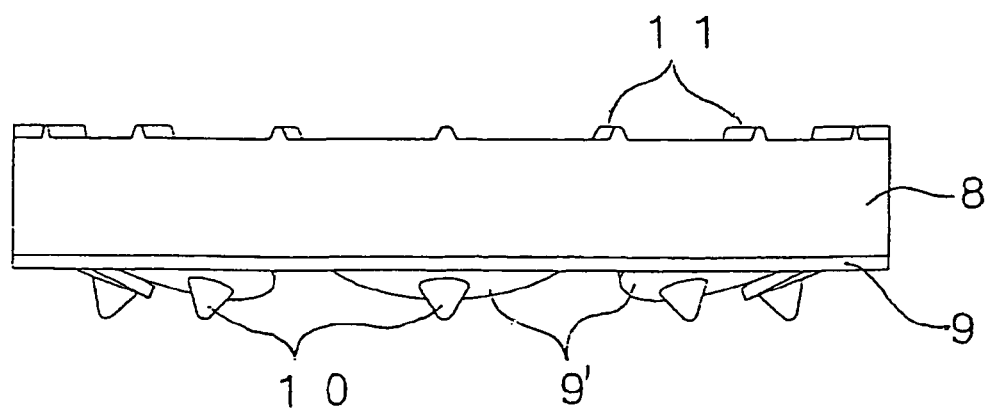
FIG. 2 shows an exemplary current collecting lead to be applied to a nickel metal-hydride battery of the invention.

An embodiment of the aforementioned lead is shown in FIG. 2. The lead comprises, for example, a ring-shaped main lead 8 and a supplementary lead 9. The main lead 8 has, on its distal end surface, a plurality of projections 11 for ensuring the secure contact of the lead to the sealing plate after electric resistance welding is performed, and is connected, through its central end surface, to the supplementary lead 9. The supplementary lead 9 consists of a plurality of jutted chips 9' which protrude from the ring-shaped central end of main lead 8 inward (or outward), and each jutted chip 9' has a knob 10 on its tip for ensuring the secure contact when electric resistance welding is performed for connecting the jutted chip to the upper current collecting plate 2. The jutted chip 9' is slanted downward from the main lead 8 as shown in FIG. 2, and is elastically responsive to up-to-down and down-to-up deformations. Even when the electrode assembly 1 have different heights from one to another (variance in height), and the jutted chip is pushed upward by a different pressure each time the electrode assembly is changed from one to another, the jutted chip, owing to its elasticity, ensures the secure contact between the knob 10 and the upper current collecting plate 2, which helps to achieve a secure electric connection of the lead to upper current collecting plate 2 by electric resistance welding.

Figure 3:
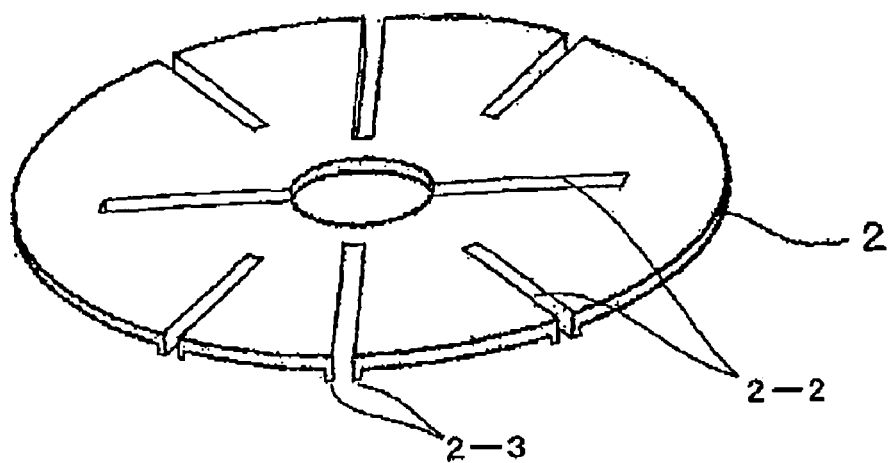
FIG. 3 shows an exemplary upper current collecting plate to be applied to a nickel metal-hydride battery of the invention.
Figure 4:
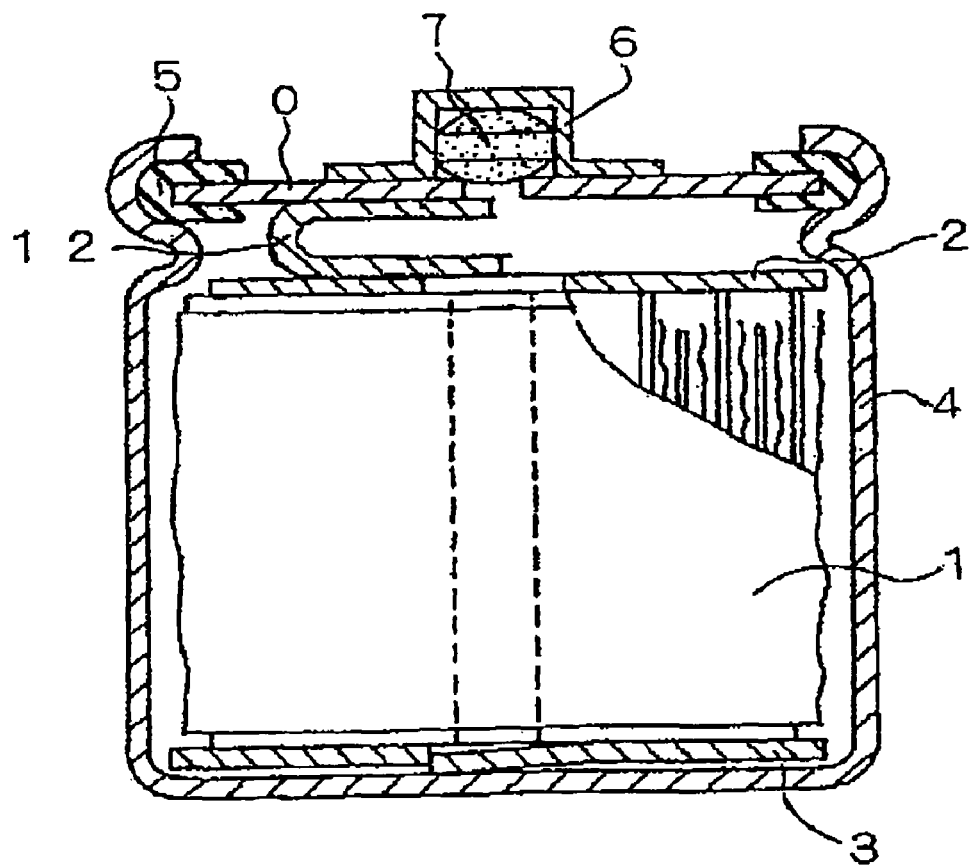
FIG. 4 is a schematic diagram for showing the sectional structure of a conventional cylindrical nickel metal-hydride battery with parts of key point.
Figure 5:
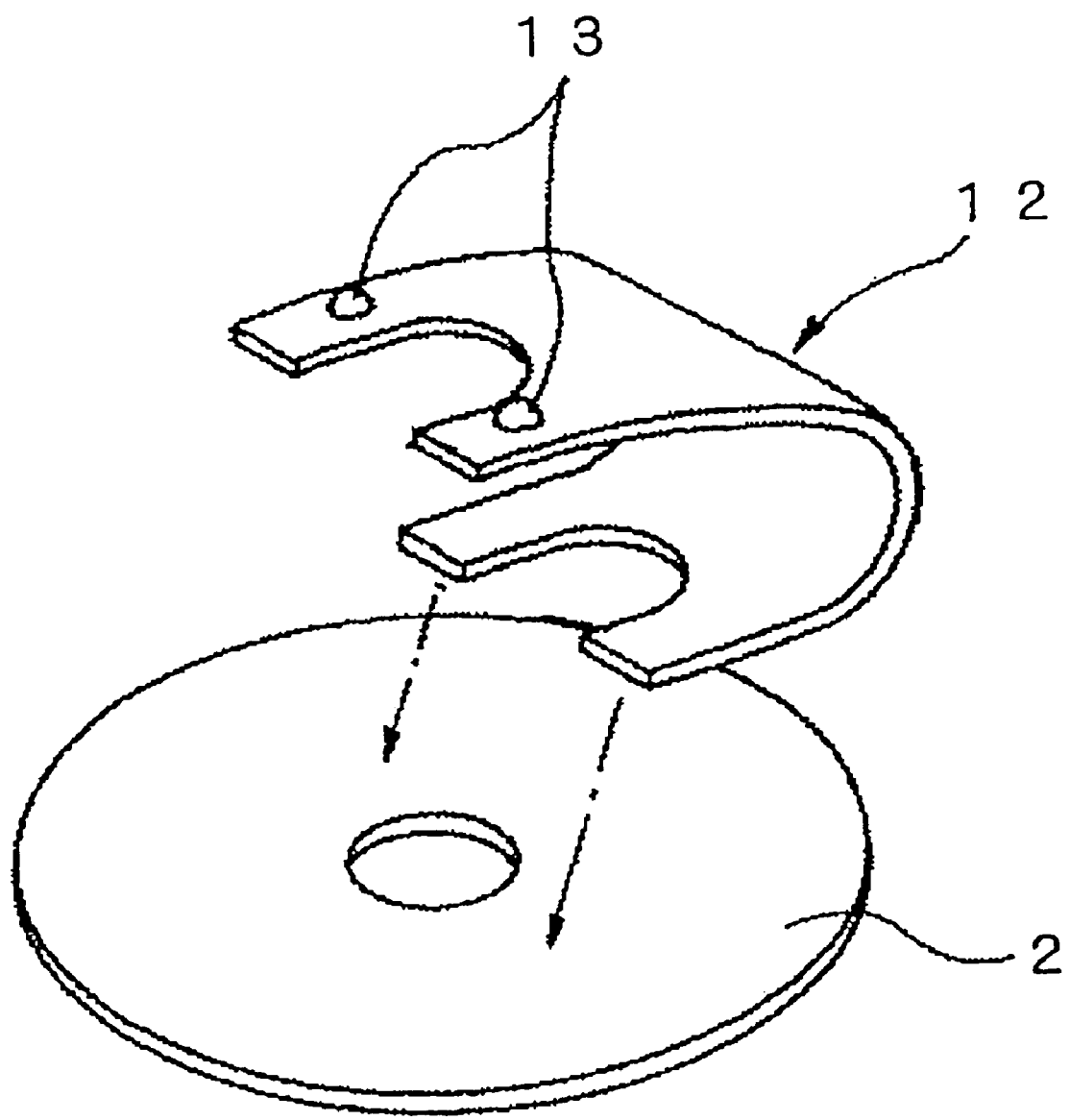
FIG. 5 is a schematic diagram for showing a ribbon-like current collecting lead.

As shown in FIG. 3, the upper current collecting plate 2 has a disc-like shape which has a through hole at its center with a plurality of slits 2-2 extending radially therefrom. The slits are provided to reduce ineffective current when the upper current collecting plate is connected to the end surface of electrode assembly by electric resistance welding. Each slit has two parallel ridges 2-3 along two edges facing to each other which intersect at right angles with the end surfaces of rolled electrode sheets constituting the electrode assembly and are brought into electric contact with the latter. To ensure the intimate contact of said ridges of slits to the end surface of long side of electrode sheets over the entire surface of said long side of electrode sheets, the upper current collecting plate 2 preferably has a radius similar to that of electrode assembly 1 (however, the periphery of upper current collecting plate dose not stick out from that of electrode assembly), and a center corresponding to that of the electrode assembly.

The lead is preferably connected to upper current collecting plate 2 via plural welded points (P1 of the FIG. 1) by welding. The appropriate number of welded points may vary depending on the size of a battery, and is not limited to any specific one, but it is preferably 2 to 16, more preferably 4 to 16. To minimize the difference of distance between electrode sheets and a given welded point, the plurality of welded points P2 are preferably arranged, at an equal distance apart from each other, along the periphery of one or more circles concentrically provided around the center of the current collecting plate. The ratio of the distance of a welded point P1 from the center of upper current collecting plate against the radius of electrode assembly 1 is preferably selected to be 0.4 to 0.7, because then the welded point takes a position corresponding to a middle point of the long side of electrode sheets which may enhance the current collecting function of the plate and lead to the enhanced output power performance of a battery.

A lower current collecting plate 3 and the inner surface of the bottom of container 4 are preferably connected via a plurality of welded points P2 diffusely excepting the center of lower current collecting plate as shown in FIG. 1. The lower current collecting plate 3 has a disc-like shape with a plurality of slits extending radially from the center, as does upper current collecting plate 2 described above. To ensure the intimate contact of lower current collecting plate 3 to the inner surface of the bottom of container 4, the plurality of projections 14 are provided not only on the peripheral surface of lower current collecting plate 2 but also at the center of the latter, in opposition to the projections provided on the upper current collecting plate 2. The appropriate number of projections 14 arranged on the periphery of lower current collecting plate may vary depending on the size of a battery, and is not limited to any specific one, but it is preferably 2 to 16, more preferably 4 to 16, because then it is possible to reduce the electric resistance between the lower current collecting plate and electric container 4. The ratio of the distance of the plurality of peripherally arranged welded points P2 from the center of lower current collecting plate against the radius of electrode assembly 1 is preferably selected to be 0.5 to 0.8, because then the welded points take positions corresponding to middle points of the long side of electrode sheets which may enhance the current collecting function of the electrode sheet and lead to the enhanced output power performance of a battery.

Best Mode For Carrying Out The Invention

The present invention will be further described below with reference to attached drawings, but the invention is never limited to those examples, and selection of a testing method, and of active materials for positive and negative electrodes of a battery, materials of the positive and negative electrodes, electrolytes, and materials of a separator, and the shape of a battery may be made as appropriate.

(1) Evaluation Based on test Cell Comprising a Hydrogen Absorbing Electrode

In Examples 1 to 23, and Comparative examples 1 to 15 below, evaluation was made on test cells comprising a hydrogen absorbing electrode.

EXAMPLE 1

Surface Modification Treatment of a Hydrogen Absorbing Alloy Powder (Pretreatment: Hydrogen Absorption)

A hydrogen absorbing alloy in the form of powder having an average diameter of 30 μm and belonging to an $AB_5$ type rare earth element system whose composition is represented by $MmNi_{3.55}Co_{0.6}Al_{0.3}Mn_{0.35}$ was heated at 100° C. for 10 hours under reduced pressure. The powder was then exposed at 60° C. for 15 minutes to a hydrogen atmosphere where the partial pressure of hydrogen was kept at 0.1 Mpa, to allow the powder to absorb hydrogen.

(1st Step: Immersion Treatment)

A 1 kg of the hydrogen absorbing alloy powder treated by the hydrogen absorption treatment was immersed in 1 l of an aqueous NaOH solution containing NaOH at 45 wt % and kept at 100° C. The immersion treatment was allowed to take place for 52 minutes. During the immersion treatment, the treatment solution was stirred to prevent the hydrogen absorbing powder from sinking to the bottom. During the treatment, the environment was controlled so that the temperature was kept within 100±3° C. and concentration of NaOH within 45±3 wt %.

(2nd Step: Separation of Hydroxides of Rare Earth Element for Removal)

After immersion treatment, the hydrogen absorbing alloy powder was separated by pressure filtration from the treatment solution, to which was added pure water having the same weight with that of the hydrogen absorbing alloy powder, and the resulting mixture was exposed for 10 minutes to an ultrasonic wave having the frequency of 28 kHz. Then, while the mixture was being stirred gently, pure water was injected below a stirred suspension layer and excess water was allowed to flow out, thereby purging hydroxides of rare earth metal liberated from the alloy powder for disposal. Then, reducing was continued until the pH of spilled water became pH10 or lower. The remaining mixture was filtered under pressure.

(3rd Step: Hydrogen Desorption 1)

Desorption of hydrogen was achieved by exposing the hydrogen absorbing alloy powder to water warmed to 80° C.

(4th Step: Hydrogen Desorption 2)

The warm water was filtered under pressure, and washed with water again. The alloy was cooled to 25° C., to which was added 4% hydrogen peroxide solution having the same weight with that of the alloy to desorb hydrogen.

(5th Step: Drying/Surface Oxidation)

The hydrogen absorbing alloy powder deprived of hydrogen was exposed to a hot blow of wind kept at 80° C. for 30 minutes.

(Measurement of Saturation Mass Susceptibility)

A 0.3 g of the dried hydrogen absorbing alloy powder was weighed precisely, charged in a sample holder, and placed in a magnetic field up to 5 kOe produced by a vibration sample magnetometer manufactured by Riken Electronics (model BHV-30) for measurement.

(Preparation of Hydrogen Absorbing Electrode Plate)

To 100 parts by weight of a hydrogen absorbing alloy powder having an average diameter (D50) of 1 μm, was added 1 part by weight of erbium oxide ($Er_2O_3$) for mixture. The mixture was mixed with a styrenebutadiene copolymer at a ratio of 99.35:0.65, which was dispersed in water containing a dispersant to form a paste. The paste was applied with a blade coater onto a nickel-plated punched steel plate made of a iron plate. The product was kept at 80° C. to be dried, and pressed to give a master plate for hydrogen absorbing electrode which was a square having a specified thickness and 44 mm×44 mm area. Incidentally, of the total weight of rare earth elements contained in $Er_2O_3$ mentioned above, Er accounted for 97%, and impurities consisted of trace amounts (0.5 to 1.5 wt %) of Dy, Ho, Tm, and Yb.

(Preparation of Test cell Comprising a Hydrogen Absorbing Electrode)

The master plate for hydrogen absorbing electrode was cut to give a plate having an area of 30×30 mm, and used as an electrode plate for a hydrogen absorbing electrode-based test cell having a capacity of about 470 mAh. To the electrode plate was connected a lead by spot welding. The hydrogen absorbing electrode was sandwiched by the separator, and the assembly was further sandwiched from outside by two nickel electrodes having a capacity two times as large as that of the hydrogen absorbing electrode to give a electrode assembly for evaluation of the test cell. The electrode assembly was placed in an open container, which was flooded by electrolyte, and a mercury/mercury oxide (Hg/HgO) reference electrode was inserted into the container flooded by electrolyte to serve as a hydrogen absorbing test cell (called a test cell hereinafter).

(Discharge Test: Determination of Discharge Capacity)

The test cell prepared as above was charged at 20° C. via 0.02 ItA to 25% of the capacity of the hydrogen absorbing electrode, and then charged via 0.1 ItA to 100% of the capacity of the hydrogen absorbing electrode. After 1 hour pause, the test cell was discharged via 0.2 ItA until the potential of the hydrogen absorbing electrode became −0.6 V versus the reference electrode. Then, the test cell was charged via 1 ItA to 120%, which was followed by 1 hour pause. Later, the test cell was discharged via 0.2 ItA to −0.6V versus the reference electrode. The above charge/discharge cycle was repeated four times. Based on the discharge capacity obtained from the fourth discharge cycle, the discharge capacity per 1 g of hydrogen absorbing alloy was determined by calculation.

EXAMPLE 2

A test cell was prepared in the same manner as in Example 1, except that the immersion treatment performed in the surface modification step (1st Step: immersion treatment) for modifying the surface of a hydrogen absorbing alloy powder took 1.3 hour, and the discharge capacity of the cell was determined. The cell was made Example 2.

EXAMPLE 3

A test cell was prepared in the same manner as in Example 1, except that the immersion treatment performed in the surface modification step (1st Step: immersion treatment) for modifying the surface of a hydrogen absorbing alloy powder took 1.8 hour, and the discharge capacity of the cell was determined. The cell was made Example 3.

EXAMPLE 4

A test cell was prepared in the same manner as in Example 1, except that the immersion treatment performed in the surface modification step (1st Step: immersion treatment) for modifying the surface of a hydrogen absorbing alloy powder took 2.5 hour, and the discharge capacity of the cell was determined. The cell was made Example 4.

EXAMPLE 5

A test cell was prepared in the same manner as in Example 1, except that the immersion treatment performed in the surface modification step (1st Step: immersion treatment) for modifying the surface of a hydrogen absorbing alloy powder took 3.5 hour, and the discharge capacity of the cell was determined. The cell was made Example 5

EXAMPLE 6

A test cell was prepared in the same manner as in Example 1, except that the immersion treatment performed in the surface modification step (1st Step: immersion treatment) for modifying the surface of a hydrogen absorbing alloy powder took 4.5 hour, and the discharge capacity of the cell was determined. The cell was made Example 6.

EXAMPLE 7

A test cell was prepared in the same manner as in Example 1, except that the immersion treatment performed in the surface modification step (1st Step: immersion treatment) for modifying the surface of a hydrogen absorbing alloy powder took 5.0 hour, and the discharge capacity of the cell was determined. The cell was made Example 7.

EXAMPLE 8

A test cell was prepared in the same manner as in Example 1, except that the immersion treatment performed in the surface modification step (1st Step: immersion treatment) for modifying the surface of a hydrogen absorbing alloy powder took 5.5 hour, and the discharge capacity of the cell was determined. The cell was made Example 8.

COMPARATIVE EXAMPLES 1-4

Test cells having the same composition with that of Example 1 were prepared, except that the immersion treatment for hydrogen absorbing alloy powder samples lasted 0 or 24 minutes, or 6 or 8 hours, and subjected to the same test. The cells were made Comparative examples 1 to 4.

Table 1 lists the test results of hydrogen absorbing alloy powders representing Examples 1 to 8, and Comparative examples 1 to 4 regarding their saturation mass susceptibility, and discharge capacity per 1 g of hydrogen absorbing alloy powder.

TABLE 1

| Classification | Treatment time (h) | Saturation mass susceptibility (emu/g) | Additive Chemical formula | Added amount | Capacity (mAh/g) |
| --- | --- | --- | --- | --- | --- |
| Example 1 | 0.87 | 1 | $Er_2O_3$ | 1 Part by weight | 315 |
| Example 2 | 1.3 | 1.5 | $Er_2O_3$ | 1 Part by weight | 315 |
| Example 3 | 1.8 | 2 | $Er_2O_3$ | 1 Part by weight | 315 |

TABLE 1-continued

| Classification | Treatment time (h) | Saturation mass susceptibility (emu/g) | Additive Chemical formula | Added amount | Capacity (mAh/g) |
|---|---|---|---|---|---|
| Example 4 | 2.5 | 3 | $Er_2O_3$ | 1 Part by weight | 315 |
| Example 5 | 3.5 | 4 | $Er_2O_3$ | 1 Part by weight | 304 |
| Example 6 | 4.5 | 5 | $Er_2O_3$ | 1 Part by weight | 290 |
| Example 7 | 5 | 6 | $Er_2O_3$ | 1 Part by weight | 277 |
| Example 8 | 5.5 | 6.5 | $Er_2O_3$ | 1 Part by weight | 270 |
| Comparative example 1 | 0 | 0.05 | $Er_2O_3$ | 1 Part by weight | 217 |
| Comparative example 2 | 0.4 | 0.5 | $Er_2O_3$ | 1 Part by weight | 304 |
| Comparative example 3 | 6 | 7 | $Er_2O_3$ | 1 Part by weight | 263 |
| Comparative example 4 | 8 | 10 | $Er_2O_3$ | 1 Part by weight | 220 |

According to the results shown in Table 1, the hydrogen absorbing alloy powder samples representing 1-3 Examples 1 to 4 have the same saturation mass susceptibility of 315 mAh/g which is the highest of all the test results. Both of Example 2 which has a saturation mass susceptibility of 4 emu/g and Comparative example 2 which has a saturation mass susceptibility of 0.5 emu/g show high saturation mass susceptibilities exceeding 300 mAh/g. Comparative example 1 which received no immersion treatment shows a saturation mass susceptibility of 217 mAh/g which is extremely low. As is evident by comparing the results of Examples 6 to 8, and Comparative examples 3 and 4 with each other, as the saturation mass susceptibility of a hydrogen absorbing alloy powder increases above 5 emu/g, its capacity declines with the increment.

For the test cells, their discharge capacity were determined for the fourth discharge cycle, and compared with each other. When the test was performed at such an early phase of charge/discharge cycle as above, a hydrogen absorbing alloy powder receiving no immersion treatment like Comparative example 1 has a low capacity, probably because the coat of oxides on the surface of alloy powder is not removed sufficiently which will interfere with the electrode reactions, and because the superficial layer is not formed on the surface of the powder which leads to the lowered activity of the powder.

The reason why the capacity of a hydrogen absorbing alloy powder decreases with the increment of its saturation mass susceptibility may be ascribed to the excess elution of rare earth elements contained in the hydrogen absorbing alloy powder as a result of immersion treatment which leads to the reduced hydrogen absorbing ability of the alloy powder.

When applications involve the low rate discharge (0.2 ItA) as was employed in the present test of test cells, the hydrogen absorbing electrode is preferably so constructed as to give a saturation mass susceptibility of 0.5 to 4 emu/g, more preferably 1 to 3 emu/g.

EXAMPLE 9

A test cell was prepared in the same manner as in Example 1, except that an ytterbium oxide ($Yb_2O_3$) powder having an average diameter (D50) of 1 μm was added to a hydrogen absorbing alloy powder instead of erbium oxide ($Er_2O_3$), and subjected to the same test. The cell was made Example 9. Incidentally, of the total weight of rare earth elements contained in $Yb_2O_3$ mentioned above, Yb accounted for 98.5%, and impurities consisted of trace amounts (0.5 wt %) of Er, Tm, and Lu.

EXAMPLE 10

A test cell was prepared in the same manner as in Example 2, except that an ytterbium oxide ($Yb_2O_3$) powder having an average diameter (D50) of 1 μm was added to a hydrogen absorbing alloy powder instead of erbium oxide ($Er_2O_3$), and subjected to the same test. The cell was made Example 10.

EXAMPLE 11

A test cell was prepared in the same manner as in Example 3, except that an ytterbium oxide ($Yb_2O_3$) powder having an average diameter (D50) of 1 μm was added to a hydrogen absorbing alloy powder instead of erbium oxide ($Er_2O_3$), and subjected to the same test. The cell was made Example 11.

EXAMPLE 12

A test cell was prepared in the same manner as in Example 4, except that an ytterbium oxide ($Yb_2O_3$) powder having an average diameter (D50) of 1 μm was added to a hydrogen absorbing alloy powder instead of erbium oxide ($Er_2O_3$), and subjected to the same test. The cell was made Example 12.

EXAMPLE 13

A test cell was prepared in the same manner as in Example 5, except that an ytterbium oxide ($Yb_2O_3$) powder having an average diameter (D50) of 1 μm was added to a hydrogen absorbing alloy powder instead of erbium oxide ($Er_2O_3$), and subjected to the same test. The cell was made Example 13.

EXAMPLE 14

A test cell was prepared in the same manner as in Example 6, except that an ytterbium oxide ($Yb_2O_3$) powder having an average diameter (D50) of 1 μm was added to a hydrogen absorbing alloy powder instead of erbium oxide ($Er_2O_3$), and subjected to the same test. The cell was made Example 14.

EXAMPLE 15

A test cell was prepared in the same manner as in Example 7, except that an ytterbium oxide ($Yb_2O_3$) powder having an average diameter (D50) of 1 μm was added to a hydrogen absorbing alloy powder instead of erbium oxide ($Er_2O_3$), and subjected to the same test. The cell was made Example 15.

EXAMPLE 16

A test cell was prepared in the same manner as in Example 8, except that an ytterbium oxide ($Yb_2O_3$) powder having an average diameter (D50) of 1 μm was added to a hydrogen absorbing alloy powder instead of erbium oxide ($Er_2O_3$), and subjected to the same test. The cell was made Example 16.

COMPARATIVE EXAMPLES 5-8

Test cells having the same composition with those of Comparative examples 1 to 4 were prepared, except that ytterbium oxide ($Yb_2O_3$) powders having an average diameter (D50) of 1 μm were added to hydrogen absorbing alloy powders instead of erbium oxide ($Er_2O_3$), and subjected to the same test. The cells were made Comparative examples 5 to 8.

Table 2 lists the test results of hydrogen absorbing alloy powders representing Examples 9 to 16, and Comparative examples 5 to 8 regarding their discharge capacity per 1 g of hydrogen absorbing alloy powder.

TABLE 2

| Classification | Treatment time (h) | Saturation mass susceptibility (emu/g) | Additive Chemical formula | Added amount | Capacity (mAh/g) |
| --- | --- | --- | --- | --- | --- |
| Example 9 | 0.87 | 1 | $Yb_2O_3$ | 1 Part by weight | 315 |
| Example 10 | 1.3 | 1.5 | $Yb_2O_3$ | 1 Part by weight | 315 |
| Example 11 | 1.8 | 2 | $Yb_2O_3$ | 1 Part by weight | 315 |
| Example 12 | 2.5 | 3 | $Yb_2O_3$ | 1 Part by weight | 315 |
| Example 13 | 3.5 | 4 | $Yb_2O_3$ | 1 Part by weight | 304 |
| Example 14 | 4.5 | 5 | $Yb_2O_3$ | 1 Part by weight | 290 |
| Example 15 | 5 | 6 | $Yb_2O_3$ | 1 Part by weight | 277 |
| Example 16 | 5.5 | 6.5 | $Yb_2O_3$ | 1 Part by weight | 270 |
| Comparative example 5 | 0 | 0.05 | $Yb_2O_3$ | 1 Part by weight | 202 |
| Comparative example 6 | 0.4 | 0.5 | $Yb_2O_3$ | 1 Part by weight | 304 |
| Comparative example 7 | 6 | 7 | $Yb_2O_3$ | 1 Part by weight | 263 |
| Comparative example 8 | 8 | 10 | $Yb_2O_3$ | 1 Part by weight | 220 |

According to the results shown in Table 2, the hydrogen absorbing alloy powders receiving the addition of ytterbium oxide ($Yb_2O_3$) show the results similar to those of hydrogen absorbing alloy powders receiving the addition of erbium oxide ($Er_2O_3$) that are shown in Table 1. From the results shown in Table 2 too, the hydrogen absorbing electrode is preferably so constructed as to give a saturation mass susceptibility of 0.5 to 4 emu/g, more preferably 1 to 3 emu/g to use in the low rate discharge (discharged via 0.2 ItA).

EXAMPLE 17

A test cell was prepared in the same manner as in Example 5, except that 0.3 part by weight of $Er_2O_3$ in the form of powder having an average diameter (D50) of 1 μm was added to 100 parts by weight of a hydrogen absorbing alloy powder, and subjected to the same test. The cell was made Example 17.

EXAMPLE 18

A test cell was prepared in the same manner as in Example 5, except that 0.5 part by weight of $Er_2O_3$ in the form of powder having an average diameter (D50) of 1 μm was added to 100 parts by weight of a hydrogen absorbing alloy powder, and subjected to the same test. The cell was made Example 18.

EXAMPLE 19

A test cell was prepared in the same manner as in Example 5, except that 0.7 part by weight of $Er_2O_3$ in the form of powder having an average diameter (D50) of 1 μm was added to 100 parts by weight of a hydrogen absorbing alloy powder, and subjected to the same test. The cell was made Example 19.

EXAMPLE 20

A test cell was prepared in the same manner as in Example 5, except that 1.5 part by weight of $Er_2O_3$ in the form of powder having an average diameter (D50) of 1 μm was added to 100 parts by weight of a hydrogen absorbing alloy powder, and subjected to the same test. The cell was made Example 20.

COMPARATIVE EXAMPLES 9-12

Test cells having the same composition with that of Example 5 were prepared, except that 0.1, 2, or 3 parts by weight of $Er_2O_3$ was added to 100 parts by weight of a hydrogen absorbing alloy powder, and subjected to the same test. The cells were made Comparative examples 9 to 12.

Table 3 lists the test results of hydrogen absorbing alloy powders representing Examples 17 to 20, and Comparative examples 9 to 12 regarding their discharge capacity per 1 g of hydrogen absorbing alloy powder.

TABLE 3

| Classification | Saturation mass susceptibility (emu/g) | Additive Chemical formula | Added amount | Capacity (mAh/g) |
| --- | --- | --- | --- | --- |
| Example 17 | 4 | $Er_2O_3$ | 0.3 Part by weight | 304 |
| Example 18 | 4 | $Er_2O_3$ | 0.5 Part by weight | 304 |
| Example 19 | 4 | $Er_2O_3$ | 0.7 Part by weight | 304 |
| Example 5 | 4 | $Er_2O_3$ | 1 Part by weight | 304 |
| Comparative example 9 | 4 | — | 0 | 304 |
| Example 20 | 4 | $Er_2O_3$ | 1.5 Part by weight | 304 |

TABLE 3-continued

| Classification | Saturation mass susceptibility (emu/g) | Additive Chemical formula | Added amount | Capacity (mAh/g) |
|---|---|---|---|---|
| Comparative example 10 | 4 | $Er_2O_3$ | 0.1 Part by weight | 304 |
| Comparative example 11 | 4 | $Er_2O_3$ | 2 Part by weight | 246 |
| Comparative example 12 | 4 | $Er_2O_3$ | 3 Part by weight | 182 |

According to the results shown in Table 3, being discharged via 0.2 ItA, the hydrogen absorbing electrode gave a large discharge capacity exceeding 300 mAh/g, when $Er_2O_3$ was added at 1.5 or less part by weight with respect to 100 parts by weight of hydrogen absorbing alloy powder. In contrast, for Comparative examples 11 and 12 in which $Er_2O_3$ was added at 2 and 3 parts by weight, respectively, with respect to 100 parts by weight of hydrogen absorbing alloy powder, the hydrogen absorbing electrode gave a small discharge capacity below 250 mAh/g. The low discharge capacity of Comparative example 11 may be ascribed to the addition of $Er_2O_3$ (after being incorporated in a battery, $Er_2O_3$ was likely to be converted for the most part into $Er(OH)_3$) which will interfere with the conductivity of electrons and migration of charge through the hydrogen absorbing electrode. $Er_2O_3$ is preferably added at 1.5 part or less by weight with respect to 100 parts by weight of a hydrogen absorbing alloy, because as seen from the results of Comparative examples 11 and 12, if the added amount of $Er_2O_3$ exceeds the above range, the resulting electrode will not only exhibit a low discharge capacity even when discharged via 0.2 ItA, but also have its capacity greatly reduced when it discharge at high-rate.

EXAMPLE 21

A test cell was prepared in the same manner as in Example 13, except that 0.3 part by weight of $Yb_2O_3$ in the form of powder having an average diameter (D50) of 1 μm was added to 100 parts by weight of a hydrogen absorbing alloy powder, and subjected to the same test. The cell was made Example 21.

EXAMPLE 22

A test cell was prepared in the same manner as in Example 13, except that 0.5 part by weight of $Yb_2O_3$ in the form of powder having an average diameter (D50) of 1 μm was added to 100 parts by weight of a hydrogen absorbing alloy powder, and subjected to the same test. The cell was made Example 22.

EXAMPLE 23

A test cell was prepared in the same manner as in Example 13, except that 0.7 part by weight of $Yb_2O_3$ in the form of powder having an average diameter (D50) of 1 μm was added to 100 parts by weight of a hydrogen absorbing alloy powder, and subjected to the same test. The cell was made Example 23.

EXAMPLE 24

A test cell was prepared in the same manner as in Example 13, except that 1.5 part by weight of $Yb_2O_3$ in the form of powder having an average diameter (D50) of 1 μm was added to 100 parts by weight of a hydrogen absorbing alloy powder, and subjected to the same test. The cell was made Example 24.

COMPARATIVE EXAMPLES 13-15

Test cells having the same composition with that of Example 13 were prepared, except that 0.1, 2, or 3 parts by weight of $Yb_2O_3$ powders having an average diameter (D50) of 1 μm were added to 100 parts by weight of hydrogen absorbing alloy powders, and subjected to the same test. The cells were made Comparative examples 13 to 15.

Table 4 lists the test results of hydrogen absorbing alloy powders representing Examples 21 to 24, and Comparative examples 13 to 15 regarding their discharge capacity per 1 g of hydrogen absorbing alloy powder.

| Classification | Saturation mass susceptibility (emu/g) | Additive Chemical formula | Added amount | Capacity (mAh/g) |
|---|---|---|---|---|
| Example 21 | 4 | $Yb_2O_3$ | 0.3 Part by weight | 304 |
| Example 22 | 4 | $Yb_2O_3$ | 0.5 Part by weight | 304 |
| Example 23 | 4 | $Yb_2O_3$ | 0.7 Part by weight | 304 |
| Example 13 | 4 | $Yb_2O_3$ | 1 Part by weight | 304 |
| Example 24 | 4 | $Yb_2O_3$ | 1.5 Part by weight | 304 |
| Comparative example 9 | 4 | — | 0 | 304 |
| Comparative example 13 | 4 | $Yb_2O_3$ | 0.1 Part by weight | 304 |

-continued

| Classification | Saturation mass susceptibility (emu/g) | Additive | | Capacity (mAh/g) |
|---|---|---|---|---|
| | | Chemical formula | Added amount | |
| Comparative example 14 | 4 | $Yb_2O_3$ | 2 Part by weight | 237 |
| Comparative example 15 | 4 | $Yb_2O_3$ | 3 Part by weight | 182 |

According to the results shown in Table 4, it is evident that $Yb_2O_3$ is preferably added at 1.5 part or less by weight with respect to 100 parts by weight of a hydrogen absorbing alloy, as with $Er_2O_3$. (2) Evaluation Based on Cylindrical Nickel Metal-Hydride Storage Battery In Examples 25 to 70, Comparative examples 16 to 32, and Reference examples 1 to 12 below, evaluation was made on test cells comprising a hydrogen absorbing electrode.

EXAMPLE 25

(Preparation of Hydrogen Absorbing Electrode)

A master plate applied to the test cell of Example 1 in paragraph (1), was cut to a size of 44 mm×130 mm which served as a hydrogen absorbing electrode. The capacity of the hydrogen absorbing electrode was 2950 mAh.

(Preparation of Nickel Electrode)

Nickel sulfate and zinc sulfate and cobalt sulfate were added at a specified ratio to water to give an aqueous solution, to which were added ammonium sulfate and an aqueous solution of caustic soda to produce a ammine complex. To the reaction system, under vigorous stirring, was further added as fall in drops as an aqueous solution of sodium hydroxide until the pH of the reaction system became pH 11 to 12, to thereby produce nickel hydroxide in the form of highly dense spherical particles in which nickel hydroxide, zinc hydroxide, and cobalt hydroxide coexisted at the weight ratio of 88.45:5.12:1.1. This served as a core mother material of the electrode.

The highly dense particles of nickel hydroxide were put into an alkaline aqueous solution whose pH had been adjusted to pH 10 to 13 with sodium hydroxide. To the resulting solution was added as fall in drops as an aqueous solution containing cobalt sulfate and ammonia at specified concentrations under stirring. During the addition, an aqueous solution of sodium hydroxide was added to the mixture as needed to maintain the pH of the mixture at pH 10 to 13. A superficial layer comprising mixed hydroxides including the hydroxides of cobalt was allowed to form on the surface of particles of nickel hydroxide by maintaining the pH of the mixture at pH 11 to 12 for 1 hour. The weight ratio of the mixed hydroxides comprising the superficial layer against the core mother material (to be referred to simply as core layer hereinafter) was 4.0 wt %.

A 50 g of nickel hydroxide powder in the form of particles whose surface carried a superficial layer comprising mixed hydroxides was put into an aqueous solution of 30 wt % (10 M/l) sodium hydroxide at 110° C., and the mixture was stirred thoroughly. Then, $K_2S_2O_8$ was added to the mixture in an amount in excess of an amount equivalent to the amount of the hydroxides of cobalt contained in the superficial layer, and evolution of oxygen gas from the superficial layer was confirmed. The active material particles were separated by filtration, washed with water, and dried.

To the active material particles was added an aqueous solution of carboxymethylcellulose (CMC) to give a paste in which the active particles and CMC solute were combined at the weight ratio of 99.5:0.5. The paste was applied to a nickel porous body having a surface density of 380 g/m² (Nickel Cellmet #8 manufactured by Sumitomo Electric Industries). Then, the body was dried at 80° C., and pressed into a plate having a specified thickness. The plate had its surface coated with Teflon (registered mark), and cut to give a rectangular plate of 44 mm in width and 98.5 mm in length (the area of non-coated strips being 4×7 mm) that has a capacity of 1800 mAh. This was used as a nickel positive electrode plate.

(Preparation of Cylindrical Storage Battery)

A plate of a hydrogen absorbing electrode prepared as above, a sheet of non-woven textile having a thickness of 110 μm and comprising sulfonated polypropylene which serves as a separator, and a nickel electrode plate prepared as above were combined one over another, and rolled together to form a roll, into which was injected an electrolyte obtained by dissolving lithium hydroxide to an aqueous solution of 6.8 M/l potassium hydroxide to 0.8 M/l. Thus, an AA type cylindrical nickel metal-hydride storage battery was obtained that was equipped with a valve capable of opening to a pressure of 3 MPa.

(Chemical Activation)

A cylindrical nickel metal-hydride storage battery prepared as described above was left at 20° C. for 12 hours.

Then, the battery was charged to 600 mAh by passing 0.02 ItA, and then 0.1 ItA for 10 hours, discharged to 1V via 0.2 ItA, charged for 12 hours via 0.1 ItA, and discharged to 1V iva 0.2 ItA. This cycle was repeated twice.

Then, the battery was charged for 16 hours via 0.1 ItA, and discharged to 1V via 0.2 ItA. This cycle was repeated twice. The capacity of the battery obtained after the second discharge was taken as 100% discharge capacity of the battery obtained through the passage of 0.2 ItA.

(Test of High-Rate Discharge at Low Temperature)

A activated battery was charged for 16 hours via 0.1 ItA, left at 5° C. for 5 hours, and discharged to 0.8V via 3 ItA. The capacity of the battery obtained after the discharge was taken as a discharge capacity of the battery for 3 ItA discharge. Evaluation of the battery was performed by expressing the 3 ItA discharge capacity (%) relative to the 0.2 ItA discharge capacity (100%). For a battery to be used for applications requiring high output such as HEVs or electric motor-driven toolselectric motor-driven tools, it must have a relative discharge capacity equal to or more than 80%.

A activated battery was charged for 16 hours via 0.1 ItA, left at 5° C. for 5 hours, and discharged to 0.8V via 5 ItA. The capacity of the battery obtained after the discharge was taken as a discharge capacity of the battery for 5 ItA discharge. Evaluation of the battery was performed by expressing the 5 ItA discharge capacity (%) relative to the 0.2 ItA discharge capacity (100%). For a battery to be used for applications requiring high output such as HEVs or electric motor-driven tools, it is particularly preferred that the battery has a relative discharge capacity equal to or more than 80%.

A activated battery was charged for 16 hours via 0.1 ItA, left at 5° C. for 5 hours, and discharged to 0.8V via 8 ItA. The capacity of the battery obtained after the discharge was taken as a discharge capacity of the battery for 8 ItA discharge. Evaluation of the battery was performed by expressing the 8 ItA discharge capacity (%) relative to the 0.2 ItA discharge capacity (100%). For a battery to be used for applications requiring high output such as HEVs or electric motor-driven tools, it is particularly preferred that the battery has a relative discharge capacity equal to or more than 85%.

A activated battery was charged for 16 hours via 0.1 ItA, left at 5° C. for 5 hours, and discharged to 0.8V via 10 ItA. The capacity of the battery obtained after the discharge was taken as a discharge capacity of the battery for 10 ItA discharge. Evaluation of the battery was performed by expressing the 10 ItA discharge capacity (%) relative to the 0.2 ItA discharge capacity (100%). For a battery to be used for applications requiring high output such as HEVs or electric motor-driven tools, it is particularly preferred that the battery has a relative discharge capacity equal to or more than 80%.

Incidentally, batteries having relative discharge capacity less than 30% for all 3 to 10 ItA discharges when examined by a high-rate discharge test at low temperature as described above, were determined to be unable to discharge.

(Charge/Discharge Cycle Test)

Activated batteries were subjected to charge/discharge cycle test at 45° C. or 20° C.

Test under the ambient temperature of 45° C. was performed as follows. A test battery was charged via 1 ItA until −ΔV exhibited the variation of 5 mV, and then discharged via 1 ItA to 1.0 V. The above charge/discharge sequence was taken to form a cycle, and the cycle was repeated continuously until the discharge capacity of test battery declined below a level equal to 80% of the discharge capacity of the same battery subsequent to the first charge/discharge cycle, and the number of cycles delivered heretofore was taken to represent the cycle life of the battery.

Test under the ambient temperature of 20° C. was performed as follows. A test battery was charged via 0.5 ItA until −ΔV exhibited the variation of 5 mV, and then discharged via 0.5 ItA for 1.6 hours. The above charge/discharge sequence was taken to form a cycle, and the cycle was repeated continuously until the discharge voltage of test battery declined to 0.9 V, and the number of cycles delivered heretofore was taken to represent the cycle life of the battery.

The nickel metal-hydride storage battery is very tough on a hot ambient temperature. The cycle test under the ambient temperature of 45° C. was undertaken to evaluate the endurance of a test battery to a high ambient temperature. In the high ambient temperature test, a battery preferably has a cycle life equal to or more than 250 cycles, more preferably 300 cycles, most preferably 400 cycles. The cycle test under the ambient temperature of 20° C. was undertaken to evaluate the endurance of a test battery during the use at normal temperature.

EXAMPLE 26

A cylindrical nickel metal-hydride storage battery was prepared in the same manner as in Example 25, except that a master plate prepared as in Example 2 of the paragraph (1) was cut to give a rectangle having a size of 44×130 mm to serve as a hydrogen absorbing electrode. The battery was activated, and subjected to test. The battery was made Example 26.

EXAMPLE 27

A cylindrical nickel metal-hydride storage battery was prepared in the same manner as in Example 25, except that a master plate prepared as in Example 3 was cut to give a rectangle having a size of 44×130 mm to serve as a hydrogen absorbing electrode. The battery was activated, and subjected to test. The battery was made Example 27.

EXAMPLE 28

A cylindrical nickel metal-hydride storage battery was prepared in the same manner as in Example 25, except that a master plate prepared as in Example 4 of the paragraph (1) was cut to give a rectangle having a size of 44×130 mm to serve as a hydrogen absorbing electrode. The battery was activated, and subjected to test. The battery was made Example 28.

EXAMPLE 29

A cylindrical nickel metal-hydride storage battery was prepared in the same manner as in Example 25, except that a master plate prepared as in Example 5 of the paragraph (1) was cut to give a rectangle having a size of 44×130 mm to serve as a hydrogen absorbing electrode. The battery was activated, and subjected to test. The battery was made Example 29.

EXAMPLE 30

A cylindrical nickel metal-hydride storage battery was prepared in the same manner as in Example 25, except that a master plate prepared as in Example 6 of the paragraph (1) was cut to give a rectangle having a size of 44×130 mm to serve as a hydrogen absorbing electrode. The battery was activated, and subjected to test. The battery was made Example 30.

EXAMPLE 31

A cylindrical nickel metal-hydride storage battery was prepared in the same manner as in Example 25, except that a master plate prepared as in Example 7 of the paragraph (1) was cut to give a rectangle having a size of 44×130 mm to serve as a hydrogen absorbing electrode. The battery was activated, and subjected to test. The battery was made Example 31.

EXAMPLE 32

A cylindrical nickel metal-hydride storage battery was prepared in the same manner as in Example 25, except that a master plate prepared as in Example 8 of the paragraph (1) was cut to give a rectangle having a size of 44×130 mm to serve as a hydrogen absorbing electrode. The battery was activated, and subjected to test. The battery was made Example 32.

COMPARATIVE EXAMPLES 16-19

Cylindrical nickel metal-hydride storage batteries having the same composition with that of Example 25 were prepared, except that master plates for the hydrogen absorbing electrodes of test cells of Comparative examples 1 to 4 were used as hydrogen absorbing electrodes, and subjected to the same test. The batteries were made Comparative examples 16 to 19.

Table 5 lists the test results of cylindrical nickel metal-hydride storage batteries representing Examples 25 to 32, and Comparative examples 16 to 19.

TABLE 5

| Classification | Saturation mass susceptibility (emu/g) | Additive Chemical formula | Additive Added amount | High-rate discharging ability at low temperature (5° C.) 10 ItA discharge | High-rate discharging ability at low temperature (5° C.) 8 ItA discharge | High-rate discharging ability at low temperature (5° C.) 5 ItA discharge | High-rate discharging ability at low temperature (5° C.) 3 ItA discharge | Cycle life 45° C. atmosphere | Cycle life 20° C. atmosphere |
|---|---|---|---|---|---|---|---|---|---|
| Example 25 | 1 | $Er_2O_3$ | 1 Part by weight | Unable to discharge | Unable to discharge | Unable to discharge | 90% | 464 | 1800 |
| Example 26 | 1.5 | $Er_2O_3$ | 1 Part by weight | Unable to discharge | Unable to discharge | Unable to discharge | 91% | 464 | 1800 |
| Example 27 | 2 | $Er_2O_3$ | 1 Part by weight | Unable to discharge | Unable to discharge | 89% | 92% | 464 | 1800 |
| Example 28 | 3 | $Er_2O_3$ | 1 Part by weight | Unable to discharge | Unable to discharge | 90% | 92% | 464 | 1800 |
| Example 29 | 4 | $Er_2O_3$ | 1 Part by weight | 84% | 87% | 91% | 92% | 417 | 1650 |
| Example 30 | 5 | $Er_2O_3$ | 1 Part by weight | 85% | 88% | 92% | 92% | 357 | 1400 |
| Example 31 | 6 | $Er_2O_3$ | 1 Part by weight | 84% | 88% | 92% | 92% | 301 | 1200 |
| Example 32 | 6.5 | $Er_2O_3$ | 1 Part by weight | Unable to discharge | 88% | 92% | 92% | 280 | 1050 |
| Comparative example 16 | 0.05 | $Er_2O_3$ | 1 Part by weight | Unable to discharge | Unable to discharge | Unable to discharge | Unable to discharge | 104 | 400 |
| Comparative example 17 | 0.5 | $Er_2O_3$ | 1 Part by weight | Unable to discharge | Unable to discharge | Unable to discharge | Unable to discharge | 417 | 1600 |
| Comparative example 18 | 7 | $Er_2O_3$ | 1 Part by weight | Unable to discharge | 88% | 91% | 92% | 241 | 950 |
| Comparative example 19 | 10 | $Er_2O_3$ | 1 Part by weight | Unable to discharge | Unable to discharge | 90% | 92% | 57 | 250 |

As shown in Table 5, Comparative examples 16 and 17 have a comparatively low high-rate discharge ability while Examples 25 to 32, and Comparative examples 18 and 19 have discharge capacity equal to or more than 90%. However, the cycle performance of Comparative examples 18 and 19 is poor. The low high-rate discharge ability at low temperature of Comparative examples 16 and 17 may be ascribed to the insufficient activation of hydrogen absorbing alloy powders incorporated in those batteries as is supported by the observation that the hydrogen absorbing alloy powders exhibit low saturation mass susceptibilities. The poor cycle performance of Comparative examples 18 and 19 may be ascribed to the insufficient insurance of charge reserve at a negative electrode (hydrogen absorbing electrode) as is suggested by the low discharge capacity of hydrogen absorbing alloy as is shown in Table 1 (Comparative examples 3 and 4).

From the fact that Examples 25 to 32 are excellent both in high-rate discharge ability at low temperature and cycle performance, it is known that a hydrogen absorbing electrode containing, as an additive, $Er_2O_3$ and having a saturation mass susceptibility of 1 to 6.5 meu/g is preferably used.

In view of improving the high-rate discharge ability at low temperature of a battery, preferred is the use of a hydrogen absorbing alloy powder having a saturation mass susceptibility of 2 to 6.5 emu/g, more preferably 4 to 6.5 emu/g, most preferably 4 to 6 emu/g. From this, for an $Er_2O_3$ added hydrogen absorbing alloy powder to be excellent in both high-rate discharging ability at low temperature and cycle performance, a hydrogen absorbing alloy powder preferably has a saturation mass susceptibility of 2 to 6 emu/g, more preferably 2 to 5 emu/g.

Incidentally, Examples 25 to 32, when subjected to cycle test at 20° C., exhibit a life over 1000 cycles, that is, excellent cycle performance.

EXAMPLE 33

A cylindrical nickel metal-hydride storage battery was prepared in the same manner as in Example 25, except that a master plate prepared as in Example 9 was cut to give a rectangle having a size of 44×130 mm to serve as a hydrogen absorbing electrode. The battery was activated, and subjected to test. The battery was made Example 33.

EXAMPLE 34

A cylindrical nickel metal-hydride storage battery was prepared in the same manner as in Example 25, except that a master plate prepared as in Example 10 was cut to give a rectangle having a size of 44×130 mm to serve as a hydrogen absorbing electrode. The battery was activated, and subjected to test. The battery was made Example 34.

EXAMPLE 35

A cylindrical nickel metal-hydride storage battery was prepared in the same manner as in Example 25, except that a master plate prepared as in Example 11 was cut to give a rectangle having a size of 44×130 mm to serve as a hydrogen absorbing electrode. The battery was activated, and subjected to test. The battery was made Example 35.

EXAMPLE 36

A cylindrical nickel metal-hydride storage battery was prepared in the same manner as in Example 25, except that a master plate prepared as in Example 12 was cut to give a rectangle having a size of 44×130 mm to serve as a hydrogen absorbing electrode. The battery was activated, and subjected to test. The battery was made Example 36.

EXAMPLE 37

A cylindrical nickel metal-hydride storage battery was prepared in the same manner as in Example 25, except that a master plate prepared as in Example 13 was cut to give a rectangle having a size of 44×130 mm to serve as a hydrogen absorbing electrode. The battery was activated, and subjected to test. The battery was made Example 37.

EXAMPLE 38

A cylindrical nickel metal-hydride storage battery was prepared in the same manner as in Example 25, except that a master plate prepared as in Example 14 was cut to give a rectangle having a size of 44×130 mm to serve as a hydrogen absorbing electrode. The battery was activated, and subjected to test. The battery was made Example 38.

EXAMPLE 39

A cylindrical nickel metal-hydride storage battery was prepared in the same manner as in Example 25, except that a master plate prepared as in Example 15 was cut to give a rectangle having a size of 44×130 mm to serve as a hydrogen absorbing electrode. The battery was activated, and subjected to test. The battery was made Example 39.

EXAMPLE 40

A cylindrical nickel metal-hydride storage battery was prepared in the same manner as in Example 25, except that a master plate prepared as in Example 16 was cut to give a rectangle having a size of 44×130 mm to serve as a hydrogen absorbing electrode. The battery was activated, and subjected to test. The battery was made Example 40.

COMPARATIVE EXAMPLES 20-23

Cylindrical nickel metal-hydride storage batteries having the same composition with those of Comparative examples 16 to 19 were prepared, except that master plates for the hydrogen absorbing electrodes of test cells of Comparative examples 5 to 8 were used as hydrogen absorbing electrodes, and subjected to the same test as was performed for Comparative examples 16 to 19. The batteries were made Comparative examples 20 to 23.

Table 6 lists the test results of cylindrical nickel metal-hydride storage batteries representing Examples 33 to 40, and Comparative examples 20 to 23.

are found among the high-rate discharging ability at low temperature, cycle performance, and saturation mass susceptibility of those electrodes. Specifically, from the fact that Examples 33 to 40 are excellent both in high-rate discharge ability at low temperature and cycle performance, it is known that a hydrogen absorbing electrode containing, as an additive, $Yb_2O_3$ and having a saturation mass susceptibility of 1 to 6.5 meu/g is preferably used.

As seen from the results shown in Table 6, the $Yb_2O_3$ added hydrogen absorbing electrode exhibits a more excellent cycle performance than the $Er_2O_3$ added hydrogen absorbing electrode whose test results are shown in Table 5, although its high-rate discharge ability at lower temperature is inferior to that of the latter.

With regard to $Yb_2O_3$ added hydrogen absorbing electrodes whose results are shown in Table 6, in view of improving the high-rate discharge ability at low temperature of a battery, preferred is the use of a hydrogen absorbing alloy powder having a saturation mass susceptibility of 3 to 6.5 emu/g, more preferably 5 emu/g. In view of improving the cycle performance of a battery, preferred is the use of a hydrogen absorbing alloy powder having a saturation mass susceptibility of 1 to 6.5 emu/g, more preferably 1 to 5 emu/g. Particularly, it is known that a battery incorporating a hydrogen absorbing alloy powder having a saturation mass susceptibility of 1 to 3 emu/g will exhibit a cycle performance over 500 cycle when examined by cycle test at an ambient temperature of 45° C. From this, for a $Yb_2O_3$ added hydrogen absorbing electrode to be excellent in both high-rate discharging ability at low temperature and cycle performance, a hydrogen absorbing alloy powder preferably has a saturation mass susceptibility of 3 to 5 emu/g.

Moreover, Examples 33 to 40, when subjected to cycle test at 20° C., exhibit a life over 1200 cycles, that is, excellent cycle performance.

EXAMPLE 41

A cylindrical nickel metal-hydride storage battery having the same composition with that of Example 29 was prepared,

TABLE 6

| Classification | Saturation mass susceptibility (emu/g) | Additive Chemical formula | Added amount | High-rate discharging ability at low temperature (5° C.) | | | | Cycle life 45° C. atmosphere | 20° C. atmosphere |
|---|---|---|---|---|---|---|---|---|---|
| | | | | 10 ItA discharge | 8 ItA discharge | 5 ItA discharge | 3 ItA discharge | | |
| Example 33 | 1 | $Yb_2O_3$ | 1 Part by weight | Unable to discharge | Unable to discharge | Unable to discharge | 89% | 522 | >2000 |
| Example 34 | 1.5 | $Yb_2O_3$ | 1 Part by weight | Unable to discharge | Unable to discharge | Unable to discharge | 90% | 522 | >2000 |
| Example 35 | 2 | $Yb_2O_3$ | 1 Part by weight | Unable to discharge | Unable to discharge | Unable to discharge | 91% | 522 | >2000 |
| Example 36 | 3 | $Yb_2O_3$ | 1 Part by weight | Unable to discharge | Unable to discharge | 89% | 92% | 522 | >2000 |
| Example 37 | 4 | $Yb_2O_3$ | 1 Part by weight | Unable to discharge | Unable to discharge | 90% | 92% | 469 | 1800 |
| Example 38 | 5 | $Yb_2O_3$ | 1 Part by weight | Unable to discharge | 87% | 89% | 91% | 402 | 1600 |
| Example 39 | 6 | $Yb_2O_3$ | 1 Part by weight | Unable to discharge | Unable to discharge | 89% | 91% | 339 | 1350 |
| Example 40 | 6.5 | $Yb_2O_3$ | 1 Part by weight | Unable to discharge | Unable to discharge | 89% | 91% | 305 | 1200 |
| Comparative example 20 | 0.05 | $Yb_2O_3$ | 1 Part by weight | Unable to discharge | Unable to discharge | Unable to discharge | Unable to discharge | 44 | 210 |
| Comparative example 21 | 0.5 | $Yb_2O_3$ | 1 Part by weight | Unable to discharge | Unable to discharge | Unable to discharge | Unable to discharge | 469 | 1550 |
| Comparative example 22 | 7 | $Yb_2O_3$ | 1 Part by weight | Unable to discharge | Unable to discharge | 89% | 90% | 272 | 1100 |
| Comparative example 23 | 10 | $Yb_2O_3$ | 1 Part by weight | Unable to discharge | Unable to discharge | Unable to discharge | 90% | 64 | 250 |

As shown in Table 6, for hydrogen absorbing electrodes made from hydrogen absorbing alloy powders to which $Yb_2O_3$ was added instead of $Er_2O_3$, similar relationships as are observed in $Er_2O_3$ added hydrogen absorbing electrodes except that a master plate for the hydrogen absorbing electrode of a test cell of Example 17 was used as a hydrogen absorbing electrode, and subjected to the same test. The battery was made Example 41.

EXAMPLE 42

A cylindrical nickel metal-hydride storage battery having the same composition with that of Example 29 was prepared, except that a master plate for the hydrogen absorbing electrode of a test cell of Example 18 was used as a hydrogen absorbing electrode, and subjected to the same test. The battery was made Example 42.

EXAMPLE 43

A cylindrical nickel metal-hydride storage battery having the same composition with that of Example 29 was prepared, except that a master plate for the hydrogen absorbing electrode of a test cell of Example 19 was used as a hydrogen absorbing electrode, and subjected to the same test. The battery was made Example 43.

EXAMPLE 44

A cylindrical nickel metal-hydride storage battery having the same composition with that of Example 29 was prepared, except that a master plate for the hydrogen absorbing electrode of a test cell of Example 20 was used as a hydrogen absorbing electrode, and subjected to the same test. The battery was made Example 44.

COMPARATIVE EXAMPLES 24-27

Cylindrical nickel metal-hydride storage batteries having the same composition with that of Example 29 were prepared, except that master plates for the hydrogen absorbing electrodes of test cells of Comparative examples 9 to 12 were used as a hydrogen absorbing electrode, and subjected to the same test. The batteries were made Comparative examples 24 to 27.

Table 7 lists the test results of cylindrical nickel metal-hydride storage batteries representing Example 29, Examples 41 to 44, and Comparative examples 24 to 27.

discharge abilities at low temperature inferior to those of Examples. It was found that Comparative examples 26 and 27 are less receptive to electricity during charging performed prior to discharging. This is probably because Comparative examples 26 and 27 are given $Er_2O_3$ in excess of appropriate amounts, which interferes with the electric conductivity and charge-transfer reactions through hydrogen absorbing electrodes, thus leading to the impaired high-rate discharge abilities at low temperature. As seen from this, the ratio of the added amount of rare earth elements with respect to the weight of a hydrogen absorbing alloy powder is an important factor for determining the high-rate discharge ability at low temperature and cycle performance of a resulting battery.

From the results shown in Table 7, for an $Er_2O_3$ added hydrogen absorbing electrode to be excellent in both high-rate discharging ability at low temperature and cycle performance, a hydrogen absorbing alloy powder preferably has 0.3 to 1.5, more preferably 0.7 to 1.5 part by weight of $Er_2O_3$ added, because then a resulting exhibits excellent cycle performance.

In the case of Comparative example 24, an excellent high-rate discharging ability at the initial of charge/discharge cycles was indicated as shown in Table 7, however, according to result of evaluating the high-rate discharging ability at low temperature in the middle of charge/discharge cycles performed at 45° C., it became unable to discharge at 3ItA when the charge/discharge sequence exceeded about 100 cycles, in contrast, Examples 41 and 42 after 250 cycles, and Examples 29 and 43 and 44 after 300 cycles exhibit cycle performances over 80% for 3 ItA discharge. As seen from this, although Comparative example 24 in which a hydrogen absorbing alloy powder was subjected only to alkaline immersion treatment has its high-rate performance declined with the progression of charge/discharge cycles, though the high-rate performance being at a high level at an initial phase of charge/discharge cycles, batteries prepared in Examples kept their

TABLE 7

| Classification | Saturation mass susceptibility (emu/g) | Additive Chemical formula | Added amount | High-rate discharging ability at low temperature (5° C.) | | | | Cycle life 45° C. atmosphere |
|---|---|---|---|---|---|---|---|---|
| | | | | 10 ItA discharge | 8 ItA discharge | 5 ItA discharge | 3 ItA discharge | |
| Example 41 | 4 | $Er_2O_3$ | 0.3 Part by weight | 84% | 87% | 91% | 92% | 349 |
| Example 42 | 4 | $Er_2O_3$ | 0.5 Part by weight | 84% | 87% | 91% | 92% | 334 |
| Example 43 | 4 | $Er_2O_3$ | 0.7 Part by weight | 84% | 87% | 91% | 92% | 405 |
| Example 29 | 4 | $Er_2O_3$ | 1 Part by weight | 84% | 87% | 91% | 92% | 417 |
| Example 44 | 4 | $Er_2O_3$ | 1.5 Part by weight | 80% | 84% | 89% | 90% | 422 |
| Comparative example 24 | 4 | — | 0 | 84% | 87% | 91% | 92% | 156 |
| Comparative example 25 | 4 | $Er_2O_3$ | 0.1 Part by weight | 84% | 87% | 91% | 92% | 160 |
| Comparative example 26 | 4 | $Er_2O_3$ | 2 Part by weight | Unable to discharge | Unable to discharge | Unable to discharge | Unable to discharge | 426 |
| Comparative example 27 | 4 | $Er_2O_3$ | 3 Part by weight | Unable to discharge | Unable to discharge | Unable to discharge | Unable to discharge | 410 |

As shown in Table 7, Examples 41 to 44 in which $Er_2O_3$ was added at 0.3 to 1 part by weight exhibit discharge capacity of 80% or more for 10 ItA discharge, which is as good as that of Example 29. They have a cycle life over 300 cycle when examined at 45° C. Particularly, Examples 43 and 44 exhibit an excellent cycle performance: their life cycle exceeds 400 cycles which is similar to that of Example 29. Comparative examples 26 and 27 in which $Er_2O_3$ was added at 2 and 3 parts by weight respectively exhibit high-rate excellent high-rate abilities from being impaired during the progression of charge/discharge cycles, that is, maintained their excellent high-rate abilities over a prolonged period.

EXAMPLE 45

A cylindrical nickel metal-hydride storage battery having the same composition with that of Example 37 was prepared, except that a master plate for the hydrogen absorbing electrode of a test cell of Example 21 was used as a hydrogen absorbing electrode, and subjected to the same test. The battery was made Example 45.

EXAMPLE 46

A cylindrical nickel metal-hydride storage battery having the same composition with that of Example 37 was prepared, except that a master plate for the hydrogen absorbing electrode of a test cell of Example 22 was used as a hydrogen absorbing electrode, and subjected to the same test. The battery was made Example 46.

EXAMPLE 47

A cylindrical nickel metal-hydride storage battery having the same composition with that of Example 37 was prepared, except that a master plate for the hydrogen absorbing electrode of a test cell of Example 23 was used as a hydrogen absorbing electrode, and subjected to the same test. The battery was made Example 47.

EXAMPLE 48

A cylindrical nickel metal-hydride storage battery having the same composition with that of Example 37 was prepared, except that a master plate for the hydrogen absorbing electrode of a test cell of Example 24 was used as a hydrogen absorbing electrode, and subjected to the same test. The battery was made Example 48.

COMPARATIVE EXAMPLES 28-30

Cylindrical nickel metal-hydride storage batteries having the same composition with that of Example 37 were prepared, except that master plates for the hydrogen absorbing electrodes of test cells of Comparative examples 13 to 15 were used as a hydrogen absorbing electrode, and subjected to the same test. The batteries were made Comparative examples 28 to 30.

Table 8 lists the test results of cylindrical nickel metal-hydride storage batteries representing Examples 45 to 48, and Comparative examples 24, and 28 to 30.

through addition of $Yb_2O_3$ to a hydrogen absorbing alloy powder. Specifically, to 100 parts by weight of a hydrogen absorbing alloy powder, $Yb_2O_3$ is preferably added at 0.3 to 1.5, most preferably at 0.7 to 1.5 part by weight, because then it is possible to obtain a hydrogen absorbing electrode exhibiting an excellent cycle performance. It was found that Comparative examples 29 and 30, like Comparative examples 26 and 27, are less receptive to electricity during charging performed prior to discharging.

EXAMPLE 49

A cylindrical nickel metal-hydride storage battery having the same composition with that of Example 29 was prepared, except that during the preparation of a master plate for a hydrogen absorbing electrode performed as in Example 29, $Dy_2O_3$ in the form of powder having an average diameter (D50) of 1 μm was used instead of $Er_2O_3$, and subjected to the same test. Incidentally, the $Dy_2O_3$ used here had a purity equal to or more than 95%. The battery was made Example 49.

EXAMPLE 50

A cylindrical nickel metal-hydride storage battery having the same composition with that of Example 29 was prepared, except that during the preparation of a master plate for a hydrogen absorbing electrode performed as in Example 29, $Ho_2O_3$ in the form of powder having an average diameter (D50) of 1 μm was used instead of $Er_2O_3$, and subjected to the same test. Incidentally, the $Ho_2O_3$ used here had a purity equal to or more than 95%. The battery was made Example 50.

Example 51

A cylindrical nickel metal-hydride storage battery having the same composition with that of Example 29 was prepared, except that during the preparation of a master plate for a hydrogen absorbing electrode performed as in Example 29, $Tm_2O_3$ in the form of powder having an average diameter

TABLE 8

| Classification | Saturation mass susceptibility (emu/g) | Additive Chemical formula | Added amount | High-rate discharging ability at low temperature (5° C.) | | | | Cycle life 45° C. atmosphere |
| --- | --- | --- | --- | --- | --- | --- | --- | --- |
| | | | | 10 ItA discharge | 8 ItA discharge | 5 ItA discharge | 3 ItA discharge | |
| Example 45 | 4 | $Yb_2O_3$ | 0.3 Part by weight | Unable to discharge | Unable to discharge | 90% | 92% | 314 |
| Example 46 | 4 | $Yb_2O_3$ | 0.5 Part by weight | Unable to discharge | Unable to discharge | 90% | 92% | 347 |
| Example 47 | 4 | $Yb_2O_3$ | 0.7 Part by weight | Unable to discharge | Unable to discharge | 90% | 92% | 420 |
| Example 37 | 4 | $Yb_2O_3$ | 1 Part by weight | Unable to discharge | Unable to discharge | 90% | 92% | 469 |
| Example 48 | 4 | $Yb_2O_3$ | 1.5 Part by weight | Unable to discharge | Unable to discharge | 85% | 89% | 474 |
| Comparative example 24 | 4 | — | 0 | 84% | 87% | 91% | 92% | 156 |
| Comparative example 28 | 4 | $Yb_2O_3$ | 0.1 Part by weight | 84% | 87% | 91% | 92% | 160 |
| Comparative example 29 | 4 | $Yb_2O_3$ | 2 Part by weight | Unable to discharge | Unable to discharge | Unable to discharge | Unable to discharge | 480 |
| Comparative example 30 | 4 | $Yb_2O_3$ | 3 Part by weight | Unable to discharge | Unable to discharge | Unable to discharge | Unable to discharge | 460 |

As shown in Table 8, the improvement in high-rate discharging ability at low temperature and cycle performance of a hydrogen absorbing electrode is brought about in the same manner as in the $Er_2O_3$ added hydrogen absorbing electrode, (D50) of 1 μm was used instead of $Er_2O_3$, and subjected to the same test. Incidentally, the $Tm_2O_3$ used here had a purity equal to or more than 95%. The battery was made Example 51.

EXAMPLE 52

A cylindrical nickel metal-hydride storage battery having the same composition with that of Example 29 was prepared, except that during the preparation of a master plate for a hydrogen absorbing electrode performed as in Example 29, $Lu_2O_3$ in the form of powder having an average diameter (D50) of 1 μm was used instead of $Er_2O_3$, and subjected to the same test. Incidentally, the $Lu_2O_3$ used here had a purity equal to or more than 95%. The battery was made Example 52.

COMPARATIVE EXAMPLES 31 and 32

Cylindrical nickel metal-hydride storage batteries having the same composition with that of Example 29 were prepared, except that during the preparation of a hydrogen absorbing electrode, $Y_2O_3$ or $Gd_2O_3$ in the form of powder having an average diameter (D50) of 1 μm was used instead of $Er_2O_3$, and subjected to the same test. The batteries were made Comparative examples 31 and 32.

Table 9 lists the test results of cylindrical nickel metal-hydride storage batteries representing Examples 29 and 37 and 49 to 52, and Comparative examples 24, and 31 and 32.

EXAMPLE 53

A cylindrical nickel metal-hydride storage battery having the same composition with that of Example 29 was prepared, except that during the preparation of a master plate for a hydrogen absorbing electrode performed as in Example 29, a mixture of 90 parts by weight of $Er_2O_3$ and 10 parts by weight of $Gd_2O_3$ in the form of powder having an average diameter (D50) of 1 μm was used instead of $Er_2O_3$, and subjected to the same test. The battery was made Example 53.

EXAMPLE 54

A cylindrical nickel metal-hydride storage battery having the same composition with that of Example 29 was prepared, except that during the preparation of a master plate for a hydrogen absorbing electrode performed as in Example 29, a mixture of 80 parts by weight of $Er_2O_3$ and 20 parts by weight of $Gd_2O_3$ in the form of powder having an average diameter (D50) of 1 μm was used instead of $Er_2O_3$, and subjected to the same test. The battery was made Example 54.

TABLE 9

| Classification | Saturation mass susceptibility (emu/g) | Additive Chemical formula | Additive Added amount | High-rate discharging ability at low temperature (5° C.) 10 ItA discharge | High-rate discharging ability at low temperature (5° C.) 8 ItA discharge | High-rate discharging ability at low temperature (5° C.) 5 ItA discharge | High-rate discharging ability at low temperature (5° C.) 3 ItA discharge | Cycle life 45° C. atmosphere |
|---|---|---|---|---|---|---|---|---|
| Example 49 | 4 | $Dy_2O_3$ | 1 Part by weight | Unable to discharge | 88% | 91% | 92% | 349 |
| Example 50 | 4 | $Ho_2O_3$ | 1 Part by weight | Unable to discharge | 88% | 92% | 92% | 334 |
| Example 29 | 4 | $Er_2O_3$ | 1 Part by weight | 84% | 87% | 91% | 92% | 417 |
| Example 51 | 4 | $Tm_2O_3$ | 1 Part by weight | Unable to discharge | 88% | 92% | 92% | 313 |
| Example 37 | 4 | $Yb_2O_3$ | 1 Part by weight | Unable to discharge | Unable to discharge | 90% | 92% | 469 |
| Example 52 | 4 | $Lu_2O_3$ | 1 Part by weight | Unable to discharge | Unable to discharge | 89% | 90% | 386 |
| Comparative example 24 | 4 | — | 0 | 84% | 87% | 91% | 92% | 156 |
| Comparative example 31 | 4 | $Y_2O_3$ | 1 Part by weight | Unable to discharge | 87% | 90% | 92% | 244 |
| Comparative example 32 | 4 | $Gd_2O_3$ | 2 Part by weight | Unable to discharge | Unable to discharge | Unable to discharge | 88% | 161 |

As shown in Table 9, the batteries of Examples 49, 29, 50, 51, 37 and 52 in which $Dy_2O_3$, $Er_2O_3$, $Ho_2O_3$, $Tm_2O_3$, $Yb_2O_3$, and $Lu_2O_3$ were added to respective hydrogen absorbing alloy powders are superior in cycle performance when examined at 45° C. to the battery of Comparative example 31 in which $Y_2O_3$ was added; and are superior in both high-rate discharging ability at low temperature and cycle performance at 45° C. to the battery of Comparative example 24 in which no rare earth element was added and Comparative example 32 in which $Gd_2O_3$ was added. It is evident, therefore, that addition of these oxides of the rare earth elements is effective for having the high-rate discharging ability and improving cycle performance of a nickel metal-hydride storage battery incorporating a hydrogen absorbing electrode containing, as an active material, hydrogen absorbing alloy.

From Table 9, it is known that the battery of Example 29 in which $Er_2O_3$ was added exhibits a particularly excellent high-rate discharging ability at low temperature as compared with other Examples in which rare earth elements other than $Er_2O_3$ were added.

From Table 9, it is further known that the battery of Example 37 in which $Yb_2O_3$ was added exhibits an excellent cycle performance as compared with other Examples in which rare earth elements other than $Yb_2O_3$ were added.

EXAMPLE 55

A cylindrical nickel metal-hydride storage battery having the same composition with that of Example 37 was prepared, except that during the preparation of a master plate for a hydrogen absorbing electrode performed as in Example 37, a mixture of 90 parts by weight of $Yb_2O_3$ and 10 parts by weight of $Gd_2O_3$ in the form of powder having an average diameter (D50) of 1 μm was used instead of $Yb_2O_3$, and subjected to the same test. The battery was made Example 55.

EXAMPLE 56

A cylindrical nickel metal-hydride storage battery having the same composition with that of Example 37 was prepared, except that during the preparation of a master plate for a hydrogen absorbing electrode performed as in Example 37, a mixture of 80 parts by weight of $Yb_2O_3$ and 20 parts by weight of $Gd_2O_3$ in the form of powder having an average diameter (D50) of 1 μm was used instead of $Yb_2O_3$, and subjected to the same test. The battery was made Example 56.

REFERENCE EXAMPLES 1 and 2

A cylindrical nickel metal-hydride storage battery having the same composition with that of Example 29 was prepared, except that during the preparation of a master plate for a hydrogen absorbing electrode performed as in Example 29, a mixture of 70 parts by weight of $Er_2O_3$ and 30 parts by weight of $Gd_2O_3$ in the form of powder having an average diameter (D50) of 1 μm was used instead of $Er_2O_3$, and subjected to the same test. The battery was made Reference example 1.

A cylindrical nickel metal-hydride storage battery having the same composition with that of Example 37 was prepared, except that during the preparation of a master plate for a hydrogen absorbing electrode performed as in Example 37, a mixture of 70 parts by weight of $Yb_2O_3$ and 30 parts by weight of $Gd_2O_3$ in the form of powder having an average diameter (D50) of 1 μm was used instead of $Yb_2O_3$, and subjected to the same test. The battery was made Reference example 2.

EXAMPLE 57

A cylindrical nickel metal-hydride storage battery having the same composition with that of Example 29 was prepared, except that during the preparation of a master plate for a hydrogen absorbing electrode performed as in Example 29, a mixture of 90 parts by weight of $Er_2O_3$ and 10 parts by weight of $Yb_2O_3$ in the form of powder having an average diameter (D50) of 1 μm was used instead of $Er_2O_3$, and subjected to the same test. The battery was made Example 57.

EXAMPLE 58

A cylindrical nickel metal-hydride storage battery having the same composition with that of Example 29 was prepared, except that during the preparation of a master plate for a hydrogen absorbing electrode performed as in Example 29, a mixture of 70 parts by weight of $Er_2O_3$ and 30 parts by weight of $Yb_2O_3$ in the form of powder having an average diameter (D50) of 1 μm was used instead of $Er_2O_3$, and subjected to the same test. The battery was made Example 58.

EXAMPLE 59

A cylindrical nickel metal-hydride storage battery having the same composition with that of Example 37 was prepared, except that during the preparation of a master plate for a hydrogen absorbing electrode performed as in Example 37, a mixture of 90 parts by weight of $Yb_2O_3$ and 10 parts by weight of $Er_2O_3$ in the form of powder having an average diameter (D50) of 1 μm was used instead of $Yb_2O_3$, and subjected to the same test. The battery was made Example 59.

EXAMPLE 60

A cylindrical nickel metal-hydride storage battery having the same composition with that of Example 37 was prepared, except that during the preparation of a master plate for a hydrogen absorbing electrode performed as in Example 37, a mixture of 70 parts by weight of $Yb_2O_3$ and 30 parts by weight of $Er_2O_3$ in the form of powder having an average diameter (D50) of 1 μm was used instead of $Yb_2O_3$, and subjected to the same test. The battery was made Example 60.

Table 10 lists the test results of cylindrical nickel metal-hydride storage batteries representing Examples 53 to 60, and Reference examples 1 and 2.

TABLE 10

| Classification | Saturation mass susceptibility (emu/g) | Additive Chemical formula | Weight ratio | Added amount | High-rate discharging ability at low temperature (5° C.) 10 ItA discharge | 8 ItA discharge | 5 ItA discharge | 3 ItA discharge | Cycle life 45° C. atmosphere |
|---|---|---|---|---|---|---|---|---|---|
| Example 53 | 4 | $Er_2O_3/Gd_2O_3$ | 90/10 | 1 Part by weight | 84% | 87% | 91% | 92% | 401 |
| Example 54 | 4 | $Er_2O_3/Gd_2O_3$ | 80/20 | 1 Part by weight | Unable to discharge | 88% | 91% | 92% | 333 |
| Reference example 1 | 4 | $Er_2O_3/Gd_2O_3$ | 70/30 | 1 Part by weight | Unable to discharge | Unable to discharge | 91% | 92% | 238 |
| Example 55 | 4 | $Yb_2O_3/Gd_2O_3$ | 90/10 | 1 Part by weight | Unable to discharge | Unable to discharge | 90% | 92% | 443 |
| Example 56 | 4 | $Yb_2O_3/Gd_2O_3$ | 80/20 | 1 Part by weight | Unable to discharge | Unable to discharge | 90% | 92% | 301 |
| Reference example 2 | 4 | $Yb_2O_3/Gd_2O_3$ | 70/30 | 1 Part by weight | Unable to discharge | Unable to discharge | 90% | 92% | 262 |
| Example 57 | 4 | $Er_2O_3/Yb_2O_3$ | 90/10 | 1 Part by weight | 81% | 84% | 91% | 92% | 419 |
| Example 58 | 4 | $Er_2O_3/Yb_2O_3$ | 70/30 | 1 Part by weight | Unable to discharge | Unable to discharge | 91% | 92% | 427 |
| Example 59 | 4 | $Yb_2O_3/Er_2O_3$ | 90/10 | 1 Part by weight | Unable to discharge | Unable to discharge | 91% | 92% | 448 |
| Example 60 | 4 | $Yb_2O_3/Er_2O_3$ | 70/30 | 1 Part by weight | Unable to discharge | Unable to discharge | 91% | 92% | 435 |

As shown in Table 10, the battery representing Reference example 1 in which the relative content of Er, out of the rare earth elements contained in oxides of rare earth elements added to an hydrogen absorbing alloy powder is 70 wt % is inferior both in high-rate discharging ability at low temperature and cycle performance, as compared with Examples 53 and 54 in which the relative contents of Er are 90 and 80 wt %, respectively.

The battery representing Reference example 2 in which the relative content of Yb is 70 wt % is inferior in cycle performance, as compared with the batteries representing Examples 55 and 56 in which the relative contents of Yb is 90 and 80 wt %, respectively.

As seen from above, it is seen that the effect of adding Er, Yb is remarkable and it is possible to obtain a hydrogen absorbing electrode and a nickel metal-hydride storage battery which are superior in high-rate discharging ability at low temperature and cycle performance, when the relative content of Er, Yb out of rare earth elements contained in oxides of rare earth elements added to an hydrogen absorbing alloy powder is 80 wt % or more, particularly 90 wt % or more In contrast, if the addition amount of Er or Yb is below 80 wt % of purity, the effect obtainable from the addition of Er or Yb will hardly be obtained.

When the oxide of a rare earth element such as $Dy_2O_3$, $Ho_2O_3$, $Tm_2O_3$, $Yb_2O_3$, or $Lu_2O_3$ is added to a hydrogen absorbing alloy powder, its addition amount should also be adjusted such that the relative content of the rare earth element becomes preferably 80 wt % or more, more preferably 90 wt % or more, although the reason for this will not be detailed here.

The battery of Example 57 to 60 in which a mixture of 90 parts by weight of $Er_2O_3$ and 10 parts by weight of $Yb_2O_3$ was added to a hydrogen absorbing alloy powder as shown in Table 10, is somewhat improved in its cycle performance as compared with the battery of Example 29 whose test results are shown in Table 5, indicating the addition of rare earth elements leading to improvement of the performance of a resulting battery. In contrast, the battery of Example 58 in which a mixture of 70 parts by weight of $Er_2O_3$ and 30 parts by weight of $Yb_2O_3$ was added did not show a notable improvement in its high-rate discharging ability at low temperature, an effect characteristically observed for the addition of a rare earth element.

The battery of Example 59 in which a mixture of 90 parts by weight of $Yb_2O_3$ and 10 parts by weight of $Er_2O_3$ was added to a hydrogen absorbing alloy powder is somewhat improved in its high-rate discharging ability at low temperature, though somewhat degraded in cycle performance as compared with the battery of Example 37 whose test results are shown in Table 6, indicating the addition of rare earth elements leading to improvement of the performance of a resulting battery. In contrast, the battery of Example 60 in which a mixture of 70 parts by weight of $Yb_2O_3$ and 30 parts by weight of $Er_2O_3$ was added did not show a notable improvement in its high-rate discharging ability at low temperature, an effect characteristically observed for the addition of a rare earth element. Thus, to obtain effects characteristic with the addition of Er, Yb, it is preferred to use Er, Yb alone, even if rare earth elements are mixed and added, the relative content (weight ratio) of Er, Yb to added rare earth elements is preferably 90 wt % or more.

EXAMPLE 61

A sealed nickel metal-hydride storage battery including its hydrogen absorbing alloy powder with a saturation mass susceptibility having the same composition and property with those of Example 29 was prepared, except that a hydrogen absorbing alloy powder having an average diameter of 10 μm was used, and subjected to the same test. The battery was made Example 61.

EXAMPLE 62

A sealed nickel metal-hydride storage battery including its hydrogen absorbing alloy powder with a saturation mass susceptibility having the same composition and property with those of Example 29 was prepared, except that during the preparation of a hydrogen absorbing electrode, a hydrogen absorbing alloy powder having an average diameter of 20 μm was used, and subjected to the same test. The battery was made Example 62.

REFERENCE EXAMPLES 3-5

Sealed nickel metal-hydride storage batteries including their hydrogen absorbing alloy powders with a saturation mass susceptibility having the same composition and property with those of Example 29 were prepared, except that during the preparation of a hydrogen absorbing electrode, hydrogen absorbing alloy powders having an average diameter of 5, 40, and 50 μm were used, and subjected to the same test. The batteries were made Reference examples 3 to 5.

EXAMPLE 63

A sealed nickel metal-hydride storage battery including its hydrogen absorbing alloy powder with a saturation mass susceptibility having the same composition and property with those of Example 37 was prepared, except that during the preparation of a hydrogen absorbing electrode, a hydrogen absorbing alloy powder having an average diameter of 10 μm was used, and subjected to the same test. The battery was made Example 63.

EXAMPLE 64

A sealed nickel metal-hydride storage battery including its hydrogen absorbing alloy powder with a saturation mass susceptibility having the same composition and property with those of Example 37 was prepared, except that during the preparation of a hydrogen absorbing electrode, a hydrogen absorbing alloy powder having an average diameter of 20 μm was used, and subjected to the same test. The battery was made Example 64.

REFERENCE EXAMPLES 6-8

Sealed nickel metal-hydride storage batteries including their hydrogen absorbing alloy powders with a saturation mass susceptibility having the same composition and property with those of Example 37 were prepared, except that during the preparation of a hydrogen absorbing electrode, hydrogen absorbing alloy powders having an average diameter of 5, 40, and 50 μm were used, and subjected to the same test. The batteries were made Reference examples 6 to 8.

Table 11 lists the test results of cylindrical nickel metal-hydride storage batteries representing Examples 61 to 64, and Reference examples 3 to 8, together with those of Example 29 and 37.

TABLE 11

| Classification | Average particle diameter (μm) | Treatment time | Saturation mass susceptibility (emu/g) | Additive Chemical formula | Added amount | High-rate discharging ability at low temperature (5° C.) | | | |
|---|---|---|---|---|---|---|---|---|---|
| | | | | | | 10 ItA discharge | 8 ItA discharge | 5 ItA discharge | 3 ItA discharge |
| Example 61 | 10 | 2.0 | 4 | $Er_2O_3$ | 1 Part by weight | 89% | 91% | 92% | 92% |
| Example 62 | 20 | 3.0 | 4 | $Er_2O_3$ | 1 Part by weight | 86% | 89% | 91% | 92% |
| Example 29 | 30 | 3.5 | 4 | $Er_2O_3$ | 1 Part by weight | 84% | 87% | 91% | 92% |

TABLE 11-continued

| Classification | Average particle diameter (μm) | Treatment time | Saturation mass susceptibility (emu/g) | Additive Chemical formula | Added amount | High-rate discharging ability at low temperature (5° C.) 10 ItA discharge | 8 ItA discharge | 5 ItA discharge | 3 ItA discharge |
|---|---|---|---|---|---|---|---|---|---|
| Reference example 3 | 5 | 1.0 | 4 | $Er_2O_3$ | 1 Part by weight | 90% | 91% | 92% | 92% |
| Reference example 4 | 40 | 4.0 | 4 | $Er_2O_3$ | 1 Part by weight | Unable to discharge | Unable to discharge | 90% | 92% |
| Reference example 5 | 50 | 6.0 | 4 | $Er_2O_3$ | 1 Part by weight | Unable to discharge | Unable to discharge | Unable to discharge | 91% |
| Example 63 | 10 | 2.0 | 4 | $Yb_2O_3$ | 1 Part by weight | 86% | 89% | 91% | 92% |
| Example 64 | 20 | 3.0 | 4 | $Yb_2O_3$ | 1 Part by weight | 84% | 87% | 91% | 92% |
| Example 37 | 30 | 3.5 | 4 | $Yb_2O_3$ | 1 Part by weight | Unable to discharge | Unable to discharge | 90% | 92% |
| Reference example 6 | 5 | 1.0 | 4 | $Yb_2O_3$ | 1 Part by weight | 89% | 91% | 92% | 92% |
| Reference example 7 | 40 | 4.0 | 4 | $Yb_2O_3$ | 1 Part by weight | Unable to discharge | Unable to discharge | 90% | 92% |
| Reference example 8 | 50 | 6.0 | 4 | $Yb_2O_3$ | 1 Part by weight | Unable to discharge | Unable to discharge | Unable to discharge | 91% |

According to the results shown in Table 11, it is evident that a hydrogen absorbing alloy powder having an average diameter of 10 to 30 μm is preferably used, because then it is possible to obtain a battery excellent both in high-rate discharging ability at low temperature and cycle performance, and that it is more preferable to use a hydrogen absorbing alloy powder having an average diameter of 20 to 30 μm, because then it is possible to obtain a battery particularly excellent in cycle performance. In contrast, the batteries of Reference examples 3 and 6 in which a hydrogen absorbing alloy powder having an average diameter of 5 μm was used is inferior in cycle performance, although their high-rate discharging ability at low temperature is excellent. On the other hand, the batteries of Reference examples 4 and 7 in which a hydrogen absorbing alloy powder having an average diameter of 40 μm was used, and of Reference examples 5 and 8 in which a hydrogen absorbing alloy powder having an average diameter of 50 μm was used, were all inferior in high-rate discharging ability at low temperature, as compared with the batteries of Examples.

REFERENCE EXAMPLES 9 and 10

A test cell including its hydrogen absorbing electrode with a saturation mass susceptibility having the same composition and property with those of Example 5 was prepared, except that during the preparation of a hydrogen absorbing electrode, a hydrogen absorbing alloy powder which had been immersed in an aqueous KOH solution containing 28 wt % KOH at 100° C. for 2 hours was used, and subjected to the same test. The test cell was made Reference example 9.

A test cell including its hydrogen absorbing electrode with a saturation mass susceptibility having the same composition and property with those of Example 5 was prepared, except that during the preparation of a hydrogen absorbing electrode, a hydrogen absorbing alloy powder which had been immersed in an aqueous LiOH solution containing 10 wt % LiOH at 100° C. for 24 hours was used, and subjected to the same test. The test cell was made Reference example 10.

REFERENCE EXAMPLES 11 and 12

A test cell including its hydrogen absorbing electrode with a saturation mass susceptibility having the same composition and property with those of Example 13 was prepared, except that during the preparation of a hydrogen absorbing electrode, a hydrogen absorbing alloy powder which had been immersed in an aqueous KOH solution containing 28 wt % KOH at 100° C. for 2 hours was used, and subjected to the same test. The test cell was made Reference example 11.

A test cell including its hydrogen absorbing electrode with a saturation mass susceptibility having the same composition and property with those of Example 13 was prepared, except that during the preparation of a hydrogen absorbing electrode, a hydrogen absorbing alloy powder which had been immersed in an aqueous LiOH solution containing 10 wt % LiOH at 100° C. for 24 hours was used, and subjected to the same test. The test cell was made Reference example 12.

REFERENCE EXAMPLES 13 and 14

A test cell including its hydrogen absorbing electrode with a saturation mass susceptibility having the same composition and property with those of Example 29 was prepared, except that during the preparation of a hydrogen absorbing electrode, a hydrogen absorbing alloy powder which had been immersed in an aqueous KOH solution containing 28 wt % KOH at 100° C. for 2 hours was used, and subjected to the same test. The test cell was made Reference example 13.

A test cell including its hydrogen absorbing electrode with a saturation mass susceptibility having the same composition and property with those of Example 29 was prepared, except that during the preparation of a hydrogen absorbing electrode, a hydrogen absorbing alloy powder which had been immersed in an aqueous LiOH solution containing 10 wt % LiOH at 100° C. for 24 hours was used, and subjected to the same test. The test cell was made Reference example 14.

REFERENCE EXAMPLES 15 and 16

A test cell including its hydrogen absorbing electrode with a saturation mass susceptibility having the same composition and property with those of Example 37 was prepared, except that during the preparation of a hydrogen absorbing electrode, a hydrogen absorbing alloy powder which had been immersed in an aqueous KOH solution containing 28 wt % KOH at 100° C. for 2 hours was used, and subjected to the same test. The test cell was made Reference example 15.

A test cell including its hydrogen absorbing electrode with a saturation mass susceptibility having the same composition and property with those of Example 37 was prepared, except that during the preparation of a hydrogen absorbing electrode, a hydrogen absorbing alloy powder which had been immersed in an aqueous LiOH solution containing 10 wt % LiOH at 100° C. for 24 hours was used, and subjected to the same test. The test cell was made Reference example 16.

Table 12 lists the test results of test cells representing Reference examples 9 to 12 together with those of Examples 5 and 13, and Table 13 lists the test results of nickel metal-hydride storage batteries representing Reference examples 13 to 16 together with those of Examples 29 and 37.

form of powder having an average diameter (D50) of 0.1 µm was added to a hydrogen absorbing alloy powder, and subjected to the same test. The battery was made Example 65.

EXAMPLE 66

A sealed nickel metal-hydride storage battery including its hydrogen absorbing alloy powder with a saturation mass susceptibility having the same composition and property with

TABLE 12

| Classification | Treatment solution | Saturation mass susceptibility (emu/g) | Additive Chemical formula | Added amount | High-rate discharging ability at low temperature (5° C.) | | | | Cycle life 45° C. atmosphere |
|---|---|---|---|---|---|---|---|---|---|
| | | | | | 10 ItA discharge | 8 ItA discharge | 5 ItA discharge | 3 ItA discharge | |
| Example 5 | NaOH | 4 | $Er_2O_3$ | 1 Part by weight | 84% | 87% | 91% | 92% | 417 |
| Reference example 9 | KOH | 4 | $Er_2O_3$ | 1 Part by weight | Unable to discharge | Unable to discharge | 89% | 92% | 300 |
| Reference example 10 | LiOH | 4 | $Er_2O_3$ | 1 Part by weight | 86% | 88% | 91% | 92% | 340 |
| Example 13 | NaOH | 4 | $Yb_2O_3$ | 1 Part by weight | Unable to discharge | 85% | 90% | 92% | 469 |
| Reference example 11 | KOH | 4 | $Yb_2O_3$ | 1 Part by weight | Unable to discharge | Unable to discharge | Unable to discharge | 91% | 350 |
| Reference example 12 | LiOH | 4 | $Yb_2O_3$ | 1 Part by weight | Unable to discharge | 88% | 91% | 92% | 390 |

TABLE 13

| Classification | Treatment solution | Treatment time | Saturation mass susceptibility (emu/g) | Additive Chemical formula | Added amount | Capacity (mAh/g) |
|---|---|---|---|---|---|---|
| Example 29 | NaOH | 3.5 | 4 | $Er_2O_3$ | 1 Part by weight | 304 |
| Reference exampl 13 | KOH | 2 | 4 | $Er_2O_3$ | 1 Part by weight | 304 |
| Reference exampl 14 | LiOH | 24 | 4 | $Er_2O_3$ | 1 Part by weight | 304 |
| Example 37 | NaOH | 3.5 | 4 | $Yb_2O_3$ | 1 Part by weight | 304 |
| Reference exampl 15 | KOH | 2 | 4 | $Yb_2O_3$ | 1 Part by weight | 304 |
| Reference exampl 16 | LiOH | 24 | 4 | $Yb_2O_3$ | 1 Part by weight | 304 |

As shown in Tables 12 and 13, immersion treatment using an aqueous NaOH solution is more preferred than the treatment using an aqueous LiOH solution, because the former treatment provides a nickel metal-hydride storage battery having a more excellent cycle performance with a far shorter period of immersing treatment. The treatment is also more preferred than the treatment using an aqueous KOH solution, because it provides a nickel metal-hydride storage battery more excellent in high-rate discharging ability at low temperature and cycle performance.

In comparison to a hydrogen absorbing alloy powder treated with an aqueous KOH solution, a hydrogen absorbing alloy powder treated with an aqueous NaOH solution shows more compact and uniform surfaces devoid of indentations. These surfaces act as a protector against the corrosion which would otherwise penetrate the surface into the interior. This is probably the reason why the immersion treatment enables the production of a nickel metal-hydride storage battery excellent in high-rate discharging ability at low temperature and cycle performance.

EXAMPLE 65

A sealed nickel metal-hydride storage battery including its hydrogen absorbing alloy powder with a saturation mass susceptibility having the same composition and property with those of Example 30 was prepared, except that during the preparation of a hydrogen absorbing electrode, $Er_2O_3$ in the form of powder having an average diameter (D50) of 3 µm was added to a hydrogen absorbing alloy powder, and subjected to the same test. The battery was made Example 66.

EXAMPLE 67

A sealed nickel metal-hydride storage battery including its hydrogen absorbing alloy powder with a saturation mass susceptibility having the same composition and property with those of Example 30 was prepared, except that during the preparation of a hydrogen absorbing electrode, $Er_2O_3$ in the form of powder having an average diameter (D50) of 5 µm was added to a hydrogen absorbing alloy powder, and subjected to the same test. The battery was made Example 67.

EXAMPLE 68

A sealed nickel metal-hydride storage battery including its hydrogen absorbing alloy powder with a saturation mass susceptibility having the same composition and property with those of Example 38 was prepared, except that during the preparation of a hydrogen absorbing electrode, $Yb_2O_3$ in the form of powder having an average diameter (D50) of 0.1 µm was added to a hydrogen absorbing alloy powder, and subjected to the same test. The battery was made Example 68.

EXAMPLE 69

A sealed nickel metal-hydride storage battery including its hydrogen absorbing alloy powder with a saturation mass susceptibility having the same composition and property with those of Example 38 was prepared, except that during the preparation of a hydrogen absorbing electrode, $Yb_2O_3$ in the form of powder having an average diameter (D50) of 3 μm was added to a hydrogen absorbing alloy powder, and subjected to the same test. The battery was made Example 69.

EXAMPLE 70

A sealed nickel metal-hydride storage battery including its hydrogen absorbing alloy powder with a saturation mass susceptibility having the same composition and property with those of Example 38 was prepared, except that during the preparation of a hydrogen absorbing electrode, $Yb_2O_3$ in the form of powder having an average diameter (D50) of 5 μm was added to a hydrogen absorbing alloy powder, and subjected to the same test. The battery was made Example 70.

Table 14 lists the test results of Examples 65 to 70 together with those of Examples 30 and 38.

TABLE 14

| Classification | Hydrogen absorbing alloy | | Additive | | | Cycle life 45° C. atmosphere |
| --- | --- | --- | --- | --- | --- | --- |
| | Saturation mass susceptibility (emu/g) | Average particle diameter (μm) | Chemical formula | Average particle diameter (μm) | Added amount | |
| Example 65 | 5 | 30 | $Er_2O_3$ | 0.1 | 1 Part by weight | 393 |
| Example 30 | 5 | 30 | $Er_2O_3$ | 1 | 1 Part by weight | 357 |
| Example 66 | 5 | 30 | $Er_2O_3$ | 3 | 1 Part by weight | 339 |
| Example 67 | 5 | 30 | $Er_2O_3$ | 5 | 1 Part by weight | 264 |
| Example 68 | 5 | 30 | $Yb_2O_3$ | 0.1 | 1 Part by weight | 442 |
| Example 38 | 5 | 30 | $Yb_2O_3$ | 1 | 1 Part by weight | 402 |
| Example 69 | 5 | 30 | $Yb_2O_3$ | 3 | 1 Part by weight | 381 |
| Example 70 | 5 | 30 | $Yb_2O_3$ | 5 | 1 Part by weight | 286 |

It is known from the results shown in Table 14 that the oxide of a rare earth element, whether it is $Er_2O_3$ or $Yb_2O_3$, having an average diameter (D50) of 0.1 to 3 μm, particularly 0.1 to 1 μm will provide a battery more excellent in cycle performance at 45° C. than the oxide having an average diameter of 5 μm. As seen from above, usually addition of $Er_2O_3$ or $Yb_2O_3$ having a small average diameter (D50) allows the production of a battery excellent in cycle performance. This is probably because the coat formed by powder $Er_2O_3$ or $Yb_2O_3$ additive having a smaller diameter on the surface of a hydrogen absorbing alloy powder is more protective against corrosion. Incidentally, the high-rate discharging ability of a battery is practically the same, regardless of the average diameter (D50) of powdery $Er_2O_3$ or $Yb_2O_3$ added, although the relevant data are not cited in Table 14.

It is also possible, although this is not demonstrated in connection with any Examples and Reference examples cited above, to obtain a hydrogen absorbing electrode more excellent both in high-rate discharging ability and cycle performance by taking oxides or hydroxides of two or more rare earth elements selected from a group consisting of Dy, Ho, Er, Tm, Yb and Lu such that the chosen rare earth elements account for 80 wt % or more, more preferably 90 wt % or more of the total weight of the oxides or hydroxides, and adding the oxides or hydroxides to a hydrogen absorbing alloy powder, as compared with a hydrogen absorbing electrode for which no compound of rare earth element was added.

In Examples 71 to 85, and Comparative examples 33 to 39 described below, the relationship of the average diameter of powder and an anti-corrosion agent with the performance of a battery containing such an anti-corrosion agent was studied.

EXAMPLE 71

(Preparation of Positive Electrode Plate)

Nickel sulfate and zinc sulfate and cobalt sulfate were added at a specified ratio to water to give an aqueous solution, to which were added ammonium sulfate and an aqueous solution of sodium hydroxide to produce an ammine complex. To the reaction system, under vigorous stirring, was further added as fall in drops as an aqueous solution of sodium hydroxide until the pH of the reaction system became pH 11 to 12, to thereby produce nickel hydroxide in the form of highly dense spherical particles in which nickel hydroxide, zinc hydroxide, and cobalt hydroxide coexisted at the weight ratio of 88.45:5.12:1.1.

The highly dense particles of nickel hydroxide were put into an alkaline aqueous solution whose pH had been adjusted to pH 11 to 12 with sodium hydroxide. To the resulting solution was added as fall in drops as an aqueous solution containing cobalt sulfate and ammonium sulfate at specified concentrations under stirring. During the addition, an aqueous solution of sodium hydroxide was added as fall in drops to the mixture as needed to maintain the pH of the mixture at pH 11 to 12. A superficial layer comprising mixed hydroxides including the hydroxides of cobalt was allowed to form on the surface of particles of nickel hydroxide by maintaining the pH of the mixture at pH 11 to 12 for 1 hour. The weight ratio of the mixed hydroxides constituting the superficial layer against the core mother material (to be referred to simply as core layer hereinafter) was 4.0 wt %.

A 50 g of nickel hydroxide in the form of particles whose surface carried a superficial layer comprising mixed hydroxides was put into an aqueous solution of 30 wt % (10 mol/dm³) sodium hydroxide at 110° C., and the mixture was stirred thoroughly. Then, $K_2S_2O_8$ was added to the mixture in an amount in excess of an amount equivalent to the amount of the hydroxides of cobalt contained in the superficial layer, and evolution of oxygen gas from the superficial layer was confirmed. The active material particles were separated by filtration, washed with water, and dried.

To a mixed powder comprising the active material particles and a Yb(OH)₃ powder having an average diameter of 5 μm, was added an aqueous solution of carboxymethylcellulose (CMC) to give a paste in which the active particles, Yb (OH)$_3$ powder, and CMC (solid portion) were combined at the weight ratio of 100:2:0.5. The paste was applied to a nickel porous body having a surface density of 450 g/m$^2$ (Nickel Cellmet #8 manufactured by Sumitomo Electric Industries). Then, the body was dried at 80° C., and pressed into a plate having a specified thickness. The plate was cut to give a rectangular plate of 48.5 mm in width and 1100 mm in length with non-coated strips along the long sides having a width of 1.5 mm that has a capacity of 6500 mAh (6.5 Ah). This was used as a nickel positive electrode plate.

(Preparation of a Negative Electrode Plate)

A hydrogen absorbing alloy in the form of powder having an average diameter of 20 µm and belonging to an AB$_5$ type rare earth element system whose composition is represented by MmNi$_{4.0}$Co$_{0.55}$Al$_{0.35}$Mn$_{0.30}$ (Mm refers to a misch-metal representing a mixture of La, Ce, Pr, and Nd at a weight ratio of La:Ce: Pr:Nd=70:22:2:6) was immersed in an aqueous solution of 48 wt % NaOH (in terms of the specific gravity at 20° C.) kept at 100° C. for 1.3 hour to provide an alloy with a saturation mass susceptibility of 2 emu/g. Then, the mixture was filtered under pressure to separate the alloy from the treatment solution. To the alloy was added pure water having the same weight, and the resulting mixture was exposed for 10 minutes to an ultrasonic wave having the frequency of 28 kHz. Then, while the mixture was being stirred gently, pure water was injected below a stirred suspension layer and excess water was allowed to flow out, thereby purging hydroxides of rare earth metal liberated from the alloy powder for disposal. Then, reducing was continued until the pH of spilled water became pH10 or lower. The remaining mixture was filtered under pressure. Desorption of hydrogen was achieved by exposing the hydrogen absorbing alloy powder to water warmed to 80° C. The warm water was filtered under pressure, and washed with water again. The alloy was cooled to 25° C., to which was added 4% hydrogen peroxide solution having the same weight with that of the alloy to desorb hydrogen. Thus, a hydrogen absorbing alloy powder for the construction of an electrode was obtained. The hydrogen absorbing alloy powder had a saturation mass susceptibility of 2 emu/g.

Powder of Er$_2$O$_3$ commercially available (average diameter of 10 µm) was wet-ground by a satellite ball mill using water as a dispersant. The yield was removed of moisture to be dried, and sieved by a blower sorting machine to provide powder of Er$_2$O$_3$ having an average diameter of 0.3 µm.

To 100 parts by weight of a hydrogen absorbing alloy powder, was added 1 part by weight of erbium oxide (Er$_2$O$_3$) for mixture, which was followed by the addition of 0.65 part by weight of a styrenebutadiene copolymer (SBR), and 0.3 part by weight of hydroxypropylmethylcellulose (HPMC) for mixture. To the yield was added a specified amount of water and the mixture was kneaded to form a paste. The paste was applied with a blade coater onto a punched steel plate made of a nickel-coated iron plate. The product was kept at 80° C. to be dried, and pressed to give a master plate for hydrogen absorbing electrode which was a rectangular plate of 48.5 mm in width and 1180 mm in length with non-coated strips along the long sides having a width of 1.5 mm that has a capacity of 11000 mAh (11.0 Ah). This was used as a negative electrode plate (hydrogen absorbing electrode). For reference, the amount of the hydrogen absorbing alloy powder applied to every 1 cm$^2$ area of the negative electrode was 0.07 g.

An electrode plate shaped like a square coated with the active material having a size of 30 mm×30 mm was cut from the negative electrode, and used as a negative electrode plate of a test cell.

(Preparation of a Test Test cell Comprising a Negative Electrode, and Evaluation Test)

An open type cell was obtained by sandwiching a negative electrode plate serving as a test negative test cell by two separators (made of the same material as that of a separator of a sealed nickel metal-hydride battery described later) and placing, outside the separators, two nickel electrode plates having a capacity two times as large as that of the negative electrode plate to produce a test electrode assembly, and injecting electrolyte having the same composition as that of electrolyte used for a sealed nickel hydrogen batter described later, into the test electrode assembly. The cell prepared as above was charged at 20° C. via 0.02 ItA to 25% of the capacity of the negative electrode, and then charged via 0.1 ItA to 100% of the capacity of the negative electrode. After 1 hour pause, the cell was discharged via 0.2 ItA until the potential of the negative electrode versus the reference electrode (Hg/HgO) became −0.6 V. Then, the cell was charged via 0.1 ItA to 120%, which was followed by 1 hour pause. Later, the cell was discharged to −0.6V versus the reference electrode. The above charge/discharge cycle was repeated four times. Based on the discharge capacity obtained from the fourth discharge cycle, the discharge capacity per 1 g of hydrogen absorbing alloy was determined by calculation.

(Preparation of Sealed Nickel Metal-Hydride Battery)

Process responsible for the production of a sealed nickel metal-hydride battery of the invention will be described below with reference to FIGS. 1, 2, and 3.

(Attaching Upper and Lower Current collecting plates to the Ends of Electrode assembly of Rolled Sheets)

A plate of a negative electrode prepared as above, a sheet of non-woven textile having a thickness of 120 µm and comprising sulfonated polypropylene which served as a separator, and a positive electrode plate were combined, and rolled together to form a electrode assembly 1 with a radius of 15.2 mm. To the positive electrode plate protruding from one end of the electrode assembly 1, was connected an upper current collecting plate 2 (current collecting of positive electrode) by electric resistance welding. The upper current collecting plate 2 is a nickel-plated steel plate of 0.3 mm in thickness having a disc-like shape with a radius of 14.5 mm which has a throughhole at its center with eight slits 2-2 extending radially therefrom. Each slit has two parallel ridges 2-3 of 0.5 mm in height (portions to interdigitate with an electrode substrate) along two edges facing to each other. Another nickel-plated steel plate was prepared that is a nickel-plated steel plate of 0.3 mm in thickness having a disc-like shape with a radius of 14.5 mm with eight slits extending radially therefrom. This was a lower current collecting plate (negative electrode plate represented by numeral 3 of FIG. 1). The lower current collecting plate had a projection at the center, and eight projections along the periphery of a concentric circle having a radius 11 mm around the center of lower current collecting plate 3 wherein the projections served as welding joints for connecting the lower current collecting plate to the bottom of container. The lower current collecting plate 3 was connected by electric resistance welding to the other end protruding from the rolled electrode assembly 1. The projections were provided such that the central projection had a height slightly less than that of eight projections arranged at the periphery of concentric circle.

A cylindrical container 4 with a bottommade of a nickel plated steel was prepared. A electrode assembly 1 having an upper current collecting plate 2 and a lower current collecting plate 3 attached thereto was placed in the container 4 such that the upper current collecting plate was flush with an open end of container 4 and the lower current collecting plate was brought into contact with the bottom of container 4. Then, a specified amount of electrolyte consisting of an aqueous solution comprising KOH at 6.8 mol/dm$^3$ and LiOH at 0.8 mol/dm$^3$ was injected into the trough. After injection, output terminals A, B (also called electrode rods) of an electric resistance welder are connected one to the upper current collecting plate 2 and the other to the bottom of container 4 (negative electrode terminal), and the welder was adjusted so that charging and discharging may occur at the same current for the same period. Specifically, the welder was adjusted to give an alternate current through the positive electrode plate (6.5 Ah in capacity) at a rate of 0.6 kA/Ah (3.9 kA) for 4.5 msec with the same amount of current both for charging direction and for discharging direction. This alternate pulse sequence consisting of a square charging pulse and discharging pulse was counted as one cycle, and the welder was set to give two cycles. Through passage of the current, the lower surface of lower current collecting plate 3 was connected by welding to the inner surface of the bottom of container via eight' projections 14 arranged at the periphery of a concentric circle 11 cm apart from the center of lower current collecting plate 3. Then, one output terminal of the welder was inserted through a round central hole provided at the center of the electrode assembly until it is brought into contact with the upper surface of lower current collecting plate, while the other output terminal was contacted with the outer surface of the bottom of container. Thus, the central projection provided at the center of the lower surface of lower current collecting plate 3 was brought into intimate contact with the inner surface of the bottom of container, and current was passed by the welder to thereby connect by welding the center of lower current collecting plate 3 to the inner surface of the bottom of container 4. The ratio of the distance of welded points P2 from the center of lower current collecting plate 3 against the radius of electrode assembly 1 was 0.7.

(Preparation of Current collecting lead, Its Attachment to Lid, and Sealing the open end of container)

As shown in FIG. 2, an current collecting lead comprised a ring-shaped main lead 8 and a supplementary lead 9 connected to a long end of the former (to the lower end in the particular example shown in FIG. 2). The main lead was made of a strip of nickel plate having a thickness of 0.8 mm with 16 projections11 of 0.2 mm height on one long end and 16 projections of 0.2 mm height on the other long end. The main lead was a ring obtained by deforming the strip of nickel plate into a ring having a width of 2.5 mm and length of 66 mm with an internal diameter of 20 mm (10 mm radius)(FIG. 2 shows a main lead 8 which has a supplementary lead 9 attached to its lower long side, and thus projections provided to the other long side are not visible). The supplementary lead 9 was made of a strip of nickel plate of 0.3 mm thickness, and consisted of a ring having the same external diameter with that of the main lead, and 8 jutted chips 9' protruding inward by 1 mm from the ring. Each jutted chip 9' had a knob 10 on its tip. The jutted chip 9' of supplementary lead 9 was slanted downward from the ring portion as shown in FIG. 2, and thus was given a spring function.

A sealing plate 0 was prepared which was made of a nickel deposited steel plate and had a disc-like shape with a round through-hole having a diameter of 0.8 mm formed around the center. After the inner surface of sealing plate 0 was contacted with one long end of the main lead, the ring-shaped main lead 8 was connected by electric resistance welding to the inner surface of sealing plate 0. Then, in the same manner, the ring portion of supplementary lead 9 was connected by electric resistance welding to the other long end of ring-shaped main lead 8. A valve (vent valve) 7 and a cap 6 were mounted to the outer surface of sealing plate 0 to form a lid. A ring-shaped gasket 5 was applied onto the peripheral edge of sealing plate 0 to contain the latter. Incidentally, the lid (sealing plate j) had a radius of 14.5 mm.

The lid having the current collecting lead attached thereto was placed on electrode assembly 1 so as to bring supplementary lead 9 into contact with upper current collecting plate 2, and the open end of container 4 was sealed air-tight, and the battery assembly was compressed to give a specified overall height. During this operation, since the jutted chips 9' of supplementary lead 9 were conferred a spring function, it is possible to bring the knobs 10 of supplementary lead 9 into intimate contact with upper current collecting plate 2, even when the distance between sealing plate 0 and upper current collecting plate 2 varies from one battery to another.

(Connection by Welding of Current collecting lead to Upper Current collecting plate)

The output terminals A, B of the electric resistance welder were attached to the lid (positive electrode terminal) and to the bottom surface of container 4 (negative electrode terminal), and was set to pass current pulses having the same intensities both for charging and discharging directions over the same period. Specifically, the welder was adjusted to give an alternate current through the positive electrode plate (6.5 Ah in capacity) at a rate of 0.6 kA/Ah (3.9 kA) for 4.5 msec with the same amount of current both for charging direction and for discharging direction. This alternate pulse sequence consisting of a square charging pulse and discharging pulse was counted as one cycle, and the welder was set to give two cycles. During passage of the current, it was checked that gas having a pressure exceeding the open pressure of the valve did not evolve. Thus, the lid and the positive electrode current collecting plate were connected to each other via the ring-shaped main lead with supplementary lead to produce a sealing nickel metal-hydride storage battery as shown in FIG. 1. The ratio of the distance of welded points P1 from the center of upper current collecting plate 2 against the radius of electrode assembly 1 was 0.6. The ratio of the length of current collecting lead from the welded points formed on sealing plate 0 to welded points P1 formed on upper current collecting plate 2 against the distance between sealing plate 0 and upper current collecting plate 2 was about 1.4. All the batteries used in Examples and Comparative examples were 172 g in weight.

(Chemical Activation)

A sealed storage battery prepared as described above was left at 25° C. for 12 hours. Then, the battery was charged to 1200 mAh by passing 130 mA (0.02 ItA), and then 650 mA (0.1 ItA) for 10 hours. The battery was then discharged to 1V or a cut voltage via 1300 mA (0.2 ItA). The battery was charged again for 16 hours via 650 mA (0.1 ItA), and discharged to 1V or cut voltage via 1300 mA (0.2 ItA). The cycle consisting of charge/discharge sequence was repeated four times. To activate the battery, the battery was charged via 6500 mA (1 ItA) until −ΔV exhibited the variation of 5 mV, and then discharged via 6500 mA (1 ItA) to 1.0 V or discharge cut voltage. The above charge/discharge sequence was taken to form a cycle, and the cycle was repeated 10 times.

(Charge/Discharge Cycle Test)

Activated batteries were subjected to charge/discharge cycle test under the ambient temperature of 45° C. A test battery was charged via 0.5 ItA until −ΔV exhibited the variation of 5 mV, and then discharged via 1 ItA to 1.0 V or discharge cut voltage. The above charge/discharge sequence was taken to form a cycle, and the cycle was repeated continuously until the discharge capacity of test battery declined below a level equal to 80% of the discharge capacity of the same battery subsequent to the first charge/discharge cycle, and the number of cycles delivered heretofore was taken to represent the cycle life of the battery.

(Measurement of Output Density)

To measure the output density of a test battery, the battery was placed in an atmosphere kept at 25° C. After the end of discharge, the battery was charged by passing 650 mA (0.1 ItA) for 5 hours, and then discharged by passing 60 A for 12 sec. During discharging, the voltage of the battery at the 10th second was measured and the measurement was named the 10th second voltage for 60 A discharge. A charging current of 6 A was passed until the discharge was completely compensated for. Then, the battery was discharged by passing 90 A for 12 sec. During discharging, the voltage of the battery at the 10th second was measured and the measurement was named the 10th second voltage for 90 A discharge. The discharge was compensated for by passing a charging current of 6 A. Then, the battery was discharged by passing 120 A for 12 sec, and meantime the voltage of the battery at the 10th second was measured and the measurement was named the 10th second voltage for 120 A discharge. The discharge was compensated for by passing a charging current of 6 A. Then, the battery was discharged by passing 150 A for 12 sec, and meantime the voltage of the battery at the 10th second was measured and the measurement was named the 10th second voltage for 150 A discharge. The discharge was compensated for by passing a charging current of 6 A. Then, the battery was discharged by passing 180 A for 12 sec, and meantime the voltage of the battery at the 10th second was measured and the measurement was named the 10th second voltage for 180 A discharge. Relationship of the tenth second voltage measurements with discharging currents was approximated to a line by a least square method: the line, when plotted on a coordinate system, takes a voltage value of E0 when the current value is 0 A, and has a gradient RDC. Then, from the formula below:

Output density (W/kg)=($E0$–0.8)/RDC×0.8/battery weight (kg) the output density of a battery was calculated (battery was discharged at 25° C. to 0.8V or cut voltage).

EXAMPLE 72

A negative electrode plate was prepared in the same manner as in Example 71, except that 1 part by weight of $Er_2O_3$ in the form of powder having an average diameter of 0.4 μm was added to 100 parts by weight of a hydrogen absorbing alloy powder. The electrode plate was made Example 72.

EXAMPLE 73

A negative electrode plate was prepared in the same manner as in Example 71, except that 1 part by weight of $Er_2O_3$ in the form of powder having an average diameter of 1.0 μm was added to 100 parts by weight of a hydrogen absorbing alloy powder. The electrode plate was made Example 73.

EXAMPLE 74

A negative electrode plate was prepared in the same manner as in Example 71, except that 1 part by weight of $Er_2O_3$ in the form of powder having an average diameter of 3.5 μm was added to 100 parts by weight of a hydrogen absorbing alloy powder. The electrode plate was made Example 74.

EXAMPLE 75

A negative electrode plate was prepared in the same manner as in Example 71, except that 1 part by weight of $Er_2O_3$ in the form of powder having an average diameter of 5.0 μm was added to 100 parts by weight of a hydrogen absorbing alloy powder. The electrode plate was made Example 75.

COMPARATIVE EXAMPLE 33

A negative electrode plate was prepared in the same manner as in Example 71, except that 1 part by weight of $Er_2O_3$ in the form of powder having an average diameter of 8.0 μm was added to 100 parts by weight of a hydrogen absorbing alloy powder, the $Er_2O_3$ powder being obtained by pulverizing a commercially available $Er_2O_3$ powder as described above with a ball mill. The electrode plate was made Comparative example 33.

COMPARATIVE EXAMPLE 34

A negative electrode plate was prepared in the same manner as in Example 71, except that 1 part by weight of a commercially available $Er_2O_3$ powder (average diameter of 10 μm) as described above was added without pulverization to 100 parts by weight of a hydrogen absorbing alloy powder. The electrode plate was made Comparative example 34.

EXAMPLE 76

Powder of $Er(OH)_3$ commercially available (average diameter of 10 μm) was wet-ground by a satellite ball mill using water as a dispersant. The yield was removed of moisture to be dried, and sieved by a blower sorting machine to provide powder of $Er(OH)_3$ having an average diameter of 0.3 μm. A negative electrode plate was prepared in the same manner as in Example 71, except that 1 part by weight of $Er(OH)_3$ in the form of powder having an average diameter of 0.3 μm was added to 100 parts by weight of a hydrogen absorbing alloy powder. The electrode plate was made Example 76.

A negative electrode plate was prepared in the same manner as in Example 76, except that 1 part by weight of $Er(OH)_3$ in the form of powder having an average diameter of 0.5 μm was added to 100 parts by weight of a hydrogen absorbing alloy powder. The electrode plate was made Example 77.

EXAMPLE 78

A negative electrode plate was prepared in the same manner as in Example 76, except that 1 part by weight of $Er(OH)_3$ in the form of powder having an average diameter of 1.0 μm was added to 100 parts by weight of a hydrogen absorbing alloy powder. The electrode plate was made Example 78.

EXAMPLE 79

A negative electrode plate was prepared in the same manner as in Example 76, except that 1 part by weight of $Er(OH)_3$ in the form of powder having an average diameter of 3.5 μm was added to 100 parts by weight of a hydrogen absorbing alloy powder. The electrode plate was made Example 79.

EXAMPLE 80

A negative electrode plate was prepared in the same manner as in Example 76, except that 1 part by weight of $Er(OH)_3$ in the form of powder having an average diameter of 5.0 μm was added to 100 parts by weight of a hydrogen absorbing alloy powder. The electrode plate was made Example 80.

COMPARATIVE EXAMPLE 35

A negative electrode plate was prepared in the same manner as in Example 76, except that 1 part by weight of Er(OH)$_3$ in the form of powder having an average diameter of 8.0 µm was added to 100 parts by weight of a hydrogen absorbing alloy powder, the Er(OH)$_3$ powder being obtained by pulverizing a commercially available Er(OH)$_3$ powder as described above with a ball mill. The electrode plate was made Comparative example 35.

COMPARATIVE EXAMPLE 36

A negative electrode plate was prepared in the same manner as in Example 76, except that 1 part by weight of a commercially available Er(OH)$_3$ powder (average diameter of 10 µm) as described above was added without pulverization to 100 parts by weight of a hydrogen absorbing alloy powder. The electrode plate was made Comparative example 36.

EXAMPLE 81

Powder of Yb$_2$O$_3$ commercially available (average diameter of 10 µm) was wet-ground by a satellite ball mill using water as a dispersant. The yield was removed of moisture to be dried, and sieved by a blower sorting machine to provide powder of Yb$_2$O$_3$ having an average diameter of 0.3 µm. A negative electrode plate was prepared in the same manner as in Example 71, except that 1 part by weight of Yb$_2$O$_3$ in the form of powder having an average diameter of 0.3 µm was added to 100 parts by weight of a hydrogen absorbing alloy powder. The electrode plate was made Example 81.

EXAMPLE 82

A negative electrode plate was prepared in the same manner as in Example 81, except that 1 part by weight of Yb$_2$O$_3$ in the form of powder having an average diameter of 0.5 µm was added to 100 parts by weight of a hydrogen absorbing alloy powder. The electrode plate was made Example 82.

EXAMPLE 83

A negative electrode plate was prepared in the same manner as in Example 81, except that 1 part by weight of Yb$_2$O$_3$ in the form of powder having an average diameter of 1.0 µm was added to 100 parts by weight of a hydrogen absorbing alloy powder. The electrode plate was made Example 83.

EXAMPLE 84

A negative electrode plate was prepared in the same manner as in Example 81, except that 1 part by weight of Yb$_2$O$_3$ in the form of powder having an average diameter of 3.5 µm was added to 100 parts by weight of a hydrogen absorbing alloy powder. The electrode plate was made Example 84.

EXAMPLE 85

A negative electrode plate was prepared in the same manner as in Example 81, except that 1 part by weight of Yb$_2$O$_3$ in the form of powder having an average diameter of 5.0 µm was added to 100 parts by weight of a hydrogen absorbing alloy powder. The electrode plate was made Example 85.

COMPARATIVE EXAMPLE 37

A negative electrode plate was prepared in the same manner as in Example 81, except that 1 part by weight of Yb$_2$O$_3$ in the form of powder having an average diameter of 8.0 µm was added to 100 parts by weight of a hydrogen absorbing alloy powder, the Yb$_2$O$_3$ powder being obtained by pulverizing a commercially available Yb$_2$O$_3$ powder as described above with a ball mill. The electrode plate was made Comparative example 37.

COMPARATIVE EXAMPLE 38

A negative electrode plate was prepared in the same manner as in Example 81, except that 1 part by weight of a commercially available Yb$_2$O$_3$ powder (average diameter of 10 µm) as described above was added without pulverization to 100 parts by weight of a hydrogen absorbing alloy powder. The electrode plate was made Comparative example 38.

COMPARATIVE EXAMPLE 39

A negative electrode plate was prepared in the same manner as in Example 71, except that no oxide or hydroxide of Er and Yb was added to a hydrogen absorbing alloy powder. The electrode plate was made Comparative example 39.

Table 15 lists the test results of Examples 71 to 85, and Comparative examples 33 to 39 regarding discharge capacity per 1 g of hydrogen absorbing alloy powder when they are used as a negative electrode, and regarding cycle performance (cycle life) and output density when they are used as a sealed nickel metal-hydride battery.

TABLE 15

| Example | Combined addition Oxide/hydroxide of rare earth element | | Cycle life (cycles) | Output (W/kg) |
| --- | --- | --- | --- | --- |
| | Chemical formula | Average particle diameter (µm) | | |
| Example 71 | Er$_2$O$_3$ | 0.3 | 638 | 1500 |
| Example 72 | Er$_2$O$_3$ | 0.4 | 609 | 1500 |
| Example 73 | Er$_2$O$_3$ | 1.0 | 581 | 1500 |
| Example 74 | Er$_2$O$_3$ | 3.5 | 581 | 1500 |
| Example 75 | Er$_2$O$_3$ | 5.0 | 413 | 1500 |
| Comparative example 33 | Er$_2$O$_3$ | 8.0 | 310 | 1500 |
| Comparative example 34 | Er$_2$O$_3$ | 10 | 306 | 1500 |
| Example 76 | Er(HO)$_3$ | 0.3 | 618 | 1500 |
| Example 77 | Er(HO)$_3$ | 0.5 | 596 | 1500 |
| Example 78 | Er(HO)$_3$ | 1.0 | 577 | 1500 |
| Example 79 | Er(HO)$_3$ | 3.5 | 573 | 1500 |
| Example 80 | Er(HO)$_3$ | 5.0 | 408 | 1500 |
| Comparative example 35 | Er(HO)$_3$ | 8.0 | 310 | 1500 |
| Comparative example 36 | Er(HO)$_3$ | 10 | 305 | 1500 |
| Example 81 | Yb$_2$O$_3$ | 0.3 | 750 | 1400 |
| Example 82 | Yb$_2$O$_3$ | 0.5 | 694 | 1400 |
| Example 83 | Yb$_2$O$_3$ | 1.0 | 638 | 1400 |
| Example 84 | Yb$_2$O$_3$ | 3.5 | 609 | 1400 |
| Example 85 | Yb$_2$O$_3$ | 5.0 | 413 | 1400 |
| Comparative example 37 | Yb$_2$O$_3$ | 8.0 | 310 | 1400 |

TABLE 15-continued

| | Combined addition Oxide/hydroxide of rare earth element | | | |
|---|---|---|---|---|
| Example | Chemical formula | Average particle diameter (μm) | Cycle life (cycles) | Output (W/kg) |
| Comparative example 38 | $Yb_2O_3$ | 10 | 307 | 1400 |
| Comparative example 39 | No addition | — | 300 | 1500 |

From Table 15 it is known that addition of powdery $Er_2O_3$, $Er(OH)_3$, or $Yb_2O_3$ having an average diameter of 0.3 to 5.0 μm, particularly 0.3 to 3.5 μm is effective for greatly improving the cycle performance of a battery, as seen from the comparison with Comparative example 39 in which no addition of an anti-corrosion agent was undertaken. This is probably because when an anti-corrosion agent having a small diameter is added to a hydrogen absorbing alloy powder, it can disperse readily into the electrode body to distribute uniformly in it, and when receiving the injection of electrolyte, readily react with elements of the solution, and, in addition, the anti-corrosion agent is also distributed uniformly over the surface of hydrogen absorbing alloy powder. In contrast, when the powdery anti-corrosion agent has an average diameter of 8 to 10 μm, it can not disperse readily in the electrode body due to its large diameter, is so reluctant to the reaction with elements of electrolyte, that it will hardly distribute uniformly on the surface of hydrogen absorbing alloy powder. This is the reason why such an anti-corrosion agent can not exert its function satisfactorily even after activation (including the time when the cycle test is performed).

A battery incorporating an $Er_2O_3$-added electrode has a higher output density, although being somewhat inferior in cycle performance, than a battery incorporating a $Yb_2O_3$-added electrode. Conversely, a battery incorporating a $Yb_2O_3$-added electrode has a more excellent cycle performance than a battery incorporating an $Er_2O_3$-added electrode, although being somewhat inferior in output density. This is probably because the $Yb_2O_3$ powder is more dispersive than the $Er_2O_3$ powder, and thus, when added to the electrode body, $Yb(OH)_3$ which is generated as a result of reaction in the electrode body will cover more effectively the surface of hydrogen absorbing alloy powder including its active spots. In view of this, when emphasis is put on the output power performance, powder of $Er_2O_3$ is preferably selected. When stress is given to the cycle performance, powder of $Yb_2O_3$ is preferably selected. In the examples above, the anti-corrosion inhibitors having a purity of 90% were used. However, from the functional point of view, 100% pure anti-corrosion inhibitors are more preferred, although they are more expensive.

A battery with an $Er_2O_3$-added electrode exhibits a more excellent cycle performance than a battery with an $Er(OH)_3$-added electrode, although being similar in output density. This is probably because, since $Er_2O_3$ powder is more soluble to alkaline electrolyte than $Er(OH)_3$ powder, the former disperses more uniformly in the electrode body, which will lead to the more enhanced anti-corrosion activity of hydrogen absorbing alloy powder. Addition of $Yb(OH)_3$ powder having an average diameter of 5 μm or less also has an excellent anti-corrosion enhancing effect, although its details will be omitted here.

According to the invention, it is also possible to combine two kinds of oxides or hydroxides of Er or Yb different in average diameter, for example, one having a diameter equal to 5 μm or less, and the other having a diameter over 5 μm (for example, powder not pulverized), and to add the mixture (having two or more peaks in particle size distribution) to a hydrogen absorbing alloy powder. In this case, addition of the mixture is preferably adjusted such that the powder having an average diameter equal to or less than 5 μm is added at 0.3 to 1.5 part by weight with respect to 100 parts by weight of a hydrogen absorbing alloy powder. However, combinational addition of powder of an oxide or hydroxide of Er or Yb having an average diameter over 5 μm is preferably avoided, because it is not only ineffective for enhancing the anti-corrosion activity of hydrogen absorbing alloy powder, but also lowers the filling density of hydrogen absorbing alloy powder within a hydrogen absorbing electrode, thereby reducing the utility of the electrode. Combinational addition should be avoided also because coexistence of powder of an oxide or hydroxide of Er or Yb having an average diameter exceeding that of hydrogen absorbing alloy powder, will reduce, when the mixture is processed to give a paste of active material, the dispersibility of powder within the paste. According to the invention, when powder of oxide or hydroxide of Er or Yb is used, that powdery additive preferably has a d90 size (that corresponds to the size of particle which gives 90% accumulation of particles on a cumulative curve which is plotted based on the particle size distribution of a given powder, where 100% corresponds to the assessed volume of the overall profile of the powder) which is smaller than the average diameter of a hydrogen absorbing alloy powder to which it is to be added.

In Examples 86 to 93, and Comparative examples 40 to 45 described below, the relationship of the added amount of powdery anti-corrosion agent with the performance of a battery containing such an anti-corrosion agent was studied.

EXAMPLE 86

A negative electrode plate was prepared in the same manner as in Example 71, except that 0.3 part by weight of $Er_2O_3$ in the form of powder having an average diameter of 0.3 μm was added to 100 parts by weight of a hydrogen absorbing alloy powder. The electrode plate was made Example 86.

EXAMPLE 87

A negative electrode plate was prepared in the same manner as in Example 71, except that 1.5 part by weight of $Er_2O_3$ in the form of powder having an average diameter of 0.3 μm was added to 100 parts by weight of a hydrogen absorbing alloy powder. The electrode plate was made Example 87.

COMPARATIVE EXAMPLE 40

A negative electrode plate was prepared in the same manner as in Example 71, except that 0.1 part by weight of $Er_2O_3$ in the form of powder having an average diameter of 0.3 μm was added to 100 parts by weight of a hydrogen absorbing alloy powder. The electrode plate was made Comparative example 40.

COMPARATIVE EXAMPLE 41

A negative electrode plate was prepared in the same manner as in Example 71, except that 3 parts by weight of $Er_2O_3$ in the form of powder having an average diameter of 0.3 μm

EXAMPLE 88

A negative electrode plate was prepared in the same manner as in Example 71, except that 0.3 part by weight of $Er_2O_3$ in the form of powder having an average diameter of 5.0 μm was added to 100 parts by weight of a hydrogen absorbing alloy powder. The electrode plate was made Example 88.

EXAMPLE 89

A negative electrode plate was prepared in the same manner as in Example 71, except that 1.5 part by weight of $Er_2O_3$ in the form of powder having an average diameter of 5.0 μm was added to 100 parts by weight of a hydrogen absorbing alloy powder. The electrode plate was made Example 89.

COMPARATIVE EXAMPLE 42

A negative electrode plate was prepared in the same manner as in Example 71, except that 3 parts by weight of $Er_2O_3$ in the form of powder having an average diameter of 5.0 μm was added to 100 parts by weight of a hydrogen absorbing alloy powder. The electrode plate was made Comparative example 42.

EXAMPLE 90

A negative electrode plate was prepared in the same manner as in Example 71, except that 0.3 part by weight of $Er(OH)_3$ in the form of powder having an average diameter of 0.3 μm was added to 100 parts by weight of a hydrogen absorbing alloy powder. The electrode plate was made Example 90.

EXAMPLE 91

A negative electrode plate was prepared in the same manner as in Example 71, except that 1.5 part by weight of $Er(OH)_3$ in the form of powder having an average diameter of 0.3 μm was added to 100 parts by weight of a hydrogen absorbing alloy powder. The electrode plate was made Example 91.

COMPARATIVE EXAMPLE 43

A negative electrode plate was prepared in the same manner as in Example 71, except that 3 parts by weight of $Er(OH)_3$ in the form of powder having an average diameter of 0.3 μm was added to 100 parts by weight of a hydrogen absorbing alloy powder. The electrode plate was made Comparative example 43.

EXAMPLE 92

A negative electrode plate was prepared in the same manner as in Example 71, except that 0.3 part by weight of $Yb_2O_3$ in the form of powder having an average diameter of 0.3 μm was added to 100 parts by weight of a hydrogen absorbing alloy powder. The electrode plate was made Example 92.

EXAMPLE 93

A negative electrode plate was prepared in the same manner as in Example 71, except that 1.5 part by weight of $Yb_2O_3$ in the form of powder having an average diameter of 0.3 μm was added to 100 parts by weight of a hydrogen absorbing alloy powder. The electrode plate was made Example 93.

COMPARATIVE EXAMPLE 44

A negative electrode plate was prepared in the same manner as in Example 71, except that 0.1 part by weight of $Yb_2O_3$ in the form of powder having an average diameter of 0.3 μm was added to 100 parts by weight of a hydrogen absorbing alloy powder. The electrode plate was made Comparative example 44.

COMPARATIVE EXAMPLE 45

A negative electrode plate was prepared in the same manner as in Example 71, except that 3 parts by weight of $Yb_2O_3$ in the form of powder having an average diameter of 0.3 μm was added to 100 parts by weight of a hydrogen absorbing alloy powder. The electrode plate was made Comparative example 45.

Table 16 lists the test results of Examples 86 to 93, and Comparative examples 40 to 45 together with those of Examples 71, 75 and 76, and 81 regarding discharge capacity per 1 g of hydrogen absorbing alloy powder when they are used as a negative electrode, and regarding cycle performance (cycle life) and output power performance when they are used as a sealed nickel metal-hydride battery.

TABLE 16

| Classification | Rare earth element added | | | Capacity (mAh/g) | Cycle life (cycles) | Output (W/Kg) |
| --- | --- | --- | --- | --- | --- | --- |
| | Chemical formula | Average particle diameter (μm) | Content (part by weight) | | | |
| Example 86 | $Er_2O_3$ | 0.3 | 0.3 | 280 | 516 | 1500 |
| Example 71 | $Er_2O_3$ | 0.3 | 1 | 280 | 638 | 1500 |
| Example 87 | $Er_2O_3$ | 0.3 | 1.5 | 280 | 554 | 1500 |
| Comparative example 40 | $Er_2O_3$ | 0.3 | 0.1 | 280 | 357 | 1500 |
| Comparative example 41 | $Er_2O_3$ | 0.3 | 3 | 170 | — | — |
| Example 88 | $Er_2O_3$ | 5 | 0.3 | 280 | 384 | 1500 |
| Example 75 | $Er_2O_3$ | 5 | 1 | 280 | 413 | 1500 |
| Example 89 | $Er_2O_3$ | 5 | 1.5 | 280 | 462 | 1500 |
| Comparative example 42 | $Er_2O_3$ | 5 | 3 | 170 | — | — |
| Example 90 | $Er(OH)_3$ | 0.3 | 0.3 | 280 | 474 | 1500 |
| Example 76 | $Er(OH)_3$ | 0.3 | 1 | 280 | 618 | 1500 |
| Example 91 | $Er(OH)_3$ | 0.3 | 1.5 | 280 | 590 | 1450 |
| Comparative example 43 | $Er(OH)_3$ | 0.3 | 3 | 170 | — | — |
| Example 92 | $Yb_2O_3$ | 0.3 | 0.3 | 280 | 615 | 1400 |
| Example 81 | $Yb_2O_3$ | 0.3 | 1 | 280 | 750 | 1400 |

TABLE 16-continued

| Classification | Chemical formula | Rare earth element added Average particle diameter (μm) | Content (part by weight) | Capacity (mAh/g) | Cycle life (cycles) | Output (W/Kg) |
|---|---|---|---|---|---|---|
| Example 93 | Yb$_2$O$_3$ | 0.3 | 1.5 | 280 | 652 | 1400 |
| Comparative example 44 | Yb$_2$O$_3$ | 0.3 | 0.1 | 280 | 421 | 1500 |
| Comparative example 45 | Yb$_2$O$_3$ | 0.3 | 3 | 160 | — | — |

As described above, as the powdery anti-corrosion agent has a larger particle diameter, it becomes more reluctant to react with the elements of electrolyte, and thus the agent becomes more inactive with regard to its anti-corrosion enhancing activity. To compensate for the drawback, so it had been thought, it might be effective to increase the addition amount, when powdery anti-corrosion agent has a comparatively large particle diameter. Table 16 shows the relation of the addition amount of powdery Er$_2$O$_3$ with the performance of a battery with an Er$_2$O$_3$-added electrode while varying the average diameter of the powder from 0.3 μm (the minimum size that is found to be effective for enhancing the anti-corrosion activity of a battery) to 5 μm (the maximum size that is found effective for enhancing the anti-corrosion activity of a battery) as shown in FIG. 15. The result of Comparative example 42, however, shows that a battery with an Er$_2$O$_3$-added electrode does not exhibit normal discharge performance when the powdery Er$_2$O$_3$ is added at 3 parts by weight with respect to 100 parts by weight of a hydrogen absorbing alloy powder, even when the powdery anti-corrosion agent has an average diameter of 5 μm. This is probably because the excess addition of the anti-corrosion agent may increase the resistance of hydrogen absorbing electrode to reaction, which impairs the normal discharging activity of the battery. From the results shown in Table 2, it was found that the anti-corrosion agent is preferably added at 0.3 to 1.5, more preferably 1 to 1.5 part by weight, regardless of the average diameter of the powdery anti-corrosion agent, because then it is possible to obtain a battery exhibiting a good cycle performance.

As seen from Table 16, a battery incorporating an Er(OH)$_3$ or Yb$_2$O$_3$-added electrode exhibits an improved cycle performance, when the anti-corrosion agent is added at 0.3 to 1.5 part by weight, as compared with a battery incorporating an electrode in Comparative example 39 to which no anti-corrosion agent shown in FIG. 1 is added. This effect is particularly notable when the addition amount of the anti-corrosion agent is 1 to 1.5 part by weight. On the other hand, when Er(OH)$_3$ or Yb$_2$O$_3$ is added at 3 parts by weight (Comparative examples 43 and 45), the battery exhibits an inadequate initial activation. This is probably because the battery has an insufficient capacity owing to the increased resistance to reaction. When Er$_2$O$_3$ or Yb$_2$O$_3$ is added at 0.1 part by weight (Comparative examples 40 and 44), the battery exhibits a rather low capacity. This is probably because a hydrogen absorbing alloy is quickly corroded during charge/discharge cycles which leads to the faster decline of capacity, as compared with Examples. From the results shown in Table 16, it was found that Er(OH)$_3$ and Yb$_2$O$_3$ are preferably added at 0.3 to 1.5, more preferably 1 to 1.5 part by weight. It was known further that when Yb(OH)$_3$ is added as an anti-corrosion agent, it is preferably added, like Yb$_2$O$_3$, at 0.3 to 1.5, more preferably 1 to 1.5 part by weight.

In Examples 94 to 96, and Comparative examples 46 to 49 described below, the relationship of the saturation mass susceptibility of a hydrogen absorbing alloy powder with the performance of a battery containing such a hydrogen absorbing alloy powder was studied.

EXAMPLE 94

A negative electrode plate was prepared in the same manner as in Example 73, except that a hydrogen absorbing alloy powder was immersed in an aqueous solution of 48 wt % NaOH kept at 100° C. for 0.7 hour to produce a hydrogen absorbing alloy powder having a saturation mass susceptibility of 1 emu/g, and that the hydrogen absorbing alloy powder was used to form a negative electrode plate. The electrode plate was made Example 94.

EXAMPLE 95

A negative electrode plate was prepared in the same manner as in Example 73, except that a hydrogen absorbing alloy powder was immersed in an aqueous solution of 48 wt % NaOH kept at 100° C. for 2.6 hours to produce a hydrogen absorbing alloy powder having a saturation mass susceptibility of 4 emu/g, and that the hydrogen absorbing alloy powder was used to form a negative electrode plate. The electrode plate was made Example 95.

EXAMPLE 96

A negative electrode plate was prepared in the same manner as in Example 73, except that a hydrogen absorbing alloy powder was immersed in an aqueous solution of 48 wt % NaOH kept at 100° C. for 4 hours to produce a hydrogen absorbing alloy powder having a saturation mass susceptibility of 6 emu/g, and that the hydrogen absorbing alloy powder was used to form a negative electrode plate. The electrode plate was made Example 96.

COMPARATIVE EXAMPLE 46

A negative electrode plate was prepared in the same manner as in Example 73, except that a hydrogen absorbing alloy powder which was not treated so as to have a catalytic layer formed on the surface of the powder, was used for the construction of the electrode plate. The resulting hydrogen absorbing alloy had a saturation mass susceptibility of 0.06 emu/g. The electrode plate was made Comparative example 46.

COMPARATIVE EXAMPLE 47

A negative electrode plate was prepared in the same manner as in Example 73, except that a hydrogen absorbing alloy powder was immersed in an aqueous solution of 48 wt % NaOH kept at 100° C. for 5.3 hours to produce a hydrogen absorbing alloy powder having a saturation mass susceptibility of 8 emu/g, and that the hydrogen absorbing alloy powder was used to form a negative electrode plate. The electrode plate was made Comparative example 47.

COMPARATIVE EXAMPLE 48

A negative electrode plate was prepared in the same manner as in Example 83, except that a hydrogen absorbing alloy powder which was not treated so as to have a catalytic layer formed on the surface of the powder, was used for the construction of the electrode plate. The resulting hydrogen absorbing alloy had a saturation mass susceptibility of 0.06 emu/g. The electrode plate was made Comparative example 48.

COMPARATIVE EXAMPLE 49

A negative electrode plate was prepared in the same manner as in Comparative example 46, except that powder of $Er_2O_3$ was not added to a hydrogen absorbing alloy powder. The electrode plate was made Comparative example 49.

Table 17 lists the results of Examples 94 to 96 together with those of Examples 73 and 83, and Comparative examples 46 to 49 regarding cycle test and output density measurement.

TABLE 17

| Classification | Saturation mass susceptibility hydrogen absorbing alloy (during preparation of electrode (emu/g) | Hydroxide of rare earth element | | Cycle life (cycles) | Output (W/kg) |
| --- | --- | --- | --- | --- | --- |
| | | Chemical formula | Content (part by weight) | | |
| Example 94 | 1 | $Er_2O_3$ | 1 | 469 | 1300 |
| Example 73 | 2 | $Er_2O_3$ | 1 | 581 | 1500 |
| Example 95 | 4 | $Er_2O_3$ | 1 | 559 | 1650 |
| Example 96 | 6 | $Er_2O_3$ | 1 | 525 | 1650 |
| Comparative example 46 | 0.06 | $Er_2O_3$ | 1 | — | — |
| Comparative example 47 | 8 | $Er_2O_3$ | 1 | 289 | 1500 |
| Example 83 | 2 | $Yb_2O_3$ | 1 | 638 | 1400 |
| Comparative example 48 | 0.06 | $Yb_2O_3$ | 1 | — | — |
| Comparative example 49 | 0.06 | None | 0 | 283 | 1000 |

As seen from Table 17, the hydrogen absorbing alloy powder receiving the addition of $Er_2O_3$ exhibits a saturation mass susceptibility of 1 to 6 emu/g, and improved cycle performance. A hydrogen absorbing alloy powder, after receiving the addition of $Er_2O_{31}$ can have a far higher output density of 1300 W/kg at 25° C. than a conventional alloy powder even though its saturation mass susceptibility is as low as 1 emu/g. However, generally, hydrogen absorbing alloy powders having a saturation mass susceptibility of 2 to 6 emu/g exhibit excellent output power performance exceeding 1400 W/kg at 25° C., and can attain a far more excellent cycle performance than a corresponding alloy powder having a saturation mass susceptibility of 1 emu/g. Therefore, the hydrogen absorbing alloy powder preferably has a saturation mass susceptibility of 2 to 6 emu/g. This is because such a hydrogen absorbing alloy powder has a catalytic layer formed on the surface of powder, is ready to be activated, gives a sufficient capacity from the initial phase of use life, and can inhibit the progression of corrosion due to the anti-corrosion agent. Comparative example 47, although it has a high saturation mass susceptibility, exhibits a poor cycle performance. This is probably because an excess amount of rare earth elements contained in the hydrogen absorbing alloy powder dissolve away during the treatment for the formation of catalytic layer; thereby the hydrogen absorbing ability of alloy powder is reduced; the electrode can not have a sufficient capacity; and thus its cycle life declines.

Comparative example 49 which does not receive the addition of anti-corrosion agent is inferior in cycle performance, as compared with Examples. The former is also inferior in output power performance. This is probably because the hydrogen absorbing alloy powder of Comparative example 49 does not have catalytic layer formed on its surface. It was also found that as seen from Comparative examples 46 and 48, if a hydrogen absorbing alloy powder is not treated for the formation of catalytic layer, even though it receives the addition of anti-corrosion agent, and is activated, the resulting battery will not operate satisfactorily because the hydrogen absorbing electrode is not sufficiently activated. Thus, to ensure that addition of the anti-corrosion agent leads to the improvement of cycle performance, it is preferable to add the anti-corrosion agent to a hydrogen absorbing alloy powder which has a catalytic layer formed in advance on the surface of the powder.

In Reference examples 17 and 18, and Comparative example 50 described below, the relationship of the treatment solution used for the formation of a catalytic layer with the performance of a resulting battery was studied.

COMPARATIVE EXAMPLE 50

A negative electrode plate was prepared in the same manner as in Comparative example 39, except that a hydrogen absorbing alloy powder was immersed in an acetic acid-sodium acetate buffer kept at pH3.5, instead of an alkaline aqueous solution, and that a hydrogen absorbing alloy powder having a saturation mass susceptibility of 2 emu/g was used: The electrode plate was made Comparative example 50.

REFERENCE EXAMPLE 17

A negative electrode plate was prepared in the same manner as in Example 71, except that a hydrogen absorbing alloy powder was immersed in an acetic acid-sodium acetate buffer kept at pH3.5, instead of an alkaline aqueous solution, and that a hydrogen absorbing alloy powder having a saturation mass susceptibility of 2 emu/g was used. The electrode plate was made Reference example 17.

REFERENCE EXAMPLE 18

A negative electrode plate was prepared in the same manner as in Example 95, except that a hydrogen absorbing alloy powder was immersed in an acetic acid-sodium acetate buffer kept at pH3.5, instead of an alkaline aqueous solution, and that a hydrogen absorbing alloy powder having a saturation mass susceptibility of 4 emu/g was used. The electrode plate was made Reference example 18.

Table 18 lists the results of Comparative example 50 and Reference examples 17 and 18 together with those of Examples 71 and 95, and Comparative example 39 regarding cycle test and output density measurement.

like current collecting lead according to the structure of a conventional sealed nickel metal-hydride battery. The lower current collecting plate was connected to the inner surface of the bottom of container only via the point at the center of the lower current collecting plate. The ribbon-like current collecting lead consisted of a strip of nickel plate of 0.6 mm in

TABLE 18

| Classification | Treatment solution type | hydrogen absorbing alloy Saturation mass susceptibility during preparation of electrode (emu/g) | Combined addition Oxide of rare earth element | Cycle life (cycles) | Output (W/kg) |
|---|---|---|---|---|---|
| Comparative example 39 | Alkaline | 2 | No addition | 300 | 1500 |
| Comparative example 50 | Acidic | 2 | No addition | 286 | 1500 |
| Example 71 | Alkaline | 2 | $Er_2O_3$ | 581 | 1500 |
| Example 17 | Acidic | 2 | $Er_2O_3$ | 508 | 1500 |
| Example 95 | Alkaline | 4 | $Er_2O_3$ | 559 | 1650 |
| Reference example 18 | Acidic | 4 | $Er_2O_3$ | 469 | 1520 |

As seen from Table 18, a battery incorporating a hydrogen absorbing alloy powder which has been treated with an alkaline aqueous solution shows a better cycle performance than a comparable battery incorporating a hydrogen absorbing alloy powder which has been treated with an acetic acid-sodium acetate buffer. This is probably because, even if a hydrogen absorbing alloy powder has a catalyst layer formed on its surface, part of the catalyst layer will be torn off from the surface of the powder when it is immersed in an acetic acid-sodium acetate buffer. From this, to ensure the catalytic function, a hydrogen absorbing alloy powder is preferably treated with an alkaline aqueous solution.

Although this is not directly related with the examples cited in the table, it is possible to obtain a hydrogen absorbing electrode and battery that are excellent in high-rate discharging ability and cycle performance, by adding a compound (a combination of two compounds one containing Er and the other Yb, or a complex containing both Er and Yb) containing both Er and Yb at 80 wt % or more, particularly 90 wt % or more to a hydrogen absorbing alloy powder which will be incorporated into the electrode and battery.

In Reference example 19, and Comparative example 51 described below, the relationship of the current collecting structure with the performance of a battery was studied.

REFERENCE EXAMPLE 19

A battery was prepared as in Example 95, except that connection between the lower current collecting plate and the bottom of container was achieved only through the welded point at the center of the lower current collecting plate. The battery was made Reference example 19.

COMPARATIVE EXAMPLE 51

A battery was prepared as in Example 78 except for the following points. The current collecting lead was a ribbon-like current collecting lead according to the structure of a conventional sealed nickel metal-hydride battery. The lower current collecting plate was connected to the inner surface of the bottom of container only via the point at the center of the lower current collecting plate. The ribbon-like current collecting lead consisted of a strip of nickel plate of 0.6 mm in thickness, 15 mm in width, and 25 mm in length. Before the lid was mounted to the battery body (prior to sealing), the ribbon-like current collecting lead was connected to the inner surface of the sealing plate and to the upper surface of upper current collecting plate each via four welded points. The length of the current collecting lead from its contact point to the sealing plate as far as its contact point to the upper current collecting plate was 7 times as large as the distance between the sealing plate and upper current collecting plate. The battery was made Comparative example 51.

Table 19 lists the test results of Reference example 19 and Comparative examples 51 together with those of Example 95 regarding output density.

TABLE 19

| Classification | Shape of current collecting lead | Welded points between lower current collecting plate and bottom of container | Output density (W/kg) |
|---|---|---|---|
| Example 95 | Ring-like main lead + supplementary lead | Center of lower current collecting plate + 8 points | 1650 |
| Example 19 | Ring-like main lead + supplementary lead | Center of lower current collecting plate only | 1490 |
| Comparative example 51 | Ribbon-like current collecting lead | Center of lower current collecting plate only | 920 |

As seen from Table 19, the batteries of Example 95 and Reference example 19 have higher output densities than the battery of Comparative example 51. With the battery of Example 95, connection of the current collecting lead to the upper current collecting plate was achieved by welding after sealing which deprives the current collecting lead of the need for an extra curvature, thereby enabling the reduced electric resistance of the current collecting lead. In contrast, with the battery of Comparative example 51 which was prepared according to a conventional method, one-end of the current collecting lead was connected in advance by welding to the inner surface of sealing plate, and the other end was connected later by welding to the upper current collecting plate. Then, the lid was mounted to the open end of container. This sequence of procedures requires the addition of an extra curvature to the current collecting lead, and since the current collecting lead has such a large electric resistance that the additional electric resistance will lead to the reduced output of the battery. The battery of Comparative example 51 has an output density well below 1400 W/kg at 25° C., and thus it is not suitable, for example, to be used as a power source of HEVs. Furthermore, according to a conventional battery, it is customary to connect the lower current collecting plate to the inner surface of the bottom of container only via the welded point provided at the center of the lower current collecting plate as in Reference example 19. However, connection via multiple welded points in addition to the central point as in Example 95 will be more advantageous, because it will allow a battery to provide a higher output. It is possible according to the invention to obtain a battery excellent in output power performance, particularly by preparing a hydrogen absorbing electrode according to the invention and combining it with a current collecting structure as shown in Example 95 and Reference example 19.

Industrial Applicability

As detailed above, the present invention provides a nickel metal-hydride storage battery incorporating a hydrogen absorbing electrode containing a hydrogen absorbing alloy powder as an active material, or a battery which is excellent both in cycle performance and output power performance, and can be applied widely to various industries.

What is claimed is:

1. A method for preparing a hydrogen absorbing electrode, comprising the steps of:
   immersing a hydrogen absorbing alloy powder which contains a rare earth element as an alloy constituent and a transition metal element in an aqueous alkaline solution so that the saturation mass susceptibility is 1.0 to 6.5 emu/g of said hydrogen absorbing alloy thereby obtaining an immersion treatment solution,
   removing the immersion treatment solution from said hydrogen absorbing alloy powder through said immersing step by a filtration,
   peeling hydroxides of the rare earth elements deposited on a surface of said hydrogen absorbing alloy powder from said hydrogen absorbing alloy powder through said removing step,
   separating and removing said hydroxides of the rare earth elements from said hydrogen absorbing alloy powder through said peeling step by utilizing differences of sedimentation speeds of hydrogen oxides of the rare earth elements and said hydrogen absorbing alloy powder in the aqueous solution,
   mixing said hydrogen absorbing alloy powder through said separating and removing step with an oxide or hydroxide of a rare earth element wherein said oxide or hydroxide has as a main component at least one element selected from the group consisting of Dy, Ho, Er, Tm, Yb, and Lu, and
   applying a mixture of said hydrogen absorbing alloy powder and said oxide or hydroxide of said rare earth element in a form of powder whose average diameter is equal to or less than 5 μm to form a desired shape.

2. The method as described in claim 1, wherein 80 wt % or more of the rare earth element contained in said oxide or hydroxide of the rare earth element is at least one selected from the group consisting of Dy, Ho, Er, Tm, Yb, and Lu.

3. The method as described in claim 2 wherein 80 wt % or more of the rare earth element contained in said oxide or hydroxide of the rare earth element is Er.

4. The method as described in claim 2, wherein 80 wt % or more of the rare earth element contained in said oxide or hydroxide of the rare earth element is Yb.

5. The method as described in claim 1, wherein the saturation mass susceptibility is 2 to 6 emu/g.

6. The method as described in claim 5, wherein said aqueous alkaline solution is an aqueous sodium hydroxide solution of 28 to 50 wt % and at 90 to 110° C.

7. The method as described in claim 1, wherein said hydrogen absorbing alloy powder has an average diameter of 10 to 30 μm.

8. The method as described in claim 1, wherein said oxide or hydroxide of the rare earth element in the form of powder has an average diameter equal to or less than 3.5 μm.

9. The method as described in claim 1, wherein said oxide or hydroxide of the rare earth element in the form of powder has an average diameter of 0.1 to 3 μm.

10. The method as described in claim 1, wherein 100 parts by weight of said hydrogen absorbing ally powder is mixed with 0.3 to 6.5 parts by weight of said oxide or hydroxide of said rare earth element at said mixing step.

11. The method as described in claim 1, further comprising heating the hydrogen absorbing alloy powder at 100° C. for 10 hours, and
    exposing the hydrogen absorbing alloy powder at 60° C. for 15 minutes in a hydrogen atmosphere where a partial pressure of hydrogen is kept at 0.1 Mpa so that the hydrogen absorbing alloy powder absorbs hydrogen.

12. The method as described in claim 11, wherein the removing of the immersion treatment solution from said hydrogen absorbing alloy powder includes adding pure water having same weight as a weight of said hydrogen absorbing alloy powder and exposing the immersion treatment solution for 10 minutes to an ultrasonic wave having a frequency of 28 kHz.

13. The method as described in claim 12, further comprising
    exposing said hydrogen absorbing alloy powder to water warmed to 80° C.,
    cooling said hydrogen absorbing alloy powder to 25° C., and
    adding 4% hydrogen peroxide solution having same weight as a weight of said hydrogen absorbing alloy powder thereby desorbing hydrogen.

14. The method as described in claim 1, wherein the utilizing of the sedimentation speed includes flowing water thereby mixing the hydroxides of rare earth element into the water.

* * * * *